United States Patent
Tanaka et al.

(10) Patent No.: US 8,132,215 B2
(45) Date of Patent: Mar. 6, 2012

(54) APPARATUS FOR RECEIVING BROADCAST SIGNAL

(75) Inventors: Michiko Tanaka, Hirakata (JP); Hiroaki Iwamoto, Hirakata (JP)

(73) Assignee: Panasonic Corporation, Osaka (JP)

( * ) Notice: Subject to any disclaimer, the term of this patent is extended or adjusted under 35 U.S.C. 154(b) by 1338 days.

(21) Appl. No.: 10/972,961

(22) Filed: Oct. 26, 2004

(65) Prior Publication Data

US 2005/0091697 A1  Apr. 28, 2005

(30) Foreign Application Priority Data

Oct. 27, 2003  (JP) ................................. 2003-365656

(51) Int. Cl.
  *H04N 7/20* (2006.01)
  *H04N 7/173* (2006.01)
  *H04N 7/16* (2011.01)

(52) U.S. Cl. ............ 725/71; 725/68; 725/133; 725/139; 725/141; 725/151; 725/153

(58) Field of Classification Search .................. 725/131, 725/100, 67, 68, 70, 71, 133, 139, 141, 151, 725/153; 348/725; 713/182; 726/2; 380/255
See application file for complete search history.

(56) References Cited

U.S. PATENT DOCUMENTS

| | | | |
|---|---|---|---|
| 6,040,851 A * | 3/2000 | Cheng et al. ................... | 725/132 |
| 6,366,731 B1 * | 4/2002 | Na et al. ........................... | 386/83 |
| 6,421,359 B1 * | 7/2002 | Bennett et al. ................ | 370/538 |
| 6,438,693 B1 | 8/2002 | Nakano | |
| 6,792,000 B1 * | 9/2004 | Morinaga et al. ............. | 370/473 |
| 6,931,198 B1 * | 8/2005 | Hamada et al. ................. | 386/46 |
| 7,146,627 B1 * | 12/2006 | Ismail et al. .................... | 725/47 |
| 7,310,423 B2 * | 12/2007 | Hobrock et al. .............. | 380/241 |
| 7,349,395 B2 * | 3/2008 | Liu et al. ........................ | 370/392 |
| 7,398,544 B2 * | 7/2008 | Candelore et al. ............... | 726/2 |
| 7,440,680 B2 * | 10/2008 | Koda et al. ..................... | 386/248 |
| 7,548,555 B2 * | 6/2009 | Hamada et al. ............... | 370/463 |
| 7,584,356 B2 * | 9/2009 | Suzuki .......................... | 713/168 |
| 2001/0038638 A1 * | 11/2001 | Slowe et al. ................... | 370/465 |
| 2002/0090087 A1 * | 7/2002 | Tamura et al. ................ | 380/210 |
| 2002/0101991 A1 * | 8/2002 | Bacon et al. .................. | 380/212 |
| 2002/0196374 A1 | 12/2002 | Barry et al. | |
| 2003/0054758 A1 * | 3/2003 | Kawamata et al. .......... | 455/3.04 |

(Continued)

FOREIGN PATENT DOCUMENTS

EP  0782332 A2 *  2/1997

(Continued)

OTHER PUBLICATIONS

English Language Abstract of JP2000-032016. An article entitled "OpenCable Multi-Stream CableCARD Interface Specification", OC-SP-MC-IF-I01-030905, Sep. 5, 2003.

*Primary Examiner* — Brian T. Pendleton
*Assistant Examiner* — Pinkal R Chokshi
(74) *Attorney, Agent, or Firm* — Greenblum & Bernstein, P.L.C.

(57) ABSTRACT

A broadcast signal receiving apparatus, which is capable of simultaneously processing a plurality of transport streams in an appropriate manner, is comprised of: a pre-processing unit 1202 that determines and extracts a piece of viewing-related data from each of a plurality of transport streams; a multiplexing unit 1203 that multiplexes the extracted pieces of viewing-related data, and outputs the resulting multiplexed data to an adapter 1204; and a demultiplexing unit 1205 that obtains, from the adapter 1204, the multiplexed data processed by the adapter 1204, and demultiplexes the received data.

2 Claims, 48 Drawing Sheets

U.S. PATENT DOCUMENTS

| | | | |
|---|---|---|---|
| 2003/0123657 A1* | 7/2003 | Bjordammen et al. | 380/42 |
| 2004/0002969 A1* | 1/2004 | Perng et al. | 707/3 |
| 2004/0261123 A1* | 12/2004 | Yamada et al. | 725/131 |
| 2005/0008039 A1* | 1/2005 | Funaya et al. | 370/474 |
| 2005/0243873 A1* | 11/2005 | Kim | 370/542 |
| 2005/0246759 A1* | 11/2005 | Yoshida | 725/138 |

FOREIGN PATENT DOCUMENTS

| | | |
|---|---|---|
| EP | 0905932 | 3/1999 |
| EP | 0952733 | 10/1999 |
| EP | 0964572 | 12/1999 |
| JP | 2000-032016 | 1/2000 |

\* cited by examiner

FIG.3

| Frequency band | Usage | Modulation technique |
|---|---|---|
| 5~130MHz | Out Of Band (OOB) Data exchange between head end and terminals | QPSK |
| 130~864MHz | In-band Ordinary television broadcasting including video and audio | QAM |

FIG.4

| Frequency band | Usage |
|---|---|
| 70~74MHz | Data transmission from head end 101 to terminal apparatuses |
| 10.0~10.1MHz | Data transmission from terminal apparatus A111 to head end 101 |
| 10.1~10.2MHz | Data transmission from terminal apparatus B112 to head end 101 |
| 10.2~10.3MHz | Data transmission from terminal apparatus C113 to head end 101 |

FIG.5

| Frequency band | Usage |
| --- | --- |
| 150~156MHz | Television channel 1 |
| 156~162MHz | Television channel 2 |
| ⋮ | ⋮ |
| 310~311MHz | Radio channel 1 |
| ⋮ | ⋮ |

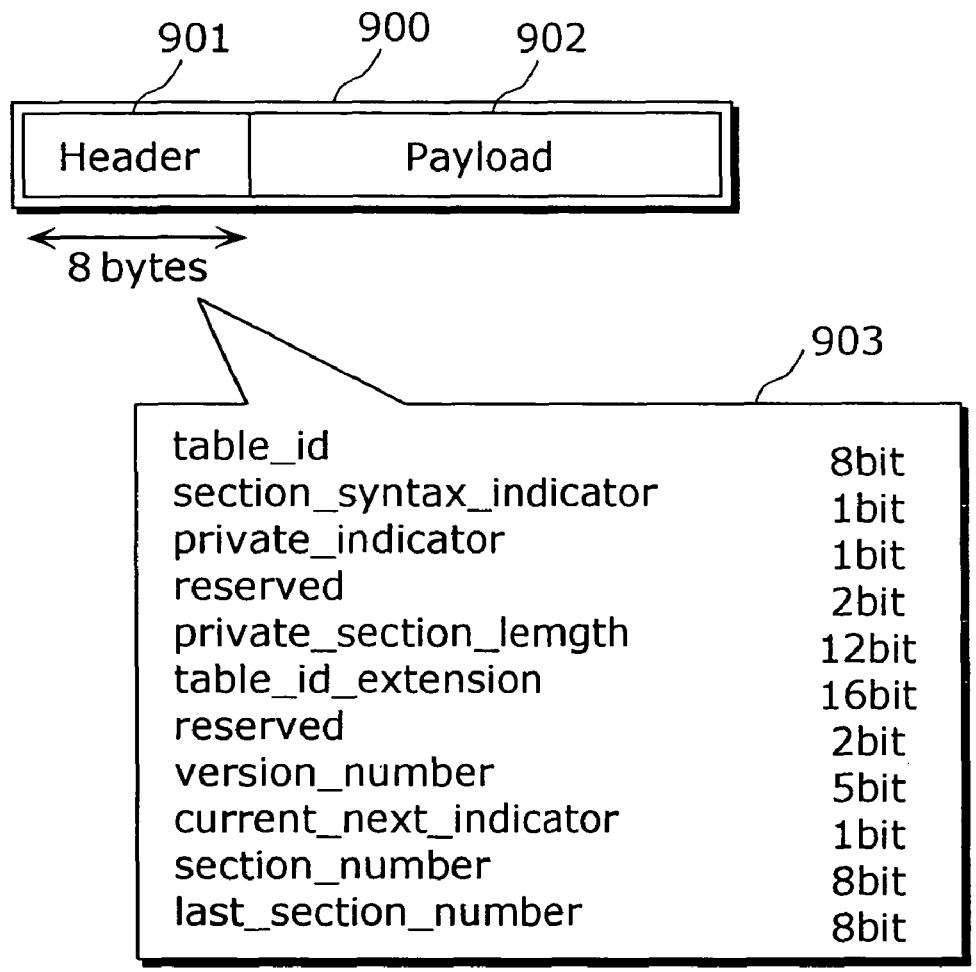

FIG.16
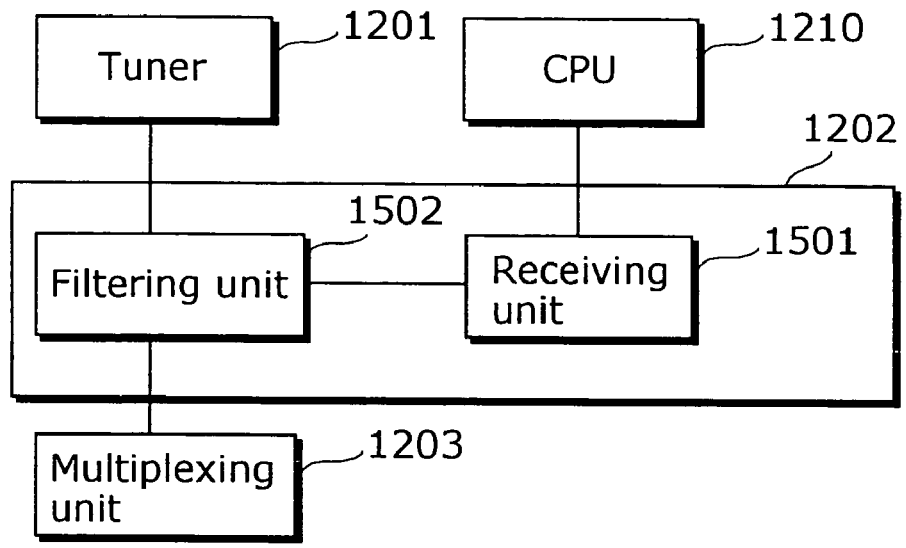
FIG.17
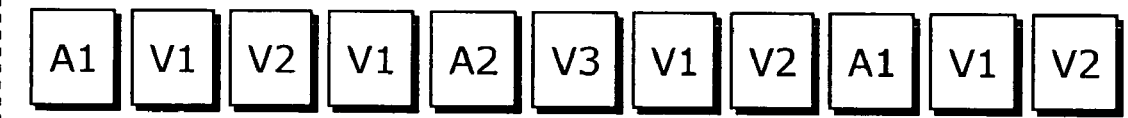
⇩ Select
[2]

FIG.50

| Specification method | PID | Program_NO | Setter attribute | Status |
|---|---|---|---|---|
| PID | 0xAAAA | 0x0000 | Application | Being set |
| Program_NO | 0xBBBB | 0x1111 | At its own | New |
| Program_NO | 0xCCCC | 0x2222 | At its own | Being set |
| ⋮ | ⋮ | ⋮ | ⋮ | ⋮ |

4901 4902 4903 4904 4905

| Query originator | Order of messages | |
|---|---|---|
| Adapter | [i]5101:Query | [ii]5102:Response |
| Terminal apparatus | [i]5102:Query | [ii]5101:Response |

FIG.56

| | 5301 | 5303 | 5504 |
|---|---|---|---|
| 5511 | LTSID | PID | Filtering |
| 5512 | [i] | 0xAAAA | Impossible |
| 5513 | [i] | 0xBBBB | Impossible |
| 5514 | [i] | 0xCCCC | Possible |
| 5515 | [ii] | 0xEEEE | Possible |

FIG.57

| | Query originator | Query format | Response format |
|---|---|---|---|
| 5611 | Adapter | FIG.54/FIG.55 /FIG.56 | Approval message |
| | | | FIG.54/FIG.55/FIG.56 |
| 5622 | Terminal apparatus | FIG.54/FIG.55 /FIG.56 | Approval message Format shown in FIG. 56 is also possible |
| | | | · FIG.54/FIG.55 · FIG.56 |

APPARATUS FOR RECEIVING BROADCAST SIGNAL

BACKGROUND OF THE INVENTION (1) Field of the Invention

The present invention relates to a broadcast signal receiving apparatus, and more particularly to a digital broadcast signal receiving apparatus that receives a plurality of transport streams.

(2) Description of the Related Art

A broadcast signal receiving apparatus uses a conditional access system in order to receive a pay-TV. Conventional conditional access systems include a system in which a transport stream received by a broadcast signal receiving apparatus is transmitted to a detachable conditional access descrambler apparatus which descrambles the transport stream protected by conditional access in order to provide access to such transport stream, and the resulting transport stream is returned to the broadcast signal receiving apparatus. This technology is standardized in detail in OpenCable (TM) HOST-POD Interface Specification (OC-SO-HOSTPOD-IF-112-030210). FIG. 1 is a diagram showing the construction of a broadcast signal receiving apparatus to which a conventional conditional access descrambler apparatus is attached. The conventional system is configured on the assumption that there exits one tuner 9501. In such system, a transport stream inputted to the tuner 9501 is directly provided to a conditional access descrambler apparatus 9511, which then descrambles such input transport stream protected by conditional access and provides the resulting stream to a TS decoder 9502. The TS decoder 9502 selects necessary information from the transport stream, and sends it to an AV decoder 9503. Out of the received information, the AV decoder 9503 sends audio data to a speaker 9504 and video data to a display 9505. The CPU 9506 controls each device. Information required by the CPU 9506 to operate is stored into a primary storage unit 9508 and a secondary storage unit 9507, as well as into a ROM 9509. Furthermore, these operations may be executed in response to commands from an input unit 9510.

In addition to the above, the following technique is disclosed in Japanese Patent application No. 11-118748: in order to share a result of conditional access among a broadcast signal receiving apparatus, a conditional access descrambler apparatus, and a digital multimedia device that are connected via an IEEE1394 serial bus, the bandwidth is reduced by removing data that is not necessary for the processing of the conditional access descrambler apparatus, when the broadcast signal receiving apparatus transmits a transport stream via the IEEE1394 serial bus.

However, with the conventional technology in which the broadcast signal receiving apparatus passes a received transport stream to the detachable conditional access descrambler apparatus, which then descrambles such transport stream protected by conditional access and returns the resultant to the broadcast signal receiving apparatus, there is a problem that a plurality of transport streams cannot be processed simultaneously in an appropriate manner.

SUMMARY OF THE INVENTION

When a plurality of transport streams are inputted in a communication between the above conventional broadcast signal receiving apparatus and conditional access descrambler apparatus, such transport streams are assumed to be simply inputted in multiplexed form. However, this method has a problem that high-priced hardware is required because the transfer rate between the broadcast signal receiving apparatus and the conditional access descrambler apparatus as well as the processing speed of the CPU become higher in proportion to the number of transport streams.

The present invention has been conceived in view of the above problem, and it is an object of the present invention to provide a broadcast signal receiving apparatus that is capable of simultaneously processing a plurality of transport streams in an appropriate manner by reducing the transfer rate by removing information that is not required for conditional access descrambling and the subsequent processes related to broadcasting functionality. In other words, the present invention aims at providing a broadcast signal receiving apparatus that enables such processing to be performed by use of inexpensive hardware. Note that the method according to the present invention is different from the conventional technique (Japanese Patent application No. 11-118748) in the following points: a communication between the broadcast signal receiving apparatus and the conditional access descrambler apparatus according to the present invention is not limited to the use of IEEE1394; and while the convention technique uses IEEE1394 for transmissions carried out between a plurality of external devices for the purpose of sharing the external device and the conditional access descrambler apparatus, the present invention limits the use of IEEE1394 for a communication between the receiving terminal apparatus and one external device.

In order to achieve the above object, the broadcast signal receiving apparatus according to the present invention is a broadcast signal receiving apparatus that receives a plurality of transport streams, comprising: a pre-processing unit operable to determine and extract a piece of viewing-related data from each of the plurality of transport streams by removing or separating, from the piece of viewing related data, data other than said viewing-related data; a multiplexing unit operable to multiplex the pieces of viewing-related data extracted by the pre-processing unit, and generate multiplexed data; an output interface unit operable to output the multiplexed data to an external device that is located outside the broadcast signal receiving apparatus; an input interface unit operable to obtain, from the external device, the multiplexed data processed by the external device; and a demultiplexing unit operable to demultiplex the multiplexed data obtained by the input interface unit.

Accordingly, it becomes possible to select and send only necessary data to the external device, and therefore to minimize the transfer rate between the broadcast signal receiving apparatus and the external device. As a result, it becomes possible to simultaneously process a plurality of transport streams in an appropriate manner by use of inexpensive hardware.

Furthermore, the pre-processing unit creates own information indicating each condition for extracting viewing-related data according to information held by the broadcast signal receiving apparatus, and determines the pieces of viewing-related data to be extracted, according to said own information.

Accordingly, it becomes possible for the broadcast signal receiving apparatus to determine information to be extracted or to be removed at its own discretion.

Moreover, the information held by the broadcast signal receiving apparatus is a current viewing status of a user, and the pre-processing unit creates the own information according to said viewing status of the user.

Accordingly, it becomes possible to set a condition that minimizes an affect on the user, according to a viewing status of such user.

Furthermore, the information held by the broadcast signal receiving apparatus is a preference of a user, and the pre-processing unit creates the own information according to said preference of the user.

Accordingly, it becomes possible to take into account priorities such as information about the language in which the user always views services.

Moreover, the pre-processing unit includes: a receiving unit operable to receive pre-processing information, for each of the transport streams, indicating a condition for extracting viewing-related data, and set a filtering condition, for each of the transport streams, indicating viewing-related data to be extracted, based on the own information and the pre-processing information; and a filtering unit operable to extract, from the transport streams, the pieces of viewing-related data indicated by the respective filtering conditions set by the receiving unit.

Accordingly, it becomes possible to select specified data from the transport streams.

Furthermore, each of the pre-processing information indicates, as the condition for extracting viewing-related data, at least one of a stream and a broadcast service that are included in each of the transport streams.

Accordingly, it becomes possible to specify packets or information making up a program, from necessary information included in the transport streams.

Moreover, the receiving unit receives each of the specified pre-processing information from a program running on a CPU.

Accordingly, it becomes possible to set, as a filtering condition, a condition requested by a program running on the CPU.

Furthermore, each of the filtering conditions indicates, as the viewing-related data to be extracted, at least one of a stream and a broadcast service included in each of the transport streams.

Accordingly, it becomes possible to perform filtering on a stream or service basis that has been specified.

Moreover, the pre-processing unit further includes a storage unit operable to hold a part or a whole of structure information of each of the transport streams indicating a structure of said each of the transport streams, and the receiving unit sets the filtering conditions using a part or the whole of the structure information of each of the transport streams held by the storage unit.

Accordingly, in the case where a specification is done by use of information indicating a stream, it becomes possible to trace and supplement other information by reference to structure information held by the storage unit. Meanwhile, in the case where a specification is done by use of information indicating a service, it is possible to use information included in the streams required for such service for reference purposes.

Furthermore, the storage unit obtains a part or the whole of the structure information from each of the transport streams and stores said obtained information in one of the following occasions: the broadcast signal receiving apparatus is activated; and the storage unit receives an instruction from the receiving unit.

Accordingly, it becomes possible to quickly obtain information when making reference to the storage unit.

Moreover, in the case where there is a change in a part or the whole of each of the structure information held by the storage unit, the receiving unit updates each of the filtering conditions according to said change.

Accordingly, it becomes possible to immediately respond to a change made in each stream. For example, when the CPU specifies information indicating a service, there is a possibility that information contained in a stream included in such service changes while being broadcast. An example of such change is that AV data is added to the stream as information about multi-angle and the like. Even in such case, if a specification is done by use of information indicating a service, it is possible to respond to a change made in the stream as described above by making a notification about such change.

Furthermore, in the case where the pre-processing information indicates, as the condition for extracting viewing-related data, a broadcast service included in each of the transport streams, the receiving unit converts the condition of the broadcast service into a condition of a stream related to said broadcast service.

Accordingly, it becomes possible to process a specification of broadcasting service just like when a stream is specified.

Moreover, when receiving each of the pre-processing information, the receiving unit specifies an external processing condition that is required for processing of the external device on the basis of a part or the whole of each of the structure information stored in the storage unit, and adds said external processing condition to the own information as the condition for extracting viewing-related data.

Accordingly, it becomes possible to add a condition that is necessary for the external device by reference to the pre-processing information.

Furthermore, in the case where each of the pre-processing information indicates, as the condition for extracting viewing-related data, a broadcast service included in each of the transport streams, the receiving unit specifies one or more or all of streams that constitute another broadcast service not indicated by each of the pre-processing information, on the basis of a part or the whole of each of the structure information held by the storage unit, and adds, to the own information, an indication that all, or one or more of said streams should be removed, as the condition for extracting viewing-related data.

Accordingly, it becomes possible to remove unnecessary information by a large amount.

Moreover, the pre-processing unit further includes a default setting storage unit operable to hold a default filtering condition, for each of the transport streams, indicating viewing-related data to be extracted when the broadcast signal receiving apparatus is activated, and when the broadcast signal receiving apparatus is activated, the filtering unit determines and extracts, from each of the transport streams, viewing-related data indicated by each of the default filtering conditions.

Accordingly, it becomes not necessary to make a setting that is always required every time the broadcast signal receiving apparatus is activated, and it becomes possible to set a filtering condition upon the activation of the broadcast signal receiving apparatus.

Furthermore, the receiving unit stores, into the default setting storage unit, each of the filtering conditions as the default filtering condition.

Accordingly, it becomes possible to change information stored in the default setting storage unit as well as to set a filtering condition upon the activation of the broadcast signal receiving apparatus.

Moreover, the receiving unit stores, into the default setting storage unit, a condition that is required for processing of the external device as the default filtering condition.

Accordingly, it becomes possible to process, at activation time, a setting for the external device that is always required, and to set, at execution time, only a condition that is dependent on a transport stream.

Furthermore, the pre-processing unit further includes a modification unit operable to rewrite information included in a stream in each of the transport streams.

Accordingly, when there exists another condition that has the same identifier as that of a condition selected from a plurality of transport streams, it is possible to change these identifiers as well as to change the structure information included in the transport streams according to such change of the identifiers. For example, it is possible to rewrite PIDs or rewrite a PAT and/or PMT as structure information.

Moreover, the modification unit rewrites one of the following: identification information to identify the stream in each of the transport streams; and structure information indicating a structure of the stream.

Accordingly, when there exists another condition that has the same identifier as that of a condition selected from a plurality of transport streams, it is possible to these identifiers as well as to change the structure information included in the transport streams according to such change of the identifiers. For example, it is possible to change rewrite PIDs or rewrite a PAT and/or PMT as structure information.

Furthermore, the receiving unit sets, to the filtering unit, identification information to identify the stream rewritten by the modification unit and modification information indicating details of said rewriting.

Accordingly, it becomes possible to change a rewritten packet with a specified packet in a stream.

Moreover, the filtering unit identifies the stream specified by the receiving unit based on the identification information, and rewrites the identification information or the structure information of said stream as instructed by the receiving unit.

Accordingly, it becomes possible to change a rewritten packet with a specified packet in a stream.

Furthermore, the pre-processing unit further includes a service information generation unit operable to generate service information from each of the transport streams.

Accordingly, it becomes possible to generate service information. This service information may be either an originally-defined information or information defined by a specification standard.

Moreover, the receiving unit receives each of the service information generated by the service information generation unit, and sets the received service information to the filtering unit.

Accordingly, it becomes possible to make a setting for adding the service information to each stream.

Furthermore, the filtering unit adds, as the viewing-related data to be extracted, a program to each of the filtering conditions, said program being indicated in each of the service information received from the receiving unit.

Accordingly, it becomes possible to make a setting for adding the service information to each stream.

Moreover, the filtering unit detects a discontinuity point in each of the transport streams, and inserts a packet at said discontinuity point.

Accordingly, it becomes possible to detect a discontinuity point in the selected transport stream.

Furthermore, the receiving unit receives each of the specified pre-processing information from the external device.

Accordingly, it becomes possible to set a condition specified by the external device.

Moreover, the receiving unit further sends a response to the external device concerning the condition indicated by each of the pre-processing information received from the external device.

Accordingly, it becomes possible to carry out bilateral message communications with the external device to perform a condition setting.

Furthermore, the information held by the broadcast signal receiving apparatus indicates at least one of said each condition for extracting viewing-related data and an attribute of a setter of said each condition.

Accordingly, it becomes possible to determine the own information based on a comparison of setting conditions or based on setter attribute.

Moreover, the attribute of the setter indicates one of a program running on a CPU, the external device, and the broadcast signal receiving apparatus.

Accordingly, it becomes possible to determine priorities among the above setter attributes and to use the determined priorities at the time of setting the own information.

Furthermore, the pre-processing unit searches for viewing-related data that satisfies said each condition indicated in the own information, and when no viewing-related data that satisfies said each condition is found within a specified period of time, makes an inquiry to the setter in order to remove said each condition, or removes said each condition without making any inquiries.

Accordingly, it becomes possible to remove a condition that is less effective even if it is set.

Moreover, in the case where the attribute of the setter indicates one of a program running on a CPU and the external device, the pre-processing unit sends a message to said setter.

Accordingly, it becomes possible not to produce a difference with a condition assumed by the setter.

Furthermore, the receiving unit specifies, as the information held by the broadcast signal receiving apparatus, one of the following information, and creates the own information according to said specified information: a maximum capacity that the external device can support; a maximum transfer rate of an interface between the broadcast signal receiving apparatus and the external device; and a maximum capacity of the broadcast signal receiving apparatus.

Accordingly, it becomes possible to perform a condition setting in consideration of each processing capacity.

Moreover, the receiving unit inquires the external device about the own information, and updates the own information according to a response to said inquiry received from the external device.

Accordingly, it becomes possible to prevent information that is necessary for processing of the external device from being removed.

Furthermore, the multiplexing unit includes: a rewrite unit operable to rewrite a packet included in each of the pieces of viewing-related data, in order to identify each of the transport streams from which said pieces of viewing-related data have been extracted by the pre-processing unit; and a multiplexing execution unit operable to multiplex the pieces of viewing-related data rewritten by the rewrite unit.

Accordingly, it becomes possible to identify each of the plurality of transport streams without needing to change the size of packets included in the input transport streams.

Moreover, the rewrite unit rewrites a part or a whole of an unused field included in each of the pieces of viewing-related data.

Accordingly, it becomes possible to identify each of the plurality of transport streams without needing to change the size of packets included in the input transport streams. In the case of MPEG2 transport streams, for example, it is possible to rewrite a RESERVE field in each of a PAT or a PMT.

Furthermore, the rewrite unit rewrites a part or a whole of each of the packets.

Accordingly, it becomes possible to identify each of the plurality of transport streams without needing to change the size of packets included in the input transport streams. In the case of MPEG2 transport streams, for example, it is possible to add, to all the TS packets, information to identify their transport streams.

Moreover, the multiplexing execution unit performs time-division multiplexing on the pieces of viewing-related data rewritten by the rewrite unit.

Accordingly, it becomes possible to handle more than one viewing-related data as a single stream, as well as to obtain a multiplexed stream.

Furthermore, the multiplexing unit includes: a header addition unit operable to add a header to each of the pieces of viewing-related data in order to identify each of the transport streams from which said pieces of viewing-related data have been extracted by the pre-processing unit; and a multiplexing execution unit operable to multiplex the pieces of viewing-related data to which the headers have been added by the header addition unit.

Accordingly, it becomes possible to perform a setting for identifying each of the plurality of transport streams and to multiplex the data added with headers.

Moreover, the demultiplexing unit identifies each of the transport streams based on the headers added by the header addition unit, and demultiplexes the multiplexed data according to a result of said identification.

Accordingly, it becomes possible to perform a condition setting in consideration of each processing capacity.

Furthermore, the multiplexing unit corrects time-related information included in the multiplexed data according to how the multiplexed data has been multiplexed.

Accordingly, it becomes possible to minimize the time lag of a standard time known as PCR, for example.

Moreover, the multiplexing unit multiplexes the pieces of viewing-related data extracted by the pre-processing unit in response to a specification of priorities.

Accordingly, it becomes possible to make a setting so as to minimize an effect of packet loss or packet delivery delay that occurs when the total of transfer rates of multiplexed data is higher than the transfer rate between the broadcast signal receiving apparatus and the adapter.

Furthermore, the demultiplexing unit makes a conversion of the pieces of the viewing-related data demultiplexed from the multiplexed data.

Accordingly, it becomes possible to utilize conventional devices as devices post-connected to the demultiplexing unit.

Moreover, the demultiplexing unit identifies each of the transport streams based on the headers added by the header addition unit, and demultiplexes the multiplexed data according to a result of said identification.

Accordingly, it becomes possible to demultiplex the multiplexed data in an appropriate manner.

Moreover, the above broadcast signal receiving apparatus further comprises a negotiation unit operable to negotiate with the external device about a method for outputting the multiplexed data to the external device, and the output interface unit outputs the multiplexed data according to said negotiated method.

Accordingly, it becomes possible to perform conditional access descrambling in consideration of the processes performed by the pre-processing unit and the multiplexing unit. For example, it becomes possible to have a negotiation to determine which one of the following methods should be employed for making a selection from among a plurality of transport streams: rewriting data contained in packets; and adding a header to packets. Furthermore, it becomes also possible to negotiate about how the pre-processing unit has selected the transport streams.

Furthermore, a conditional access descrambler apparatus according to the present invention is a conditional access descrambler apparatus that descrambles a plurality of transport streams that are broadcast in a scrambled form to allow only a limited user to view content included in each of said transport streams, the apparatus comprising: an input interface unit operable to obtain multiplexed data that is obtained by extracting a piece of viewing-related data from each of the plurality of transport streams and by multiplexing the extracted pieces of viewing-related data; an identification unit operable to identify each of the pieces of viewing-related data included in the multiplexed data obtained by the input interface unit; a conditional access descrambling unit operable to descramble said each of the pieces of viewing-related data identified by the identification unit; and an output interface unit operable to output the multiplexed data, the pieces of viewing-related data of which have been descrambled by the conditional access descrambling unit.

Accordingly, it becomes possible to process, in an appropriate manner, the multiplexed data obtained by multiplexing selected pieces of data, as well as to return a result of the process performed by the conditional access descrambler apparatus to the broadcast signal receiving apparatus.

Furthermore, the above conditional access descrambler apparatus further comprises a negotiation unit operable to negotiate with a source device, from which the input interface unit obtains the multiplexed data, about a method for obtaining the multiplexed data, and the input interface unit obtains the multiplexed data according to said negotiated method.

Accordingly, it becomes possible to perform conditional access descrambling in consideration of the processes performed by the pre-processing unit and the multiplexing unit. For example, it becomes possible to have a negotiation to determine which one of the following methods should be employed for making a selection from among a plurality of transport streams: rewriting data contained in packets; and adding a header to packets. Furthermore, it becomes also possible to negotiate about how the pre-processing unit has selected the transport streams.

Moreover, the above conditional access descrambler apparatus further comprises a notification unit operable to notify a broadcast signal receiving apparatus of at least one of the following: a capacity of the conditional access descrambler apparatus for processing each of the viewing-related data; viewing-related data to be extracted; viewing-related data not to be extracted; and a multiplexing method that the conditional access descrambler apparatus can support.

Accordingly, it becomes possible to notify the broadcast signal receiving apparatus of a condition of data at the time of transmitting data from the broadcast signal receiving apparatus to the conditional access descrambler apparatus.

Furthermore, the above conditional access descrambler apparatus further comprises a request response unit operable to respond to a request from a destination device to which the output interface unit outputs the multiplexed data.

Accordingly, it becomes possible for the broadcast signal receiving apparatus and the conditional access descrambler apparatus to carry out bilateral message communications.

Note that not only is it possible to embody the present invention as the above broadcast signal receiving apparatus and conditional access descrambler apparatus, but also as methods used by these apparatuses to perform their operations, as well as programs that cause a computer to execute such operations and as a recording medium that stores such programs.

The disclosure of Japanese Laid-Open Patent Application No. 2003-365656 filed on Oct. 27, 2003 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 3 is a table showing an example use of frequency bands in a cable television system according to the present invention for communications between a broadcasting station system and each terminal apparatus;

FIG. 4 is a table showing another example use of frequency bands in the cable television system according to the present invention for communications between the broadcasting station system and each terminal apparatus;

FIG. 5 is a table showing further another example use of frequency bands in the cable television system according to the present invention for communications between the broadcasting station system and each terminal apparatus;

FIG. 10 is a diagram showing a structure of an MPEG2 section defined in the MPEG2 standard;

FIG. 11 is a diagram showing an example use of MPEG2 sections defined in the MPEG2 standard;

FIG. 16 is a block diagram showing an example internal construction of the pre-processing unit included in the broadcast signal receiving apparatus according to the present invention;

FIG. 17 is a diagram for explaining an example of how packets are outputted from a tuner and the pre-processing unit;

FIG. 50 is a diagram showing an example of a setting list;

FIG. 56 is a diagram for explaining a message format in the case where a setting is made about whether filtering is possible or not;

FIG. 57 is a diagram showing an example use of message formats between the terminal apparatus and the adapter.

DESCRIPTION OF THE PREFERRED EMBODIMENTS

First Embodiment

The present invention is assumed to be applicable to three types of broadcasting systems: satellite system, terrestrial system, and cable system. In the satellite system, a broadcast signal is transmitted to a broadcast signal receiving apparatus via satellite. In the terrestrial system, a broadcast signal is transmitted to a broadcast signal receiving apparatus by use of a terrestrial signal transmission apparatus. In the cable system, a broadcast signal is transmitted to a broadcast signal receiving apparatus by use of a cable head end. Note that it is possible to carry out the present invention regardless of broadcasting system, since the differences among these broadcasting systems are not directly related to the present invention.

A preferred embodiment of a broadcasting system according to the present invention is described with reference to the drawings.

Figure 1:
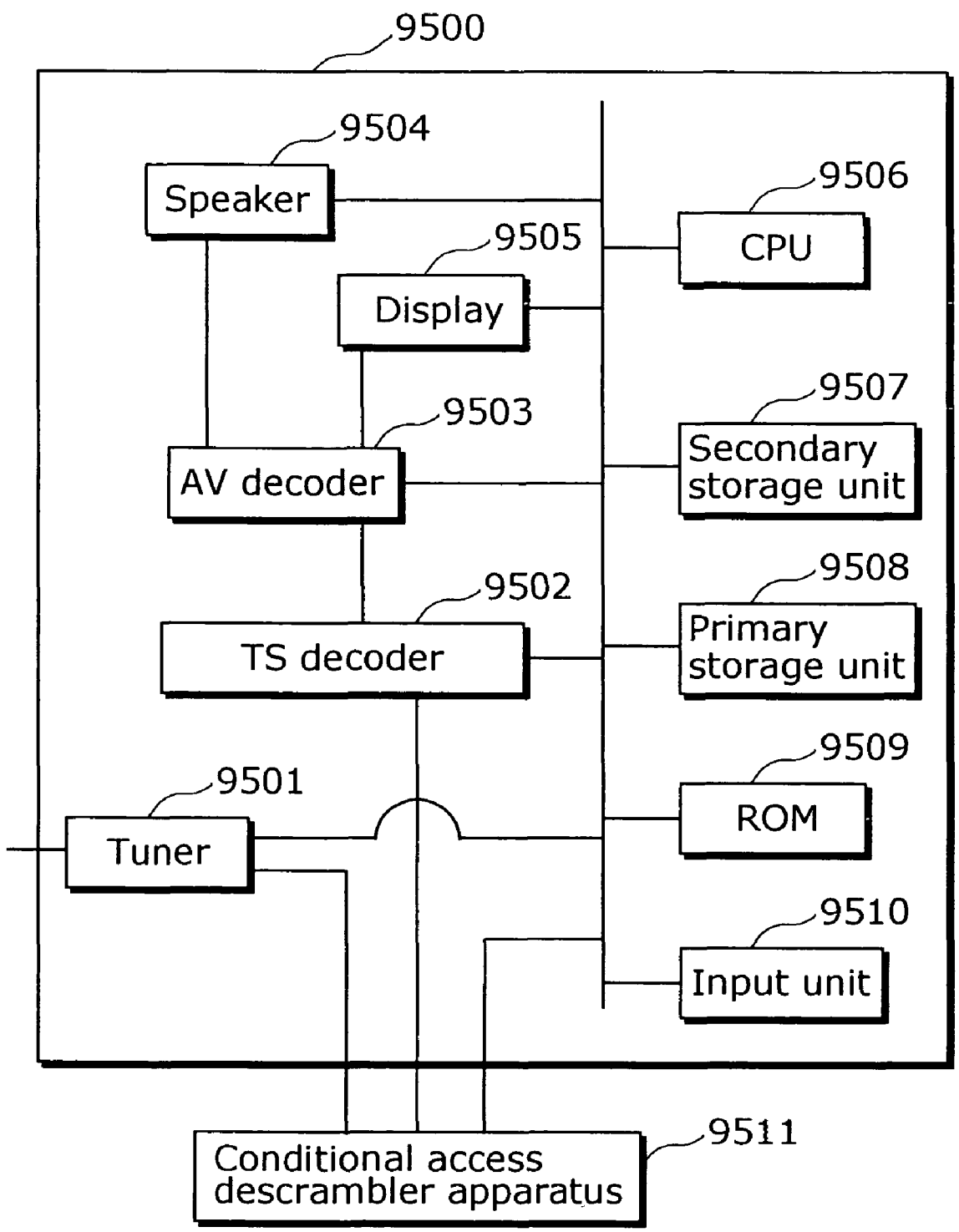
FIG. 1 is a block diagram showing the construction of a broadcast signal receiving apparatus to which a conventional conditional access descrambler apparatus is attached.
Figure 2:
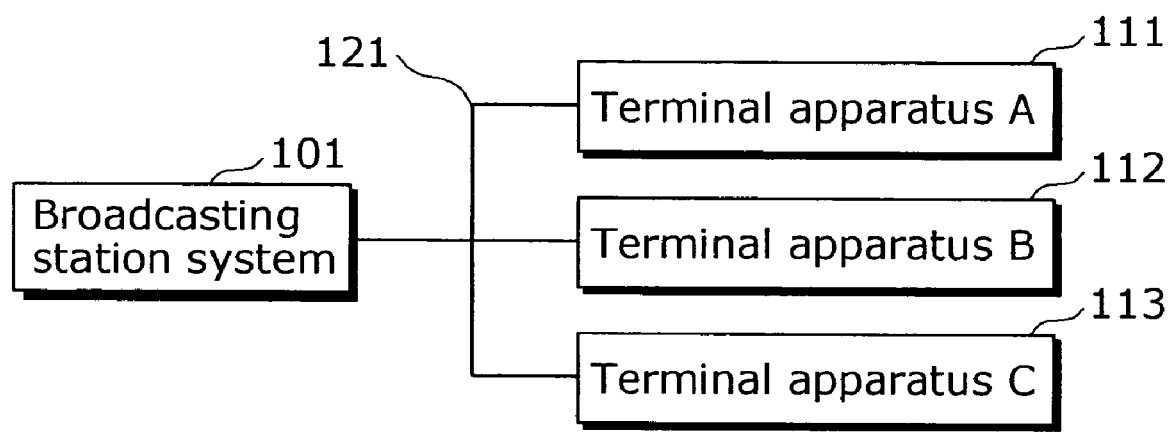
FIG. 2 is a block diagram showing a broadcasting system according to the present invention.

FIG. 2 is a block diagram showing a relationship among apparatuses composing the broadcasting system, which are a broadcasting station system 101 and three terminal apparatuses A111, B112, and C113. A connection 121 between the broadcasting station system and each of the terminal apparatus can be either wired or wireless. For example, in the cable system, the broadcasting station system and each of the terminal apparatuses are connected by wire. In the satellite and terrestrial systems, there is no wired connection between the broadcasting station system and each of the terminal apparatuses in the downstream direction (from the broadcasting station system to each of the terminal apparatus), and a broadcast signal is transmitted by radio waves. As for the upstream direction (from each of the terminal apparatus to the broadcasting station system), connections can be both wired (e.g. telephone line, cable Internet) and wireless (radio communication), and each of the terminal apparatuses sends user inputs and other information to the broadcasting station system by either type of connection. In the present embodiment, three terminal apparatuses are connected to one broadcasting station system, but it is also possible to carry out the present invention if an arbitrary number of terminal apparatus are connected to the broadcasting station system.

The broadcasting station system 101 transmits, to a plurality of terminal apparatus, broadcast signals that include information such as video, audio, and data for data broadcasting. Broadcast signals are transmitted in accordance with the operating requirements of each broadcasting system, as well as by using frequencies within a frequency range that is defined by the law of each country/region where each broadcasting system is in operation.

Here, a description is given of an example of broadcast signal transmission requirements for the cable system. In the cable system according to this example, frequency bands are divided for use of broadcast signal transmission, based on the data contents and direction of signal transmission (upstream or downstream).

FIG. 3 is a table showing an example of divided frequency bands. There are roughly two types of frequency bands: Out of Band (to be abbreviated as OOB) and In-Band. A frequency band of 5-130 MHz is allocated to OOB to be mainly used for data exchange between the broadcasting station system 101, and the terminal apparatus A111, the terminal apparatus B112, and the terminal apparatus C113. A frequency band of 130 MHz-864 MHz is allocated to In-Band to be mainly used for broadcast channels including video and audio. QPSK is employed for OOB, whereas QAM64 or QAM256 is employed for In-Band as modulation techniques. A detailed explanation of modulation techniques is omitted here, since they are publicly known techniques which are less related to the present invention.

FIG. 4 shows a more specific example of how the OOB frequency band is used. A frequency band of 70 MHz-74 MHz is used to transmit data from the broadcasting station system 101. In this case, all of the terminal apparatus A111, the terminal apparatus B112, and the terminal apparatus C113 receive the same data from the broadcasting station system 101. Meanwhile, a frequency band of 10.0 MHz-10.1 MHz is used to transmit data from the terminal apparatus A111 to the broadcasting station system 101. A frequency band of 10.1 MHz-10.2 MHz is used to transmit data from the terminal apparatus B112 to the broadcasting station system 101. A frequency band of 10.2 MHz-10.3 MHz is used to transmit data from the terminal apparatus C113 to the broadcasting station system 101. Accordingly, it becomes possible to transmit data unique to each terminal apparatus to the broadcasting station system 101 from the respective terminal apparatuses A111, B112, and C113.

FIG. 5 shows an example use of the In-Band frequency band. Frequency bands of 150-156 MHz and 156-162 MHz are allocated respectively to a television channel 1 and a television channel 2, and the subsequent frequencies are allocated to television channels at 6 MHz intervals. 310 MHz and the subsequent frequencies are allocated to radio channels at 1 MHz intervals. Each of the above channels may be used either for analog broadcasting or digital broadcasting. In the case of digital broadcasting, data is transmitted in the transport packet format compliant with the MPEG2 specification, in which case various types of data for data broadcasting can be transmitted, in addition to audio and video data.

The broadcasting station system 101 is equipped with a QPSK modulation unit, a QAM modulation unit, and the like in order to transmit suitable broadcast signals to the terminal apparatuses using the above frequency bands. Moreover, the broadcasting station system 101 is equipped with a QPSK demodulation unit for receiving data from the terminal apparatuses. Also, it is conceivable that the broadcasting station system 101 is further equipped with various devices related to the above modulation units and demodulation unit. However, a detailed explanation of them is omitted here, since the present invention is mainly related to the terminal apparatuses.

The terminal apparatus A111, the terminal apparatus B112, and the terminal apparatus C113 receive and reproduce broadcast signals transmitted from the broadcasting station system 101. Furthermore, the terminal apparatus A111, the terminal apparatus B112, and the terminal apparatus C113 transmit data unique to each terminal apparatus to the broadcasting station system 101. In the present embodiment, these three terminal apparatuses shall have the same construction.

Note that a detailed example related to the operation of the cable system is described in the present example, but the present invention is also applicable to satellite and terrestrial systems as well as other types of cable systems. In the satellite and terrestrial systems, the broadcasting station system and each of the terminal apparatuses are connected by wire or wirelessly as described above, and frequency bands, frequency intervals, modulation techniques, configuration of the broadcasting station system differ depending on the type of each broadcasting system and its operation. However, their differences are not related to the present invention, and therefore the present invention is applicable regardless of the definition of each broadcasting system.

The broadcasting station system 101 modulates a transport stream and transmits a broadcast signal that carries the resulting transport stream. Each of the terminal apparatuses receive the broadcast signal, demodulates the broadcast signal to obtain the original transport stream, and extracts necessary information from the such transport stream for use. As the data format of the transport stream, it is possible to use, for example, the MPEG2 transport stream format that is used for digital broadcasting and other purposes. In order to provide descriptions about data transmission between devices in a digital broadcast signal receiving apparatus (terminal apparatus) and a detachable adapter, a brief description is first given here of the structure of an MPEG2 transport stream.

Figure 6:
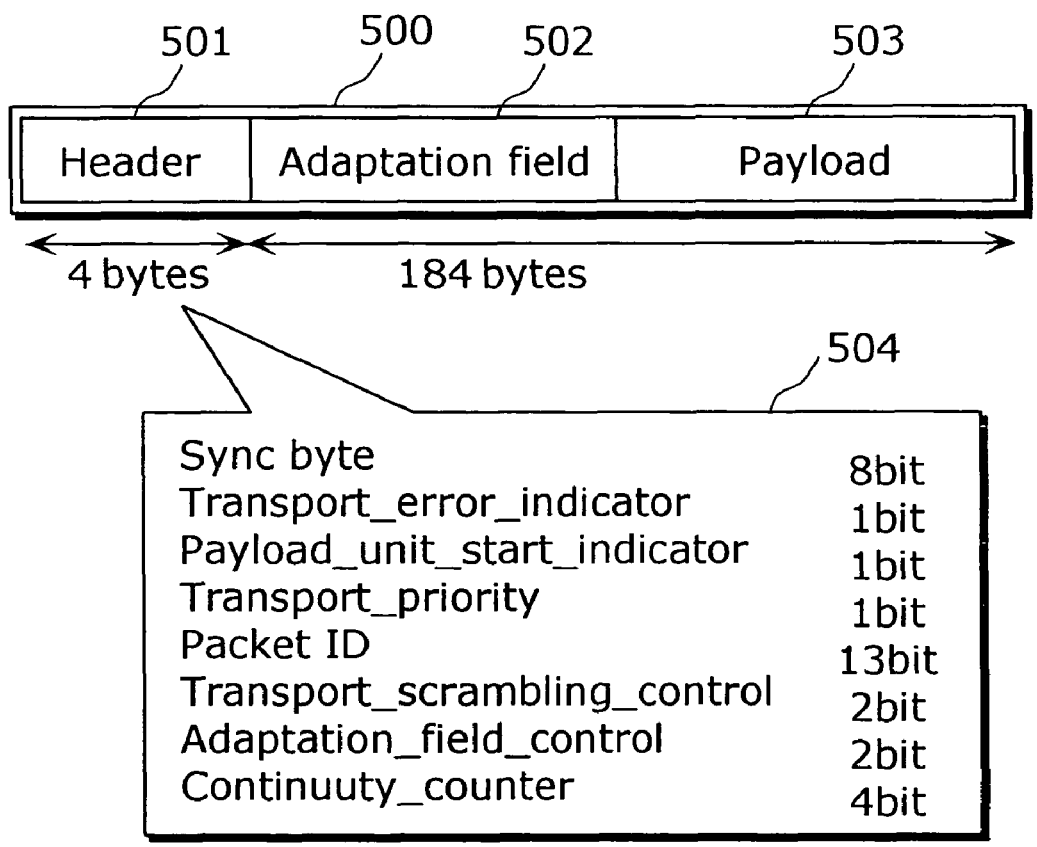
FIG. 6 is a diagram showing a structure of a TS packet defined in the MPEG2 standard.

FIG. 6 is a diagram showing the structure of a TS packet. A TS packet 500, which is 188 byte-long, is made up of a header 501, an adaptation field 502, and a payload 503. The header 501, which holds control information for this TS packet, is a 4 byte-long region whose breakdown is as represented as 504. The header 501 includes field indicated as a "Packet ID (hereinafter referred to as "PID")" whose value is used to identify this TS packet. The adaptation field 502 holds additional information such as time information. Note that the adaptation field 502 is not an integral constituent element and therefore that there is a case where no adaptation field is included in a TS packet. The payload 503 holds information to be carried in the TS packet such as video/audio data and data for data broadcasting.

Figure 7:
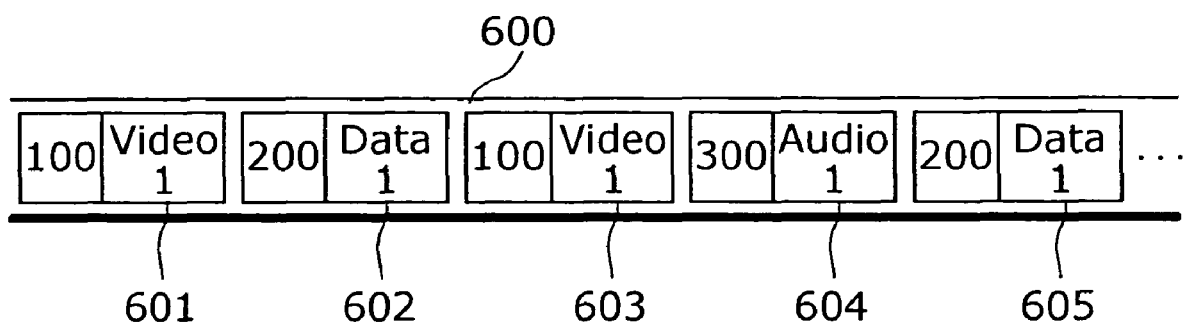
FIG. 7 is a schematic diagram showing an MPEG2 transport stream.

FIG. 7 is a schematic diagram showing an MPEG2 transport stream. A TS packet 601 and a TS packet 603 each include a PID 100 in their headers as well as information related to video 1 in their payloads. A TS packet 602 and a TS packet 605 each include a PID 200 in their headers as well as information related to data 1 in their payloads. A TS packet 604 includes a PID 300 in its header as well as information related to audio 1 in its payload.

The MPEG2 transport stream 600 is composed of consecutive packets just like the TS packets 601-605. Each TS packet holds, in its payload, a variety of information such as video and audio as well as data for data broadcasting. The broadcast signal receiving apparatus receives the TS packets, and by extracting information held by each of these TS packets, reproduces video and audio and uses data such as service information. TS packets with the same PID hold the same type of information. In FIG. 7, the TS packet 601 and the TS packet 603 carry information related to video 1, whereas the TS packet 603 and the TS packet 605 carry information related to data 1.

Figure 8:
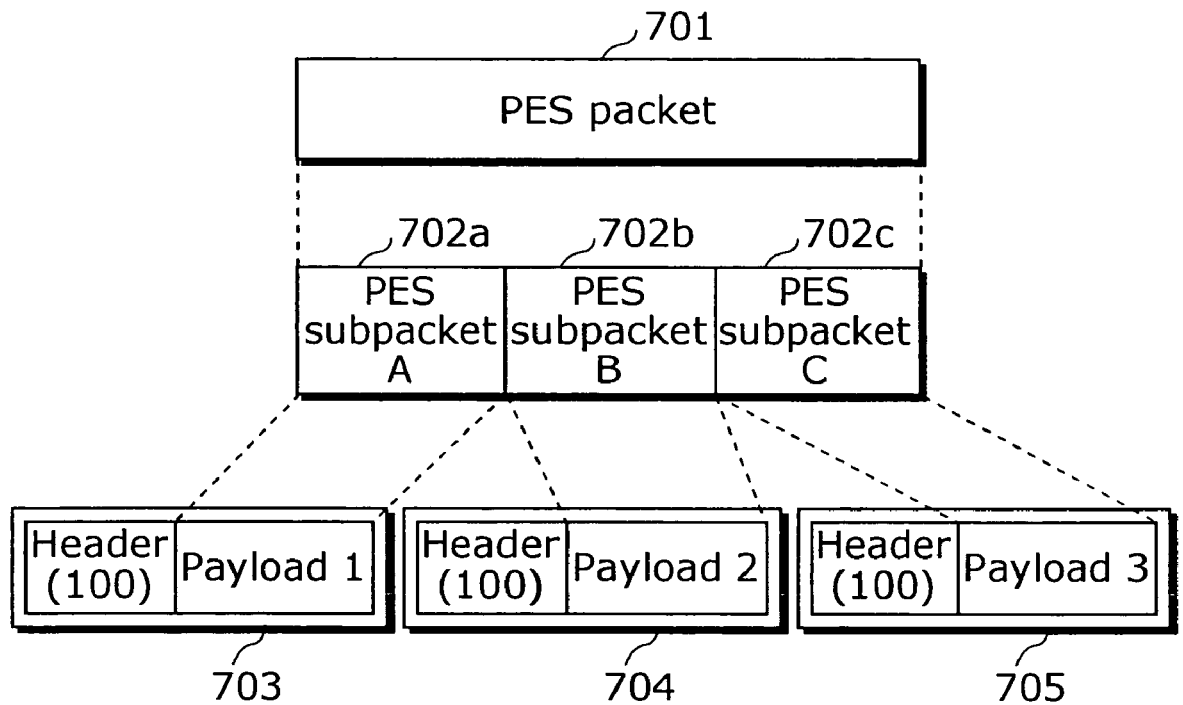
FIG. 8 is a diagram showing an example of how a PES packet defined in the MPEG2 standard is divided when it is carried in TS packets.

Video and audio are represented in the format known as packetized elementary stream (PES) packet. When transmitted, a PES packet is divided into subpackets to be stored in TS packets. FIG. 8 shows an example of how a PES packet is divided when it is transmitted. Since the PES packet 701 is too large to be carried in the payload of one TS packet, it is divided into a PES subpacket A702*a*, a PES subpacket B702*b*, and a PES subpacket C702*c*. These PES subpackets are carried in three TS packets 703-705 with the same PID.

A portion that is formed by extracted TS packets with the same PID is referred to as an elementary stream (ES). Note that a PES packet is also formed of a header and a payload. Compressed video data (VIDEO_ES), compressed audio data (AUDIO_ES) and subtitle data are stored in the payloads of PES packets.

Figure 9:
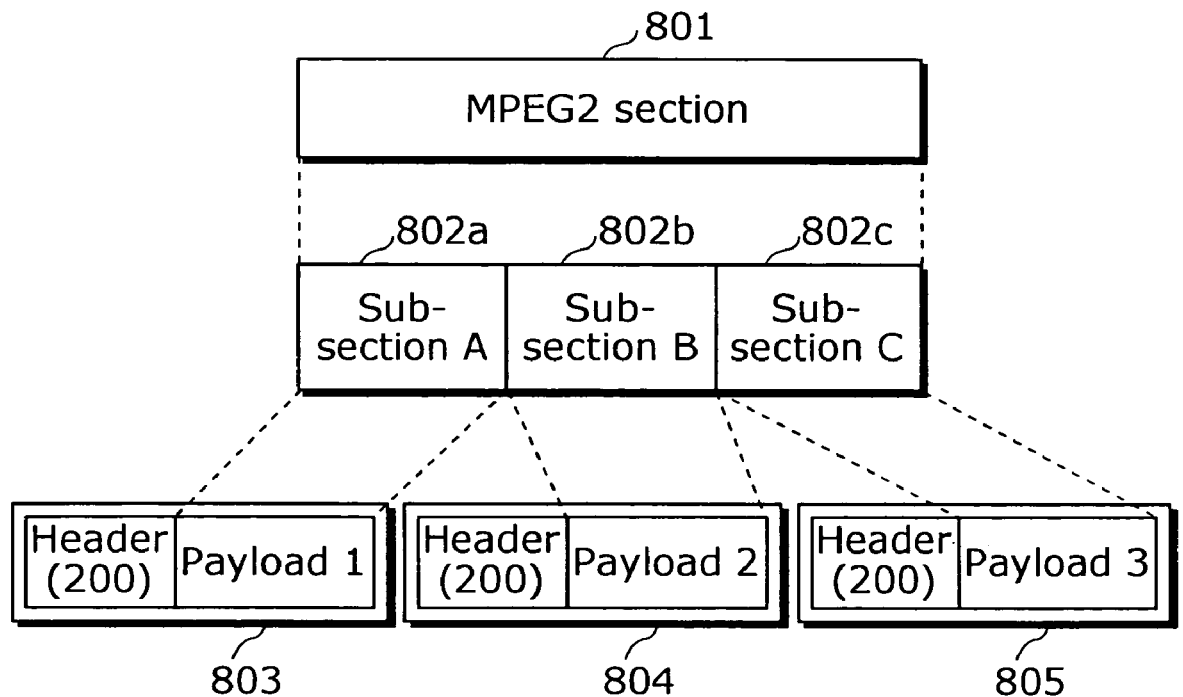
FIG. 9 is a diagram showing an example of how an MPEG2 section defined in the MPEG2 standard is divided when it is carried in TS packets.

Information such as service information and data for data broadcasting are represented in the format known as MPEG2 section. When actually transmitted, an MPEG2 section is divided into sub-sections to be stored in TS packets. FIG. 9 shows an example of how an MPEG2 section is divided when it is transmitted. Since the MPEG2 section 801 is too large to be carried in the payload of one TS packet, it is divided into a sub-section A802*a*, a sub-section B802*b*, and a sub-section C802*c*. These sub-sections are carried in three TS packets 803-805 with the same PID.

FIG. 10 shows the structure of an MPEG2 section. An MPEG2 section 900 is formed of a header 901 and a payload 902. The header 901 holds control information for this MPEG2 section. The breakdown of this header 901 is represented as shown as a header structure 903. The payload 902 holds data to be carried in the MPEG2 section 900. In the header structure 903, table_id represents the type of the MPEG2 section and table_id_extension is an external identifier that is used to distinguish this MPEG2 section from other MPEG2 sections with the same table_id. FIG. 11 shows an example use of MPEG2 sections in the case where service information is transmitted. In this example, as described in a line 1004, information that is required to demodulate a broadcast signal is carried in an MPEG2 section whose table_id in the header structure 903 is 64, and such MPEG2 section is carried in a TS packet with the PID of 16. Note that regarding a section too, a collection of extracted packets with the same PID can be referred to as an ES that carries the MPEG2 section 801.

There is a notion of program in an MPEG2 transport stream. A program, which is represented as a collection of ESs, is used when a plurality of ESs are wished to be handled collectively. The use of a program makes it possible to handle video and audio, as well as data for data broadcasting that accompanies such video and audio in a collective manner. For example, when collectively handling video and audio that are wished to be reproduced simultaneously, it becomes possible for the broadcast signal receiving apparatus to know that two ESs should be simultaneously reproduced by integrating, as a program, an ES that carries PES packets storing video and an ES that carries PES packets storing audio. In order to represent such program, two types of tables known as Program Map Table (PMT) and Program Association Table (PAT) are used in MPEG2. Refer to ISO/IEC13818-1, the "MPEG2 Systems" specification for details about these tables. Here, a program is hereinafter referred to as a "service" in order to avoid linguistic confusions. Also, some of the sections include program specification information known as "PSI", other than PMT and PAT. PSI comes in the following four types:

Program Association Table (PAT): describes the PIDs or the like of each PMT in a transport stream. Only one PAT is included in a transport stream;

Program Map Table (PMT): exists on a service-by-service basis to specify the PID of each of ESs making up a service;

Conditional Access Table (CAT): specifies the PID of an Entitlement Management Message (EMM: personal information of a subscriber. It includes the key for scrambling) intended for controlling a pay-tv; and Network Information Table (NIT): includes information, such as modulation frequency, for associating information about the transmission path with a broadcasting service. Refer to the operating requirements for its details.

Furthermore, there also exist other tables that carry information other than PSI and PSI-related detailed information by representing transmission control signals other than PSI in the form of Service Information (SI). The definitions of these tables differ depending on broadcasting standard. For example, their details are described in the ARIB standard of Japan, the DVB-MHP standard of the European digital broadcasting standard, and in OCAP of American cable broadcasting.

Figure 12:
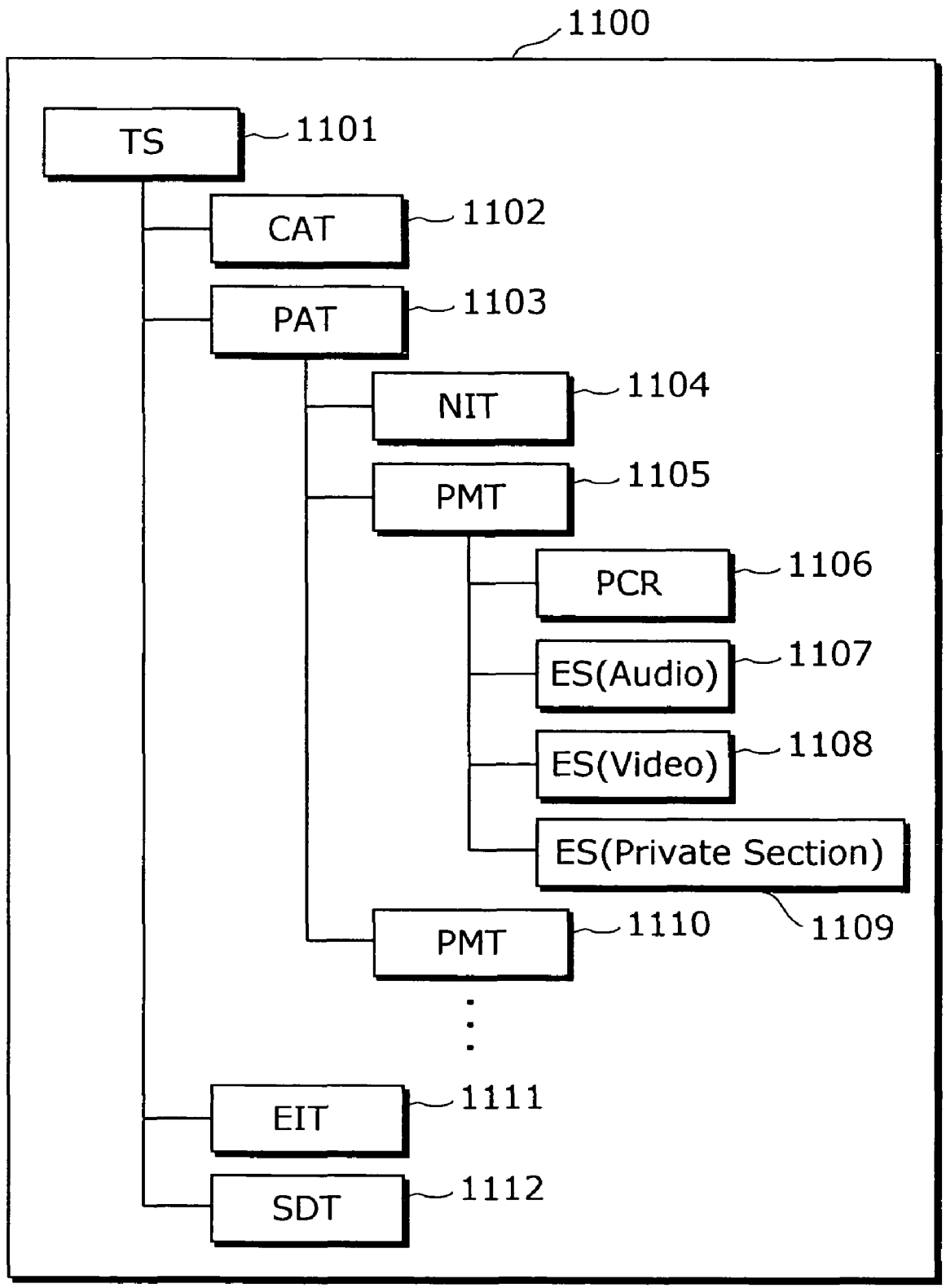
FIG. 12 is a diagram showing an example hierarchy structure of packets defined in the MPEG2 standard and operating requirements.

FIG. 12 shows an example hierarchy structure of a section, PES packets, ES information and others. A TS 1101, which indicates a transport stream, includes a CAT 1102 and a PAT 1103. The PAT 1103 defines a NIT 1104 indicating network information and a plurality of PIDs of a PMT 1105 that represents service information. The PAT 1103 further defines a plurality of services and includes the PIDs of each PMT such as 1105 and 1110. The following exits in the PMT 1105: an audio ES 1107 and a video ES 1108 that constitute the service; a Program Clock Reference (PCR) 1106 that indicates the time based on which the service is provided; and a unique section that is carried as a private section 1109. Information about an application and the like is carried in the private section 1109.

An example application is a file described in the BML language in the case of ARIB of Japan, and a Class file that is in Java executable form in the case of DVB-MHP and OCAP of America. As described above, an MPEG2 transport stream has a hierarchy structure for carrying various types of information. The broadcast signal receiving apparatus extracts information contained in an MPEG2 transport stream carried in a broadcast signal by tracing the hierarchy structure of such MPEG2 transport stream. Note that the TS 1101 also includes information that cannot be traced from the PAT 1103 and the PMT 1105, such as an Event Information Table (EIT) 1111 and a Service Description Table (SDT) 1112.

The following an assumption based on which the present embodiment is carried out.

Figure 13:
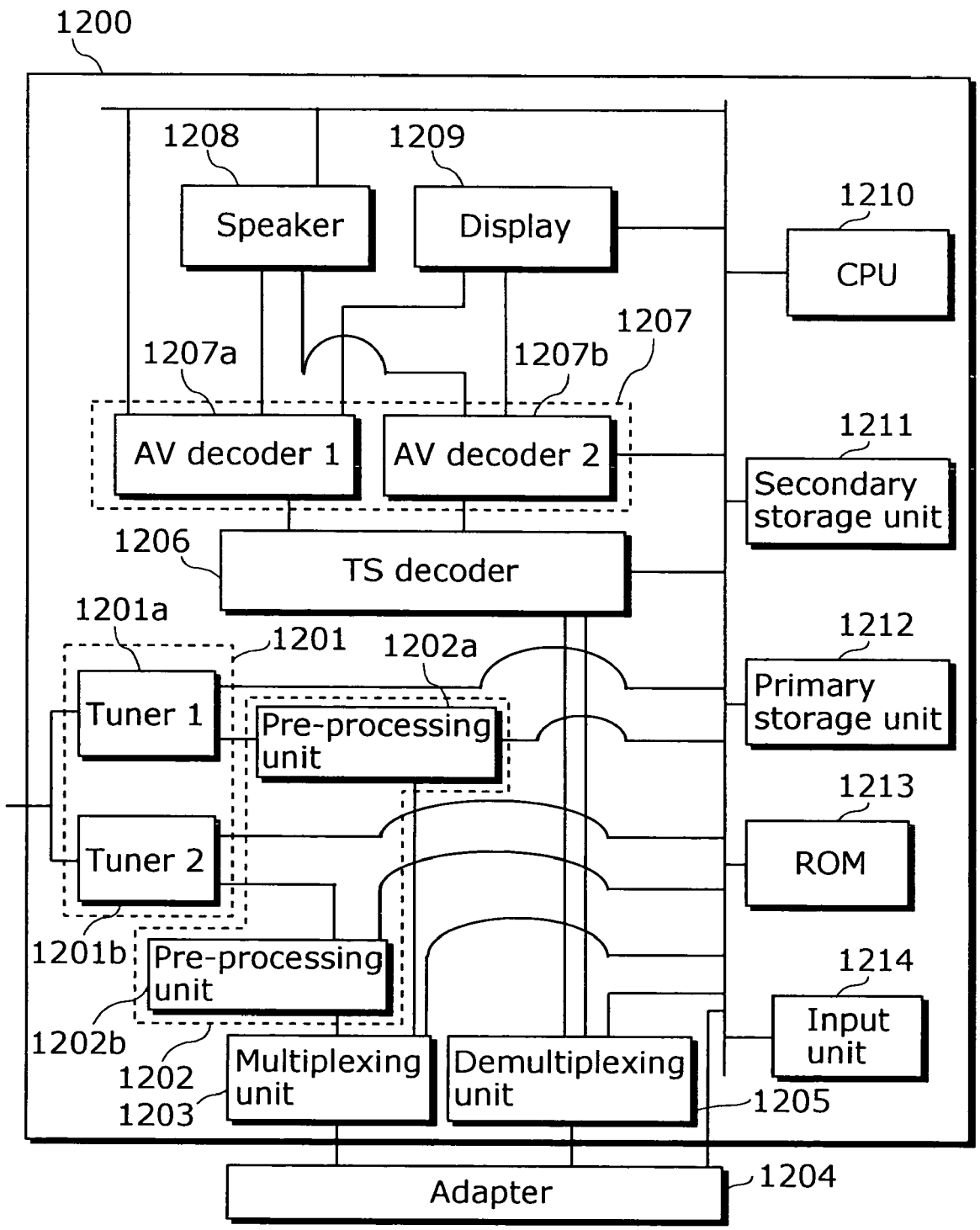
FIG. 13 is a block diagram showing an example hardware construction of the broadcast signal receiving apparatus according to the present invention.

FIG. 13 is a block diagram showing the hardware construction of the digital broadcast signal receiving apparatus. Note that this drawing illustrates an example in which there exist two tuners and AV decoders because of the reason that the digital broadcast signal receiving apparatus according to the present embodiment is constructed to receive one or more transport streams, but the present invention is applicable regardless of these numbers. Also, in this hardware construction, the number of PES packets to be outputted from the TS decoder 1206 to the AV decoders 1207 is two, but the present invention is applicable regardless of this number. Furthermore, the present invention is also applicable if there are a plurality of TS decoders 1206.

The broadcast signal receiving apparatus 1200 in FIG. 13 is comprised of tuners 1201 (1201a and 1201b), pre-processing units 1202 (1202a and 1202b), a multiplexing unit 1203, an adapter 1204, a demultiplexing unit 1205, a TS decoder 1206, an AV decoder 1207, a speaker 1208, a display 1209, a CPU 1210, a secondary storage unit 1211, a primary storage unit 1212, a ROM 1213, and an input unit 1214. Note that the adapter 1204 can be attached to/detached from the terminal apparatus 1200. The tuner 1201 collectively refers to two tuners 1201a and 1201b. The pre-processing unit 1202 collectively refers to two pre-processing unit 1202a and 1202b. The AV decoder 1207 collectively refers to two AV decoders 1207a and 1207b. Note that it is possible to carry out the present invention regardless of whether there are one or more tuners 1201, pre-processing units 1202, and AV decoders 1207.

Figure 14:
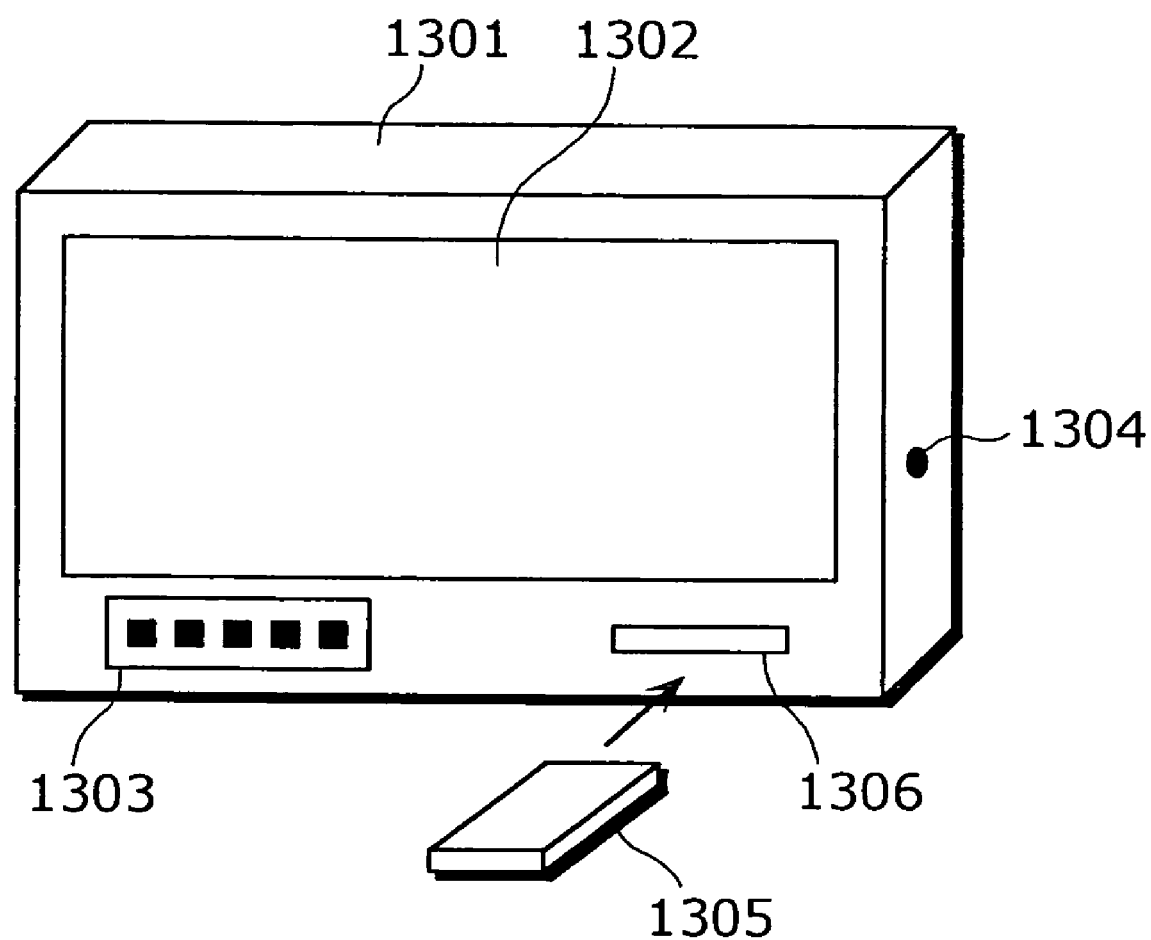
FIG. 14 is a diagram showing an example external view of the broadcast signal receiving apparatus according to the present invention.

FIG. 14 shows a thin-shaped television, which is an example external view of the terminal apparatus 1200.

A steel case 1301 of the thin-shaped television contains all components of the terminal apparatus 1200 except for the adapter 1204.

A display 1302 corresponds to the display 1209 in FIG. 13.

A front panel unit 1303, which is made up of plural buttons, corresponds to the input unit 1214 in FIG. 13.

A signal input terminal 1304 is connected with a cable line for transmitting/receiving signals to and from the broadcasting station system (head end) 101. The signal input terminal 1304 is connected to the tuner 1201 shown in FIG. 13.

A card 1305 corresponds to the adapter 1204 in FIG. 13. The adapter 1204 is implemented independently of the terminal apparatus 1200 and can be attached to/detached from the terminal apparatus 1200, as in the case of the card 1305 in FIG. 14. A detailed explanation of the adapter 1204 is given later.

An insertion slot 1306 is a slot into which the adapter 1204 is inserted.

Referring to FIG. 13, the tuner 1201 is a device that demodulates, according to tuning information that includes a frequency specified by the CPU 1210, a broadcast signal that has been modulated in the broadcasting station system 101 and transmitted from it. Note that the tuner 1201 is described here as an exemplary constituent element, but another constituent element is also applicable as long as it is capable of outputting a transport stream. For example, it is also possible to read out, from a hard disk, a transport stream stored therein and to output it to the pre-processing unit 1202. Moreover, it is also possible to receive a transport stream from an external device through an IEEE1394 serial bus. Note that when a process equivalent to that of the pre-processing unit has already been performed on a transport stream, it is possible to skip the process of the pre-processing unit 1202.

In order to cause the devices in the adapter 1204 to operate, a transport stream to be inputted to the adapter 1204 needs to have been demodulated by the tuner 1201. However, when a plurality of transport streams are inputted and all of such transport streams are transmitted to the adapter 1204 in multiplexed form, the transmission rate as well as the processing speed of the CPU become high. Therefore, the transport streams are required to be transmitted to the adapter 1204 via the pre-processing unit 1202 and the multiplexing unit 1203.

Figure 15:
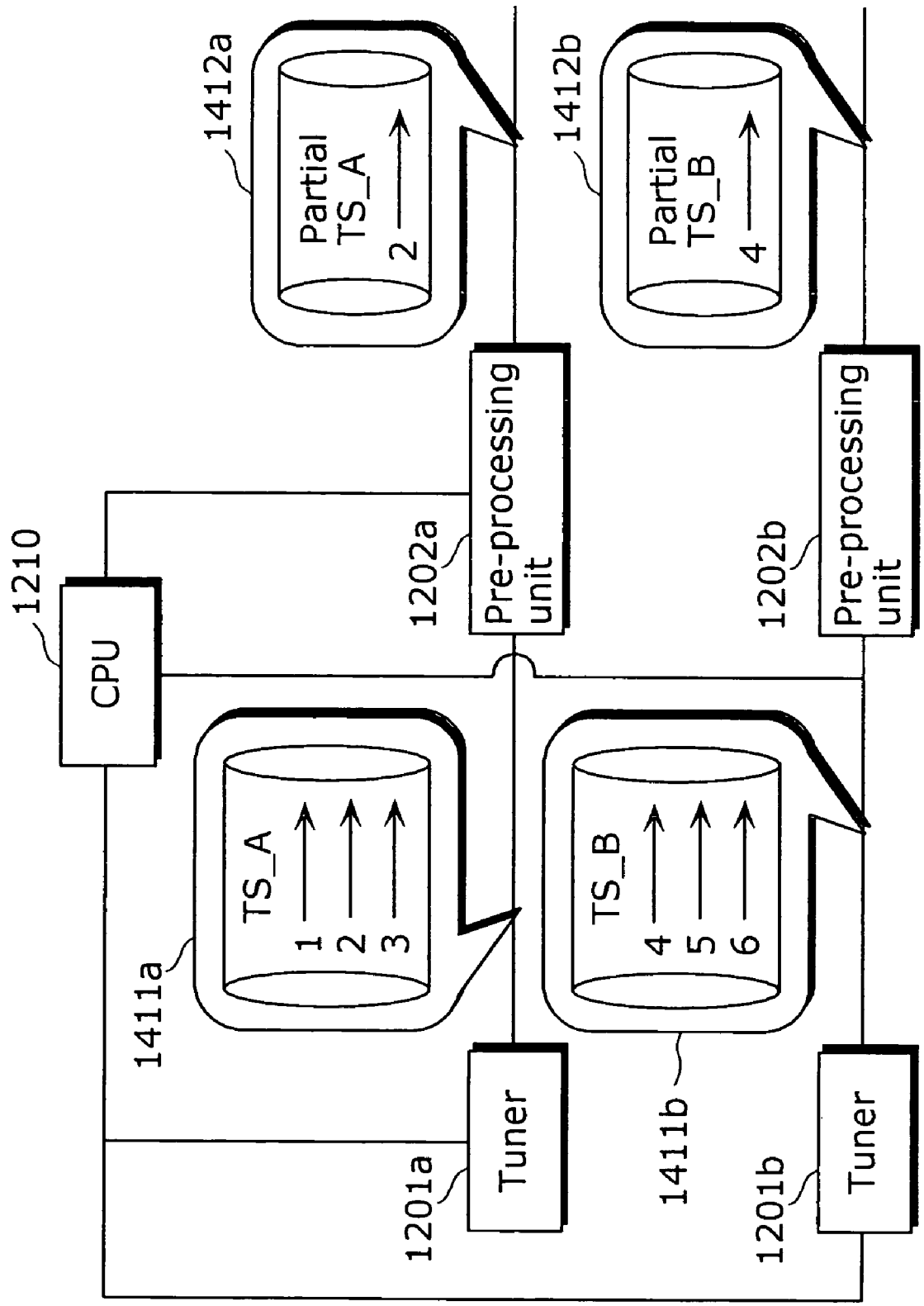
FIG. 15 is a diagram showing an example function of a pre-processing unit included in the broadcast signal receiving apparatus according to the present invention.

The pre-processing unit 1202 selects, from the transport streams, only information that is required for the process of the adapter and the subsequent processes. Alternatively, it is also possible to remove only unnecessary information from the transport streams. FIG. 15 is a conceptual diagram showing the function of the pre-processing unit. 1411*a* is a transport stream A, and 1, 2, 3 included therein are services that are schematically represented as arrows. Similarly, 1411*b* is a transport stream B in which three services 4, 5, and 6 exist. By inputting these transport streams into the pre-processing units 1202*a* and 1202*b*, partial TSs indicated as 1412*a* and 1412*b* are generated in which only the services specified by the CPU 1210 are left. As described above, the pre-processing unit selects or removes all or part of information from transport streams.

With the above construction, it becomes possible to minimize a transmission rate between the receiving terminal and the adapter. Note that in the present embodiment, this process is explained as the pre-processing unit separately from other devices, but the present invention is applicable if this process is performed by another device. For example, the TS decoder 1206 includes a unit that performs the filtering of PIDs and the filtering of sections and PESs. Thus, it is also possible to implement the pre-processing unit as part of the TS decoder 1206. Furthermore, in the present embodiment, although a pre-processing unit is provided for each tuner as the pre-processing units 1202*a* and 1202*b*, a pre-processing unit does not necessarily have to be provided on a tuner-by-tuner basis.

FIG. 16 is a block diagram showing an internal construction of the pre-processing unit 1202*a*/1202*b*. The pre-processing unit 1202*a*/1202*b* includes a receiving unit 1501 and a filtering unit 1502 as their constituent elements.

Figure 23:
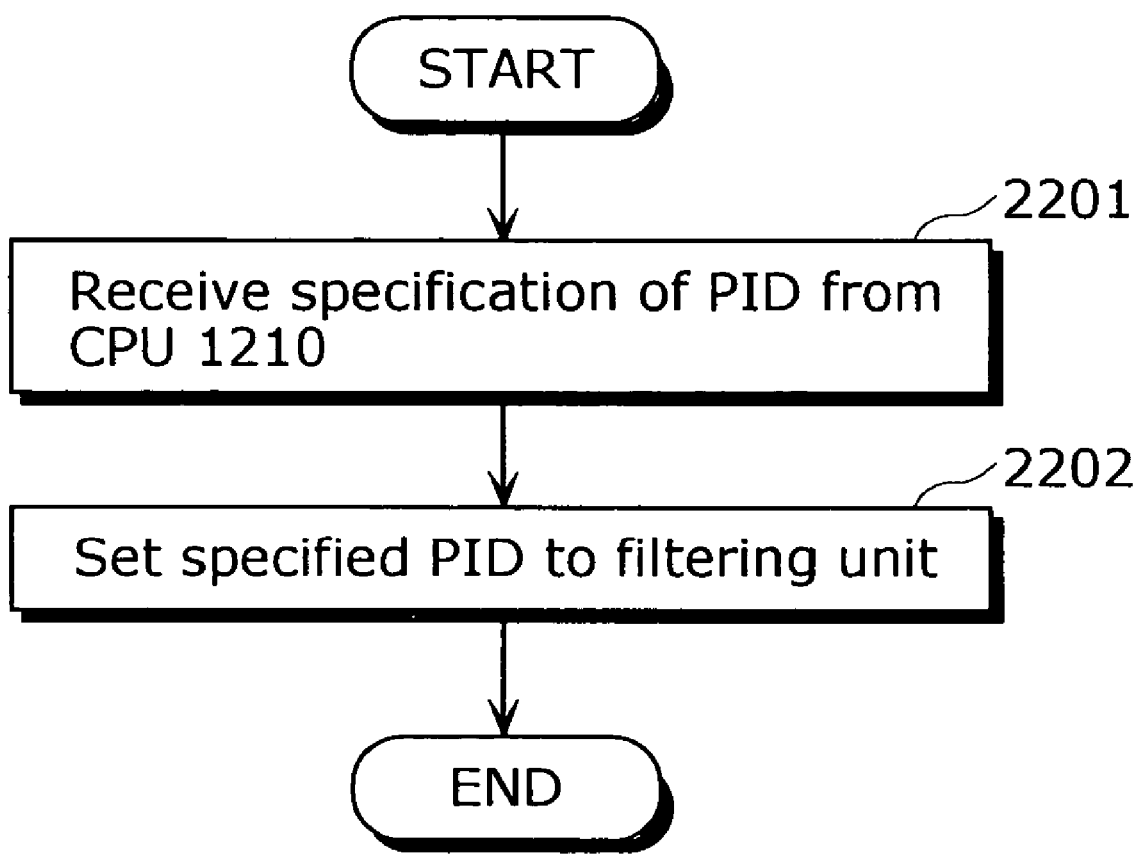
FIG. 23 is a flowchart showing an operation performed by a receiving unit included in the pre-processing unit.
Figure 24:
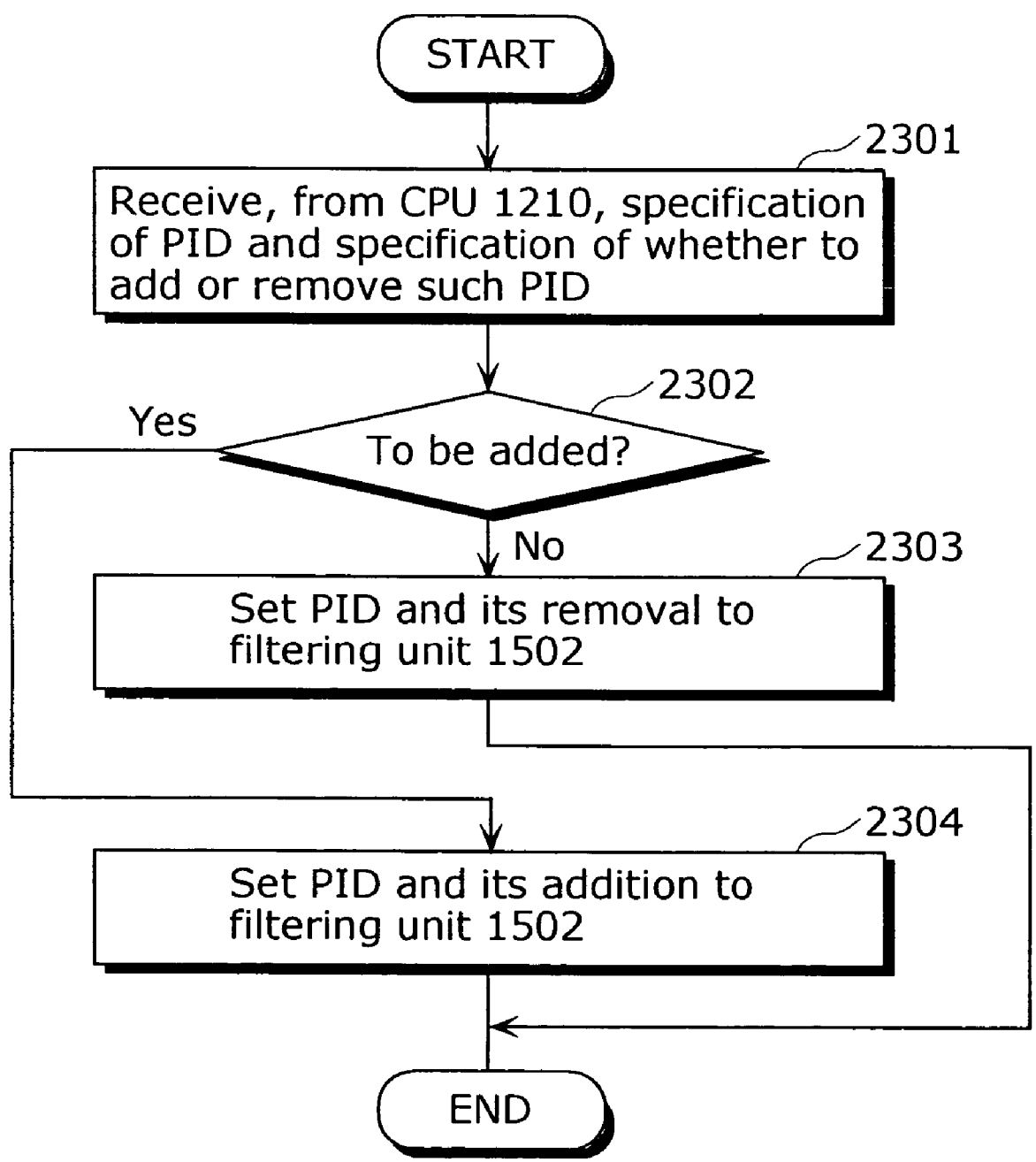
FIG. 24 is a flowchart showing another operation performed by the receiving unit included in the pre-processing unit.

FIG. 23 and FIG. 24 are flowcharts showing processing performed by the receiving unit 1501.

The receiving unit 1501 receives a PID specified by a program running on the CPU 1210 (Step 2201), and sets the received PID to the filtering unit 1502 (Step 2202). The receiving unit 1501 is also capable of receiving, from the program on the CPU 1210, a selection of whether to add or remove the PID specified by the program on the CPU 1210 (Step 2301), and of setting addition or removal to the filtering unit 1502 according to such selection (Steps 2303 and 2304).

Note that it is also possible to set a predetermined PID for this addition or removal. When a PID is specified, it is also possible to automatically add, at the receiving unit, PIDs related to such PID specified. For example, when the PID of an ES is specified, it is possible to add the PIDs of a PAT and a PMT at the receiving unit so as to set them to the filtering unit 1502. Note that there is a case where more than one PMT with the same PIDs exist, in which case one or more PMTs may be selected and added. Regarding removal too, it is of course possible to remove only a specified PID, but it is also possible to remove PIDs related to such specified PID. Furthermore, a plurality of PIDs may be specified. Moreover, when a PID is specified, it is also possible to specify ESs of audio and video in the MPEG2 program stream format. Note that PID is taken up here as an example to be specified by a program running on the CPU 1210, but it does not necessarily have to be PID. Information other than PID may be specified as long as it is possible to identify an ES in a transport stream by use of such information. For example, DVB, which is the European broadcasting standard, defines ComponentTag as a descriptor to identify an ES, and thus ComponentTag may be used here.

Figure 25:
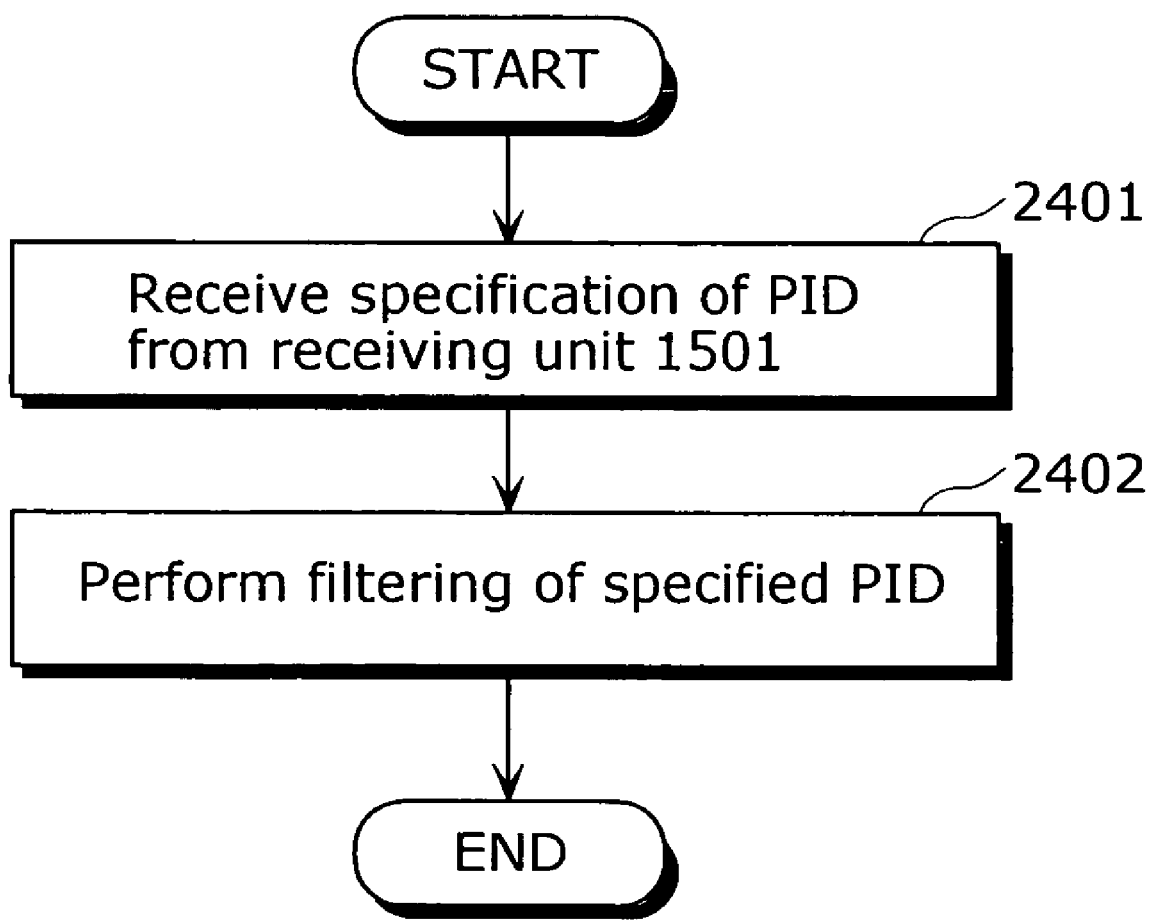
FIG. 25 is a flowchart showing an operation performed by a filtering unit included in the pre-processing unit.
Figure 26:
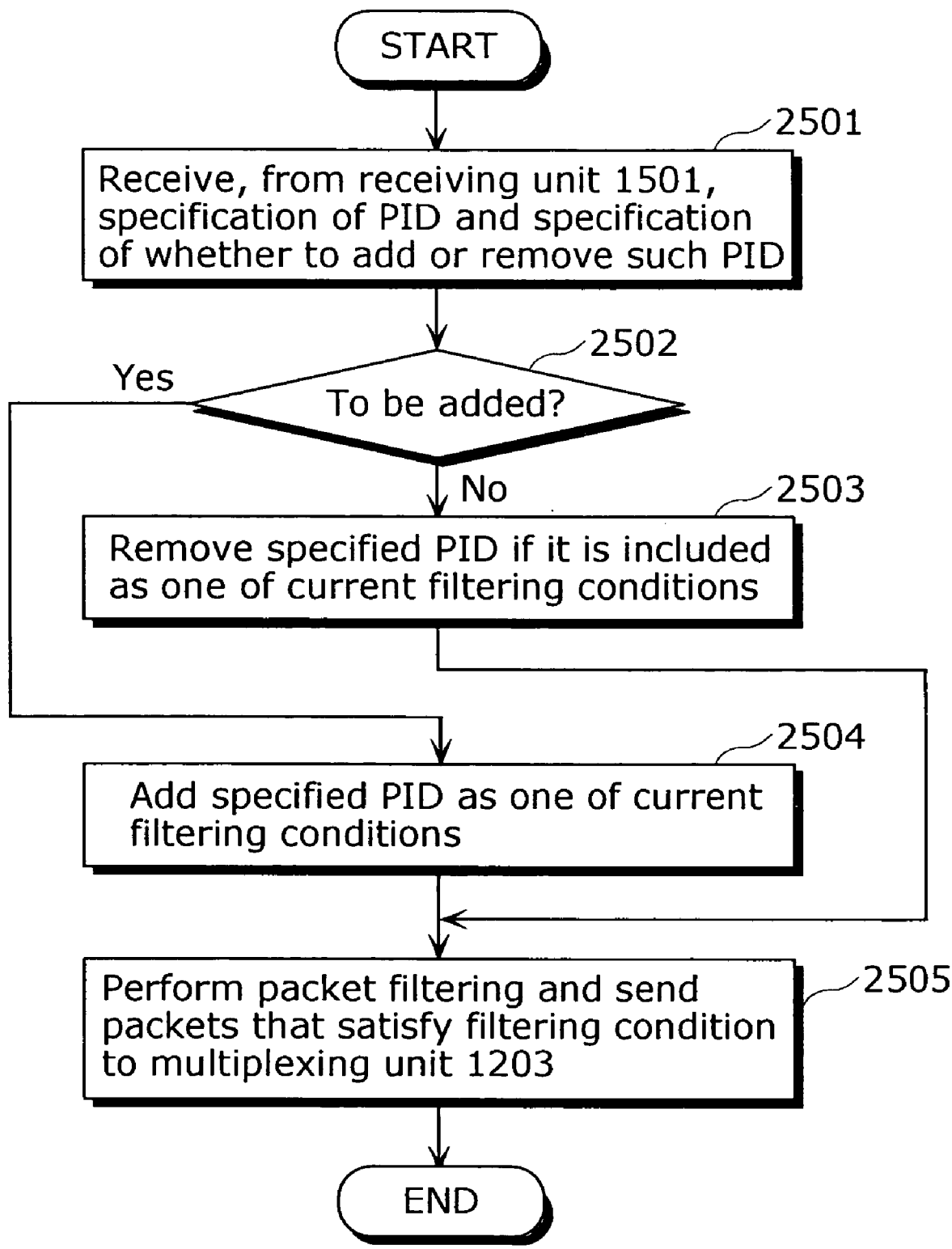
FIG. 26 is a flowchart showing another operation performed by the filtering unit included in the pre-processing unit.

FIG. 25 and FIG. 26 are flowcharts showing processing performed by the filtering unit 1502.

The filtering unit 1502 receives a filtering condition (PID) that has been set by the receiving unit 1501 (Step 2401), and performs filtering of only the specified PID (Step 2402). As the filtering condition, it is possible to set that only packets with a specified PID should be selected (Step 2504) or only packets with a specified PID should be removed (Step 2503). Then, packets that satisfy the above filtering condition is passed to the multiplexing unit 1203 (Step 2505). For example, in the case where TS packets as shown in [1] in FIG. 17 are received and the receiving unit 1501 specifies that PIDs of A1 and V1 should be added, the filtering unit 1502 selects only the packets of A1 and V1 as shown in [2] in FIG. 17.

Here, each of the above-described functions of the pre-processing unit 1202 may be implemented either as hardware or software running on the CPU.

Figure 18:
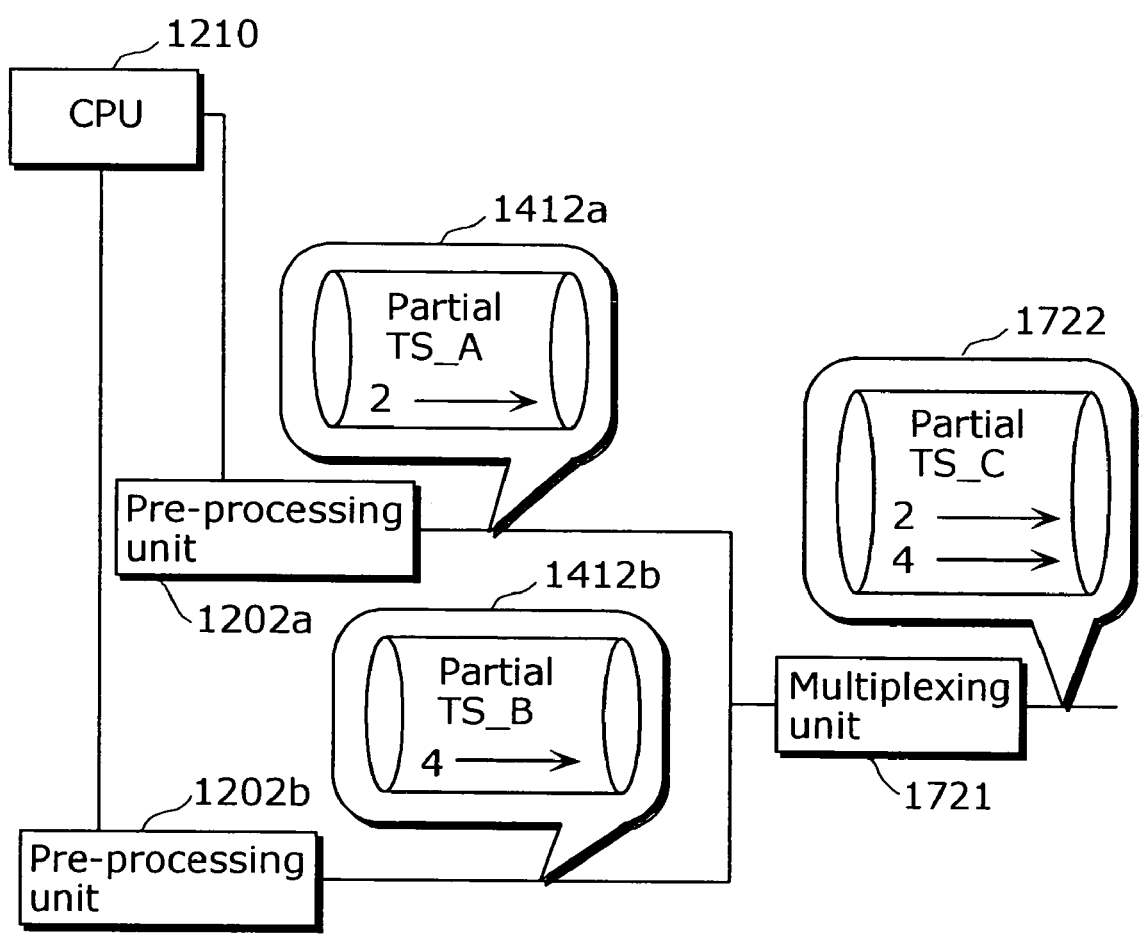
FIG. 18 is a conceptual diagram showing an example function of a multiplexing unit included in the broadcast signal receiving apparatus according to the present invention.

Referring to FIG. 13, the multiplexing unit 1203 multiplexes the plurality of transport streams selected by the pre-processing units 1202*a* and 1202*b*. FIG. 18 is a conceptual diagram showing the function of the multiplexing unit 1203. A multiplexing unit 1721 combines the partial TSs 1412*a* and 1412*b* generated from the pre-processing unit 1202 into one stream 1722.

Figure 19:
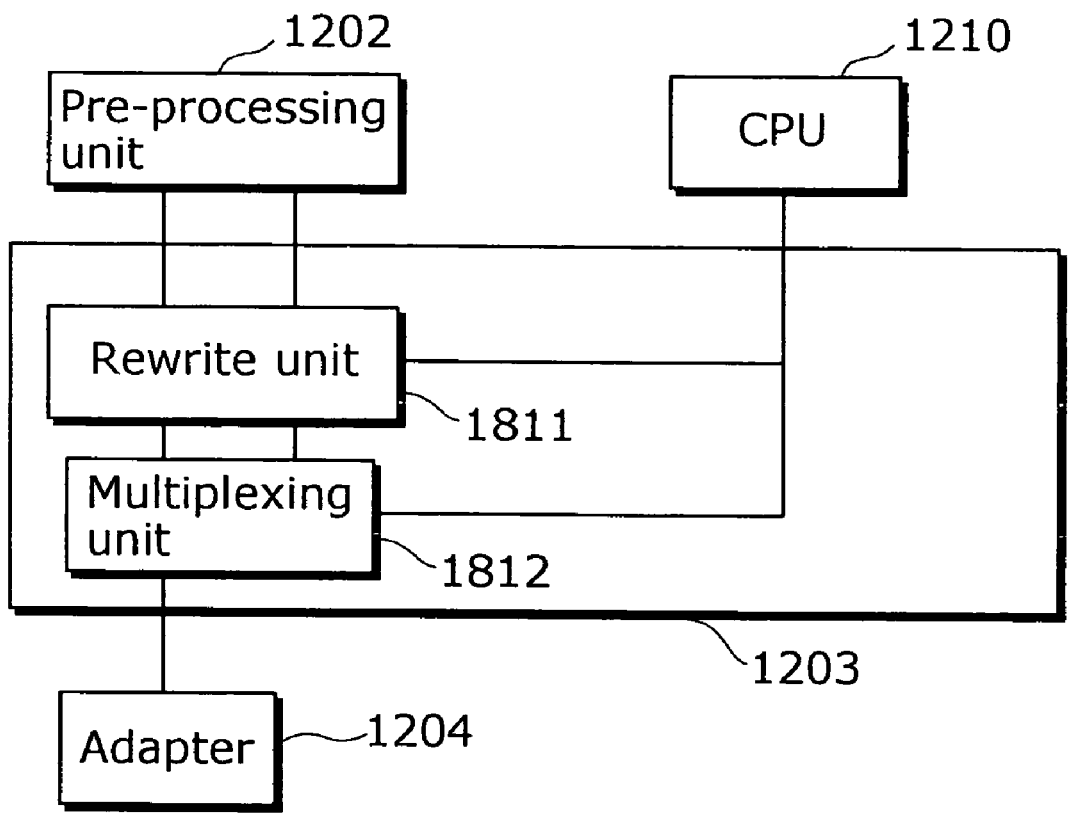
FIG. 19 is a block diagram showing an example internal construction of the multiplexing unit included in the broadcast signal receiving apparatus according to the present invention.

FIG. 19 is a block diagram showing an internal construction of the multiplexing unit 1203. The multiplexing unit 1203 includes a rewrite unit 1811 and a multiplexing unit 1812 as its constituent elements.

Figure 27:
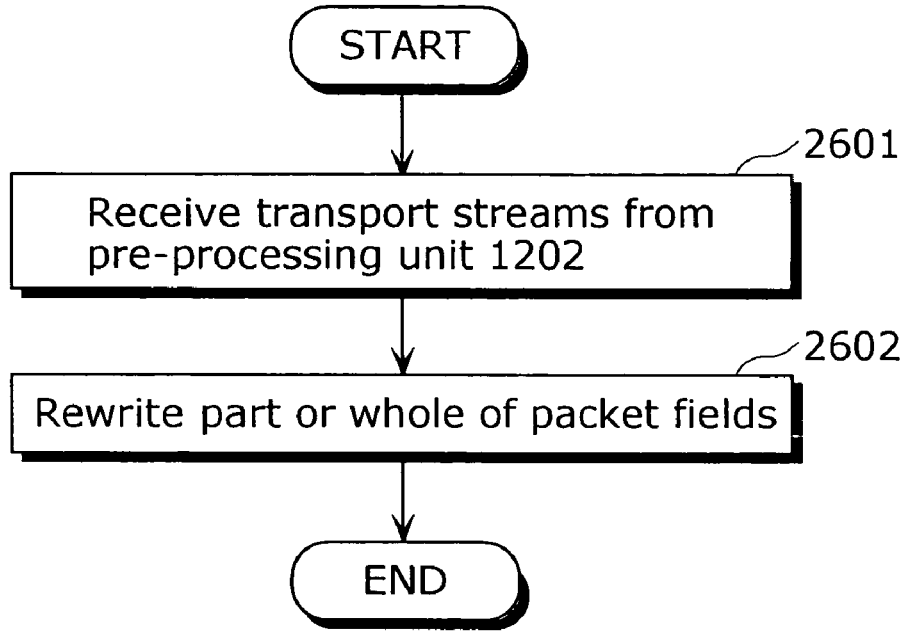
FIG. 27 is a flowchart showing an operation performed by a rewrite unit included in the multiplexing unit.

FIG. 27 is a flowchart showing processing performed by the rewrite unit 1811.

The rewrite unit 1811 receives the plurality of transport streams which have been pre-processed by the pre-processing unit 1202 (Step 2601). Then, in order to identify each of such transport streams, the rewrite unit 1811 rewrites a part or the whole of the fields inside the transport streams (Step 2602).

Here, it is possible to rewrite, for example, an unused field inside each of the transport streams. When the transport streams here are MPEG2 transport streams, it is possible to rewrite a RESERVE field inside each transport stream. Meanwhile, when the transport streams are MPEG2 program streams, it is possible to rewrite a RESERVE field inside each MPEG2 program stream. Moreover, it is also possible to use some or all of the synchronization bytes to identify each of the transport streams. In the case of an MPEG2 transport stream, 8-byte synchronization bytes are available. Of them, it is possible to use the high-order 2 bytes as an ID to identify the transport stream and to use the other 6 bytes as synchronization bytes.

Furthermore, it is also possible to use all the synchronization bytes to identify each transport stream. In such a case where all the synchronization bytes are used for identification of a transport stream, a NULL packet may be inserted as a synchronization byte for every ten packets. The present invention is of course applicable regardless of the number of high-order bits used for identification and the number of times synchronization bytes are inserted. Moreover, the descriptions are given above only of unused flag and synchronization bytes, but it is also possible to rewrite other fields based on predetermined operating requirements. Here, it is of course possible to rewrite a PID to identify each transport stream. Note that in FIG. 19, the rewrite unit 1811 receives two inputs and outputs two outputs, but there is no problem if the number of rewrite units corresponding to the number of transport streams is provided. Also note that it is not necessary for this rewrite unit 1811 to perform its process at this stage, and there is no problem if this process is performed in the pre-processing unit 1202.

Figure 28:
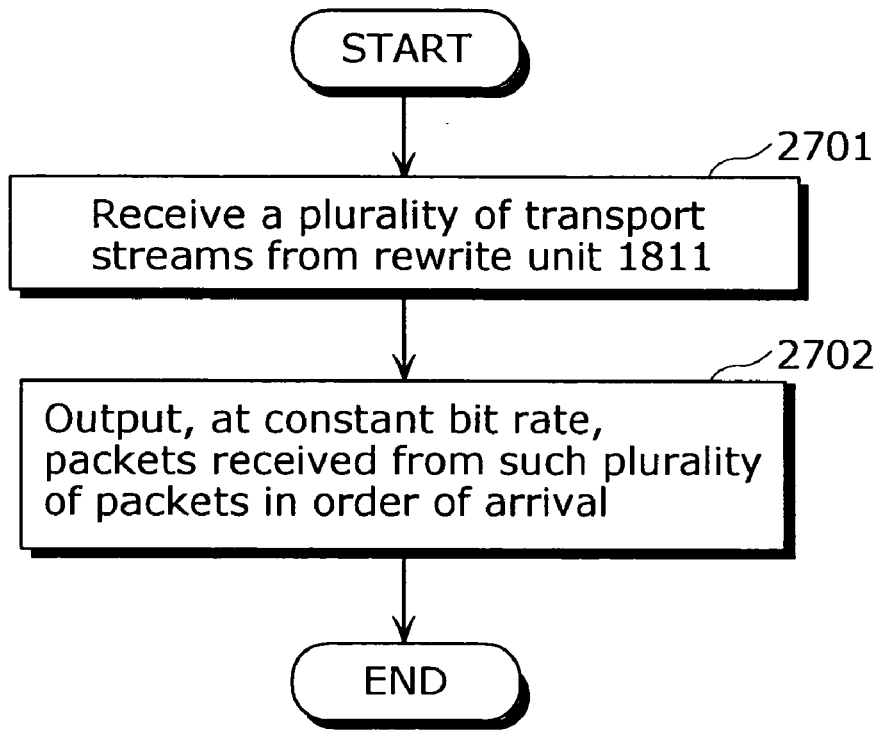
FIG. 28 is a flowchart showing an operation performed by a multiplexing unit included in the multiplexing unit.

FIG. 28 is a flowchart showing processing performed by the multiplexing unit 1812.

Figure 20:
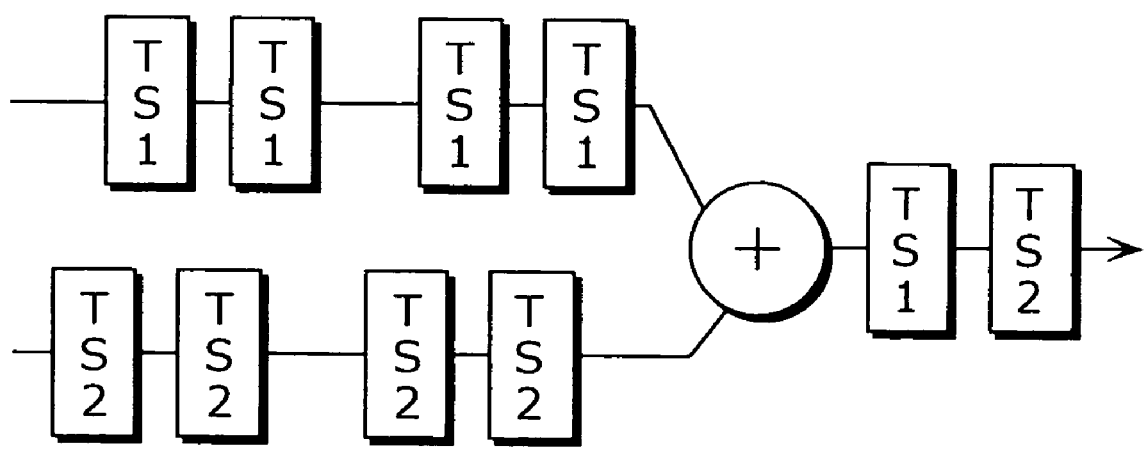
FIG. 20 is a diagram for explaining an example function of the multiplexing unit included in the broadcast signal receiving apparatus according to the present invention.

The multiplexing unit 1812 receives the plurality of transport streams outputted from the rewrite unit 1811 (Step 2701), and multiplexes such received transport streams into one transport stream as shown in FIG. 20. As this multiplexing, the multiplexing unit 1812 sends out packets included in the plurality of transport streams at a constant bit rate in order in which such packets have been inputted from the rewrite unit 1811 (Step 2702). In the case where the transport streams do not include any packets, it is possible to insert a NULL packet. It should be also noted that this multiplexing may also be performed by use of a variable bit rate.

Figure 21:
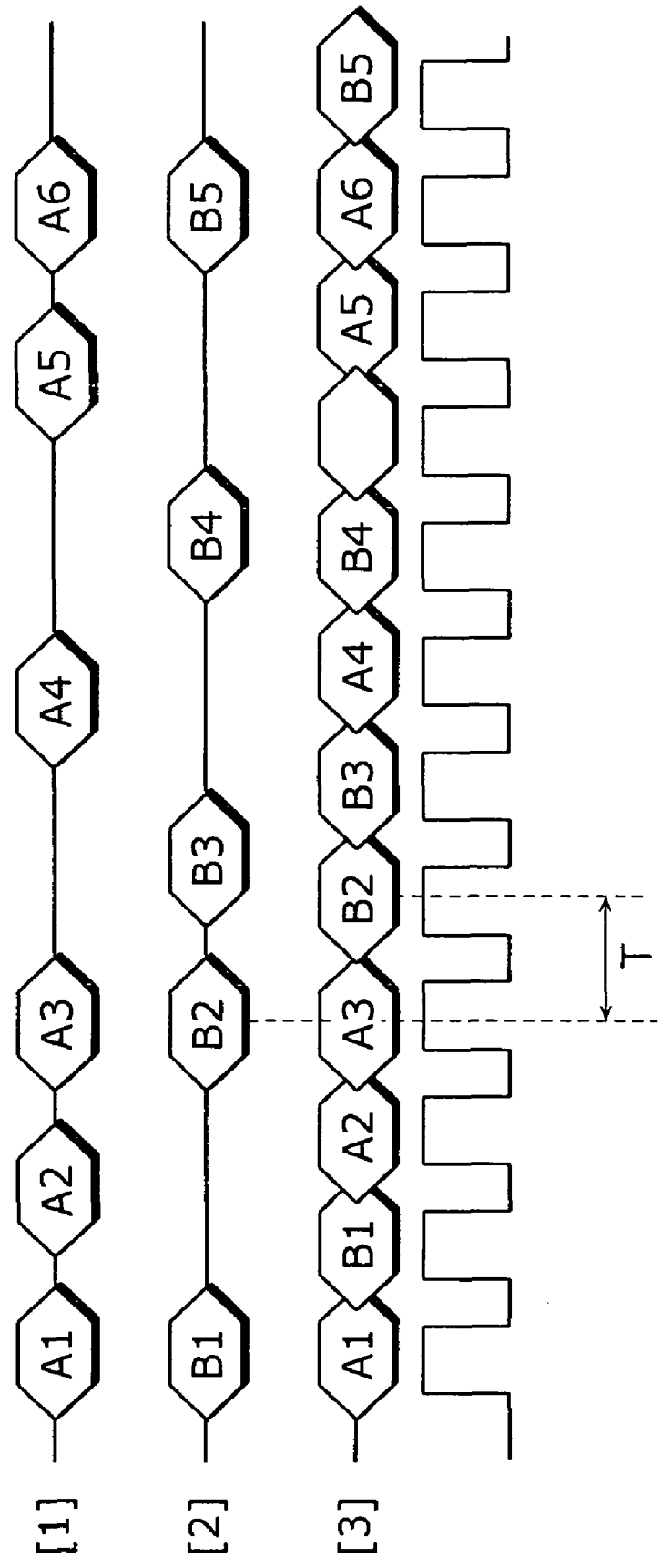
FIG. 21 is a diagram for explaining another example function of the multiplexing unit included in the broadcast signal receiving apparatus according to the present invention.

Moreover, the multiplexing unit 1812 is also capable of correcting the value of a PCR that indicates time based on which the service is provided. FIG. 21 shows packets from a plurality of transport streams being outputted at a constant bit rate. [1] and [2] in FIG. 21 show packets to be inputted to the multiplexing unit 1812, while [3] in FIG. 21 shows a stream that is outputted from the multiplexing unit 1812 at a constant bit rate. For example, in the case where B2 shown in [2] in FIG. 21 is a packet carrying a PCR, since it is inputted at the same timing at which A3 shown in [1] in FIG. 21 is inputted, it is shown, referring to [3] in FIG. 21, that the timing is off by "T" because B2 was inputted after A3.

Figure 22:
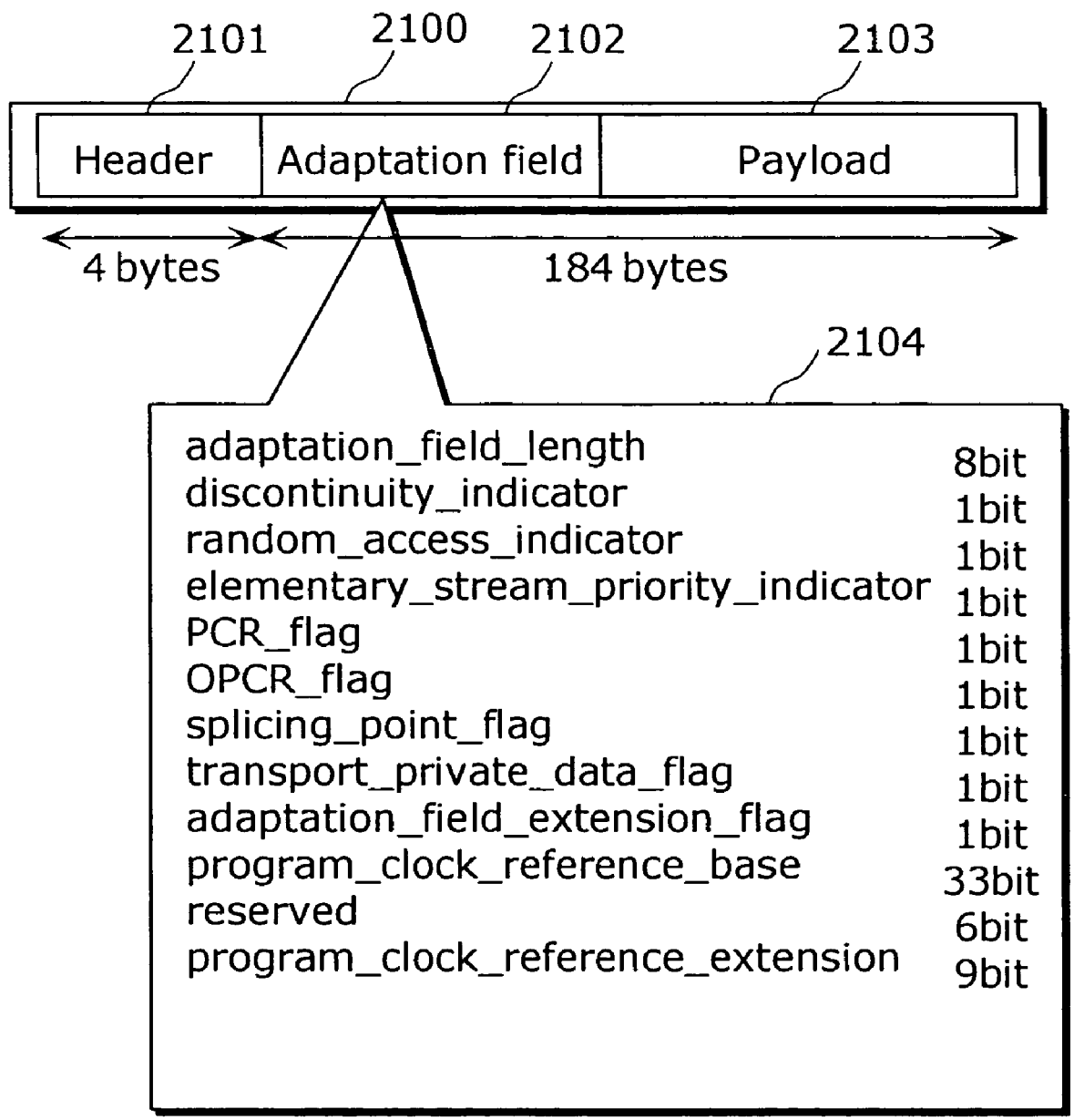
FIG. 22 is a diagram showing a structure of a TS packet defined in the MPEG2 standard.

As described above, it is possible for the multiplexing unit 1812 to be equipped with the function of correcting the value of a PCR when the timing of transmitting the PCR carrying the reference time is off. The PCR exists inside the adaptation field 2102 in the packet shown in FIG. 22. 2104 in FIG. 22 shows an example of information contained in the adaptation field. A correction of the PCR can be made by making a change in program_clock_regerence_base or program_clock_reference_extension.

Note that such correction may be made using a variable value in accordance with a time lag as shown in FIG. 21, or may be made using a fixed value. For details about formulas to determine these values, refer to the "MPEG2 Systems" specification. Moreover, other than by making a change in the PCR, the function of correcting the value of the PCR can also be implemented by preferentially processing the PCR at the time of multiplexing. Note that in [3] in FIG. 21, a packet with nothing described indicates a NULL packet.

Meanwhile, when the total transfer rate(s) of one or more partial transport streams selected by the pre-processing unit 1202 is higher than the transfer rate between the terminal apparatus 1200 and the adapter 1204, there is a possibility that an underflow occurs at the AV decoder side, since packets are delivered later than in the case where the original transfer rate is used. While it is possible to discard packets when the transfer rate becomes high, this causes a problem of block noise due to the loss of such discarded packets. In response to this problem, it is possible for the multiplexing unit 1812 to notify the program on the CPU 1210 of this fact, which then requests the receiving unit 1501 of the pre-processing unit 1202 to perform re-setting of filtering condition according to priority specification. Then, the receiving unit 1501 sets a filtering condition again to the filtering unit 1502, which passes, to the multiplexing unit 1203, a transport stream that satisfies such re-set filtering condition.

As described above, by making a re-setting about which transport stream or which PID should be preferentially processed, it becomes possible to minimize the effects caused by block noise and other factors. Note that as another method for overcoming delays as described above, it is possible to allocate a sufficient buffer to the AV decoder 1207 and the like for absorbing delays. Meanwhile, a correct operation is guaranteed when the total transfer rate of one or more partial transport streams that are selected by the pre-processing unit 1202 and that are to be inputted to the multiplexing unit 1812 is lower than the transfer rate between the terminal apparatus 1200 and the adapter 1204.

It is conceivable that priorities are specified by a program on the CPU as described above or automatically by the receiving unit 1501 of the pre-processing unit 1202. One of the following is taken into consideration at the time of priority specification: the current viewing status (one or more, or all of program contents, ES type, display region of video or the like, and recording state); and user preference information stored in a storage unit such as the primary storage unit 1212 and the secondary storage unit 1211. User preferences include default language information in which the user views a service. An example of setting priorities is described below.

In the case where the user is viewing two services by Picture in Picture, it is possible to preferentially process a service that is displayed in a larger screen. This makes it possible to limit the effects of underflow only to a smaller screen and thus to prevent the larger screen from being affected, and vise versa. Here, determination of whether to discard overflowed packets or send them even if it is delayed may be made beforehand. This determination can be also made from the program on the CPU.

Moreover, in the case where the user is viewing a service while recording another service, for example, it is possible to preferentially process the service currently viewed by the user, considering that packet delay is allowable for the service being recorded that does not require real-timeliness. Here, the multiplexing unit 1812 has a policy that all accumulated packets shall be sent out even if it is delayed.

Furthermore, in the case where the user is viewing a service while recording another service, for example, it is possible to preferentially process the service being recorded.

In the case where a free service and a service purchased by the user through Pay Per View (PPV) are selected, it is possible to provide a higher priority to the service purchased by the user. This prevents the service purchased by the user from being affected.

Furthermore, regarding determination of SD or HD of a stream type, it is possible to prioritize HD to prioritize a beautiful display. It is also possible to prioritize SD.

Moreover, it is possible to provide a higher priority to cinema and drama than a service such as news and comedy, by checking the genre of a service the user is viewing. Meanwhile, it is also possible to provide a higher priority to audio than video in the case of a music program.

Furthermore, by preferentially processing audio data containing a smaller amount of information than video data, it is possible to enable the audio to be reliably audible. Moreover, it is further possible to determine priorities within audio data depending on sound type such as AC, MPEG Audio, and Dolby.

Furthermore, it is also possible to select audio, subtitle information and video that correspond to the language in which the user is viewing a service, and remove ESs dependent on an unnecessary language.

It is also possible to remove ESs dependent on languages other than the language that is set as the user preference information.

Also, in the case of supporting multi-angles, unnecessary streams that are not viewed can be removed.

Moreover, it is possible to add, without exception, either one or both of video and audio that are delivered in a scrambled form. Alternatively, ES packets other than those of video and audio may be added instead.

Referring to FIG. 13, in order to add a device that is not equipped to the terminal apparatus as well as to enhance the functions of the devices that are equipped to the terminal apparatus, it is possible to attach, to the terminal apparatus, an adapter that includes a device wished to be added to the terminal apparatus. For example, the terminal apparatus can have, as the adapter 1204, a conditional access descrambler apparatus that receives transport streams and descrambles TS packets protected by conditional access with a PID specified by the CPU 1210, out of the TS packets included in each of the inputted transport streams. In order to perform conditional access descrambling, transport streams to be inputted need to have been multiplexed by the multiplexing unit 1203. Thus, the multiplexing unit 1203 inputs a multiplexed transport stream to the adapter 1204. The adapter 1204 descrambles TS packets included in the input multiplexed transport stream that are specified by the CPU 1210.

When this is done, by causing the terminal apparatus and the adapter 1204 to negotiate a method for identifying transport streams, it becomes possible for the adapter 1204 to identify each inputted transport stream that is in the format determined between the terminal apparatus and the adapter 1204. Transport streams that are in the format determined between the terminal apparatus and the adapter 1204 include: a stream that contains a TS packet whose header field has been modified; and a stream that contains a TS packet that is added with an extension field. Furthermore, this identification method may also be determined beforehand between the terminal apparatus and the adapter 1204. Moreover, the present invention is also applicable to the case where the above negotiation is conducted between the terminal apparatus and the adapter 1204 by use of HIGH or LOW of a signal line, or where an identification method is determined through register setting and by use of control messages. After this, the multiplexed transport stream is transmitted to the demultiplexing unit 1205.

Note that the present invention is not dependent on information format used between the terminal apparatus and the adapter 1204. For example, the present invention is applicable to the case where the above transport streams are MPEG2 transport streams as well as to the case where the transport streams are bitstreams that can be uniquely interpreted by the adapter 1204. Also, while PCMCIA is generally used as an interface between the terminal apparatus 1200 and the adapter 1204, any interfaces are applicable since the present invention is not related to interface format.

Under instructions from the CPU 1210, the demultiplexing unit 1205 demultiplexes the transport stream multiplexed by the multiplexing unit 1203. When this is done, the instructions from the CPU 1210 can also inform the demultiplexing unit 1205 what kind of processes have been performed by the multiplexing unit 1203 and the pre-processing unit 1202. Thus, by performing its operation in accordance with such instructions, the demultiplexing unit 1205 can operate in conjunction with the multiplexing unit 1203 and the pre-processing unit 1202. Meanwhile, it is also possible for the demultiplexing unit 1205 to operate in accordance with information that is previously determined among these three units.

Each of the demultiplexed transport streams is required to be in the format interpretable by the TS decoder 1206. In order to convert such transport streams into the MPEG2 transport stream format that can be interpretable b y the TS decoder 1206, the demultiplexing unit 1205 needs to convert the synchronization bytes, which were changed by the rewrite unit 1811 of the multiplexing unit 1203, into MPEG2 TS format and to insert, where necessary, a NULL packet between packets with the PID selected by the pre-processing unit 1202. This function of the demultiplexing unit 1205 may be implemented either as hardware or software that runs on the CPU. Furthermore, in the case where the TS decoder 1206 is capable of interpreting a multiplexed transport stream, the demultiplexing unit 1205 is not necessary. Moreover, it is also possible to implement the present demultiplexing unit 1205 as a part of the TS decoder 1206.

The TS decoder 1206 is a device capable of selecting, based on the PID specified by a program running on the CPU 1210 and a condition for selecting a section, PES packets and an MPEG2 section that match such specification from each of the MPEG2 transport streams. PES packets selected by the TS decoder 1206 are transferred to the AV decoder 1207, whereas MPEG2 sections selected by the TS decoder 1206 are Direct Memory Access (DMA)-transferred to the primary storage unit 1212 to be used by a program executed by the CPU 1210. In addition to the above-described function of selecting PES packets and MPEG2 sections, the TS decoder 1206 also has the function of descrambling PES packets and MPEG2 sections that are protected by conditional access as well as the function of transferring inputted MPEG2 transport streams to another device that is physically connected to the TS decoder 1206.

The AV decoder 1207 is a device capable of decoding digitally encoded video and audio. AV signals that are obtained by decoding of the AV decoder 1207 are sent to the speaker 1208 and the display 1209. Note that there may be a case where the AV decoder 1207 cannot decode video and audio simultaneously. Also, the AV decoder 1207 may be separated into the video decoder and the audio decoder depending on the case. Also note that the AV decoder may have the function of decoding subtitle data in some cases.

The speaker 1208 and the display 1209 are devices each capable of outputting audio and video transmitted from the AV decoder 1207.

In the present embodiment, AV signals are inputted from the two AV decoders 1207*a* and 1207*b*, and how these signals are outputted is determined based on specifications by the CPU 1210. For example, possible specifications include the following: only an AV signal outputted from the AV decoder 1207*a* should be outputted; and video outputted from the AV decoder 1207*b* should be displayed in full-screen mode, whereas video outputted from the AV 1207*a* should be reduced to one fourth so as to be displayed on the lower-right corner of the video outputted from the AV decoder 1207*b*.

The CPU 1210 executes a program that runs on the broadcast signal receiving apparatus. A program executed by the CPU 1210 may be included in the ROM 1213, stored in the primary storage unit 1212 after downloaded from a broadcast signal or a network, or stored in the secondary storage unit 1211 after downloaded from a broadcast signal or a network. According to specifications from a program to be executed, the CPU 1210 controls the tuner 1201 (1201*a* and 1201*b*), the pre-processing unit 1202 (1202*a* and 1202*b*), the multiplexing unit 1203, the demultiplexing unit 1205, the TS decoder 1206, the AV decoder 1207 (1207*a* and 1207*b*), the speaker 1208, the display 1209, the secondary storage unit 1211, the primary storage unit 1212, the ROM 1213, and the input unit 1214. Note that it is possible for the CPU 1210 to communicate with or control not only devices included in the terminal apparatus 1200, but also the adapter 1204.

Meanwhile, since the demultiplexing unit 1205 is capable of converting streams selected by the pre-processing unit 1202 into a format that can be interpreted by the TS decoder 1206 as well as capable of selecting a part or the whole of information obtained from the adapter 1204, it is possible for the CPU 1210 to send an instruction so that the demultiplexing unit 1205 can know what kind of information has been selected by the pre-processing unit 1202.

Moreover, it is possible for the pre-processing unit 1202 and the multiplexing unit 1203 to perform their processes in conjunction with each other by taking into account the PID/ProgramNo of each service included in the inputted transport.

Furthermore, the multiplexing unit 1203 and the demultiplexing unit 1205 can operate in conjunction with each other. In order to allow this, it is possible for the CPU 1210 to send instructions to the multiplexing unit 1203 and the demultiplexing unit 1205. Accordingly, they can operate on the basis of the same recognition concerning, for example, which method is used for multiplexing and what kind of services are included. Note that their operations may be performed in conjunction with each other based on what has been determined in advance, rather than in response to instructions from the CPU.

In the case where a plurality of devices of the same kind exit as in the case of the present embodiment, it is possible for the CPU 1210 to control such devices by separately specifying each device.

The secondary storage unit 1211 is made up of devices such as a non-volatile memory (e.g. FLASH-ROM) and a rewritable medium (e.g. CD-R and DVD-R) by which it is possible for information not to be removed even when the terminal apparatus 1200 is powered off. The secondary storage unit 1211 stores information in response to instructions from the CPU 1210, and is used for storing data that should not be lost when the terminal apparatus 1200 is powered off.

The primary storage unit 1212, which is made up of a RAM and the like, is a device capable of temporarily storing information according to specifications of the CPU 1210 and other DMA-capable devices. Information stored in the primary storage unit 1212 is removed when the terminal apparatus 500 gets powered off.

The ROM 1213 is a read-only memory device, concrete constituent elements of which are a ROM, a CD-ROM, and a DVD, and the like. The ROM 1213 stores a program to be executed by the CPU 1210.

Figure 29:
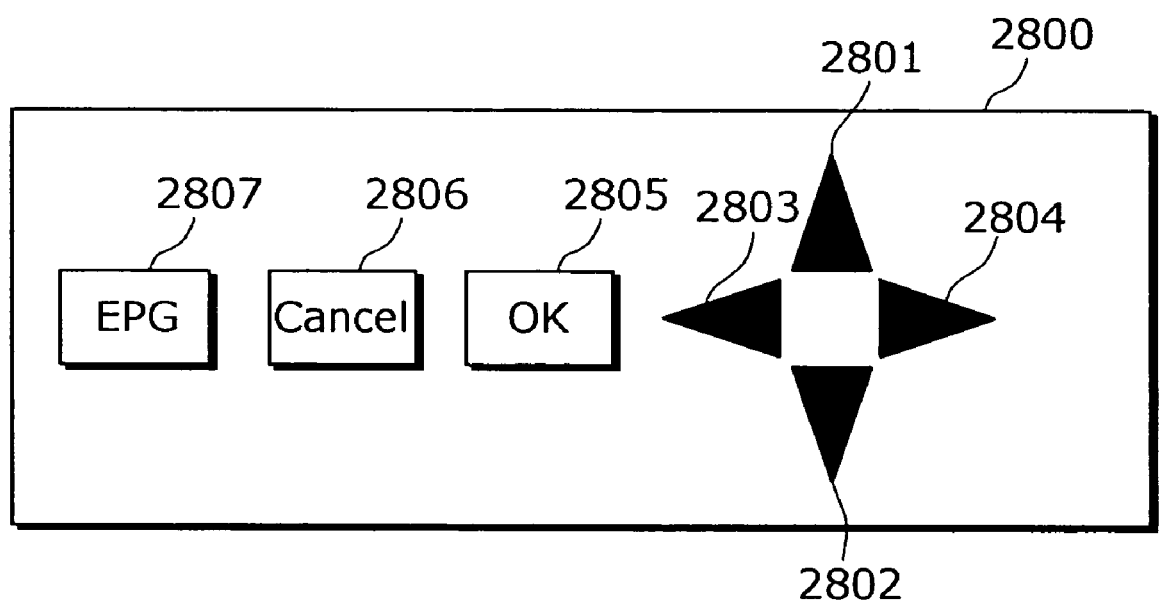
FIG. 29 is a diagram showing an example external view of an input unit in the case where it is configured in the form of a front panel.

The input unit 1214, a concrete constituent element of which is a front panel or a remote controller, accepts an input from the user. FIG. 29 shows an example of the input unit 1214 in the case where it is constructed in the form of a front panel. The front panel 2800 is made up of seven buttons: an up-cursor button 2801, a down-cursor button 2802, a left-cursor button 2803, a right-cursor button 2804, an OK button 2805, a cancel button 2806, and an EPG button 2807. When the user presses down a button, the identifier of such pressed button is notified to the CPU 1210.

Note that FIG. 13 illustrates the display 1209 and the speaker 1208 that are contained in the broadcast signal receiving apparatus, but there is a type of broadcast signal receiving apparatuses that output only AV signals to outside, without containing the display 1209 and the speaker 1208. The present invention is applicable to both types of broadcast signal receiving apparatuses regardless of where the display 1209 and the speaker 1208 are positioned.

The functions of the respective constituent elements presented in the first embodiment may be implemented either as hardware or software running on the CPU.

Figure 31:
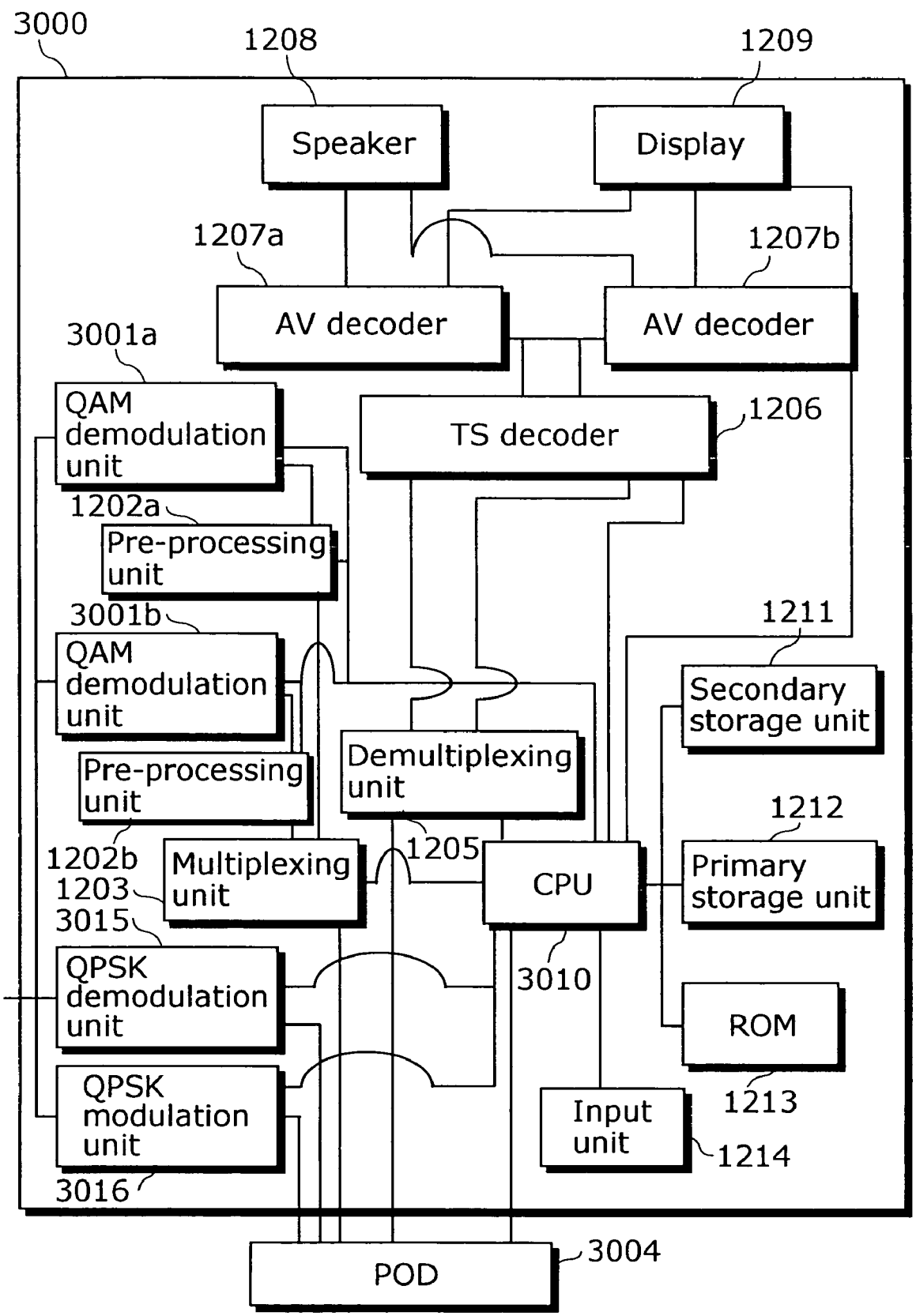
FIG. 31 is a diagram showing a construction of the present invention in the case where it is used in a cable television system.

As an example of the adapter 1204, descriptions are given of a POD that is used in a U.S. cable system. The POD is detachable from the terminal apparatus 1200 as shown in FIG. 14. A connection interface between the terminal apparatus body and the POD is defined in OpenCable (TM) HOST-POD Interface Specification (OC-SP-HOSTPOD-IF-I12-030210). This specification defines the case where one transport stream is received as an input and no definition is provided about the case where a plurality of transport streams are inputted. Here, an example case is described where a plurality of transport streams are inputted. FIG. 31 is a diagram showing a hardware construction of the terminal apparatus to which a POD 3004 is attached. In the terminal apparatus 3000, devices that are identified by the same reference numbers as those in FIG. 13 have equivalent functions as them. The POD 3004, which is equipped with a descrambler, descrambles a received multiplexed transport stream protected by conditional access, and sends it to the demultiplexing unit, which then restores such transport stream to a plurality of transport streams.

In the U.S. cable system, various types of information is transmitted in upstream and downstream directions using the frequency band called OOB, as shown in FIG. 3 and FIG. 4. Here, the format in which information is transmitted from the broadcasting station system 101 to the terminal apparatus 3000 is different from the format of information that the terminal apparatus 3000 can interpret, and therefore information cannot be exchanged between them as it is. Because of this reason, the POD 3004 is equipped with a device that converts the format of information to be transmitted in the upstream and downstream directions through OOB. Information transmitted through OOB is modulated using a QPSK modulation technique. Since QPSK is a publicly known technique, it is not described in detail here. The terminal apparatus 3000 is equipped with a QPSK demodulation unit 3015 and a QPSK modulation unit 3016. The CPU 3010 is capable of controlling not only the devices in the terminal apparatus 3000 but also the devices in the POD 3004.

When the terminal apparatus 3000 receives information in downstream direction, the QPSK demodulation unit 3015 first demodulates the downstream signal transmitted from the broadcasting station system 101 through OOB and inputs the generated bitstreams to the POD 3004. The POD 3004 extracts, from among various information contained in the bitstreams, information specified by the CPU 3010, converts such extracted information into the format interpretable by a program running on the CPU 3010, and provides the resultant to the CPU 3010.

When the terminal apparatus 3000 sends information in upstream direction, the CPU 3010 first sends, to the POD 3004, information that is wished to be sent to the broadcasting station system 101. The POD 3004 converts the information inputted from the CPU 3010 into the format interpretable by the broadcasting station system 101, and sends the resultant to the QPSK modulation unit 3016. The QPSK modulation unit 3016 QPSK-modulates the information inputted from the POD 3004, and sends the resulting information to the broadcasting station system 101.

Figure 32:
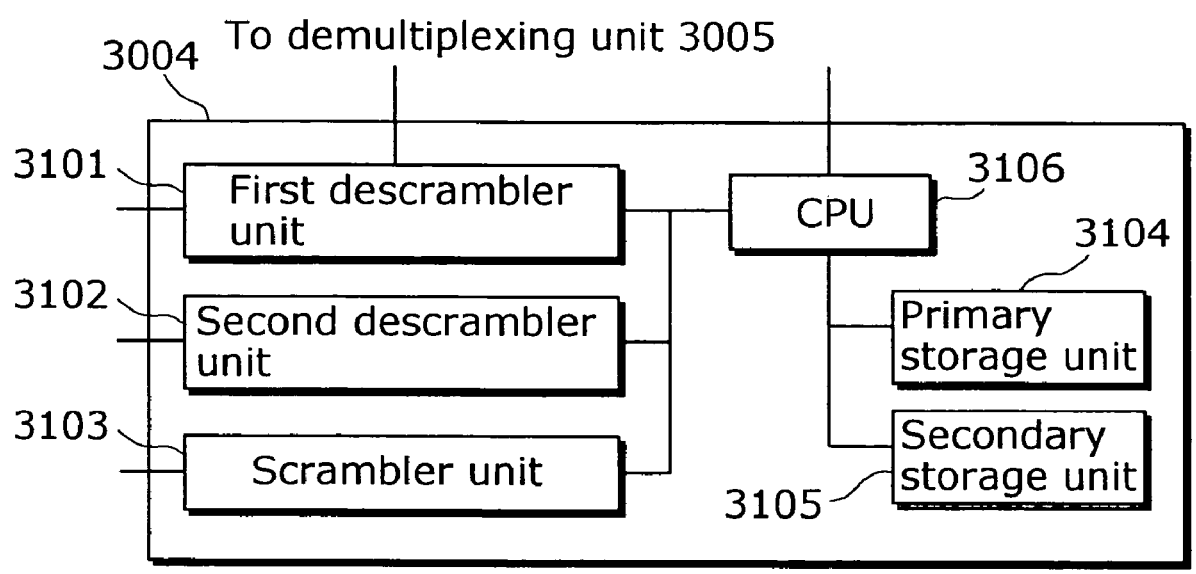
FIG. 32 is a block diagram showing a construction of a POD that is an example of the adapter.

FIG. 32 is a block diagram showing an internal construction of the POD 3004. The POD 3004 is comprised of a first descrambler unit 3101, a second descrambler unit 3102, a scrambler unit 3103, a primary storage unit 3104, a secondary storage unit 3105, and a CPU 3106.

The first descrambler unit 3101 receives a signal that has been scrambled from a transport stream demultiplexed by the demultiplexing unit 1203 via the QAM demodulation units 3001a and 3001b of the terminal apparatus 3000, under the instruction from the CPU 3106, and descrambles such signal. Then, the first descrambler unit 3101 transmits the descrambled signal to the demultiplexing unit 1205 of the terminal apparatus 3000. Information required for decoding such as a key is provided by the CPU 3106 according to need. More specifically, the broadcasting station system 101 broadcasts several pay channels, and when the user purchased the right to view these pay channels, the first descrambler unit 3101 receives required information such as a key from the CPU 3106 and descrambles the channels to provide access to these channels protected by conditional access. Accordingly, the user can view these pay channels. When required information such as a key is not provided, the first descrambler unit 3101 passes the received signal directly to the demultiplexing unit 1205 without performing conditional access descrambling.

The second descrambler unit 3102 receives a scrambled signal from the QPSK demodulation unit 3105 of the terminal apparatus 3000 under instructions from the CPU 3106, and descrambles such signal. Then, the second descrambler unit 3102 passes the descrambled data to the CPU 3106.

The scrambler unit 3103 scrambles the data received from the CPU 3106, under instructions from the CPU 3106, and sends the resultant to the QPSK modulation unit 3016 of the terminal apparatus 3000.

The primary storage unit 3104, a concrete constituent element of which is a primary memory such as a RAM, is intended for temporarily storing data when the CPU 3106 performs processing.

The secondary storage unit 3105, a concrete constituent element of which is a secondary memory such as a flash ROM, is intended for storing a program to be executed by the CPU 3106 as well as for storing data that should not be removed even when the power is turned off.

The CPU 3106 executes a program stored in the secondary storage unit 3105.

Figure 30:
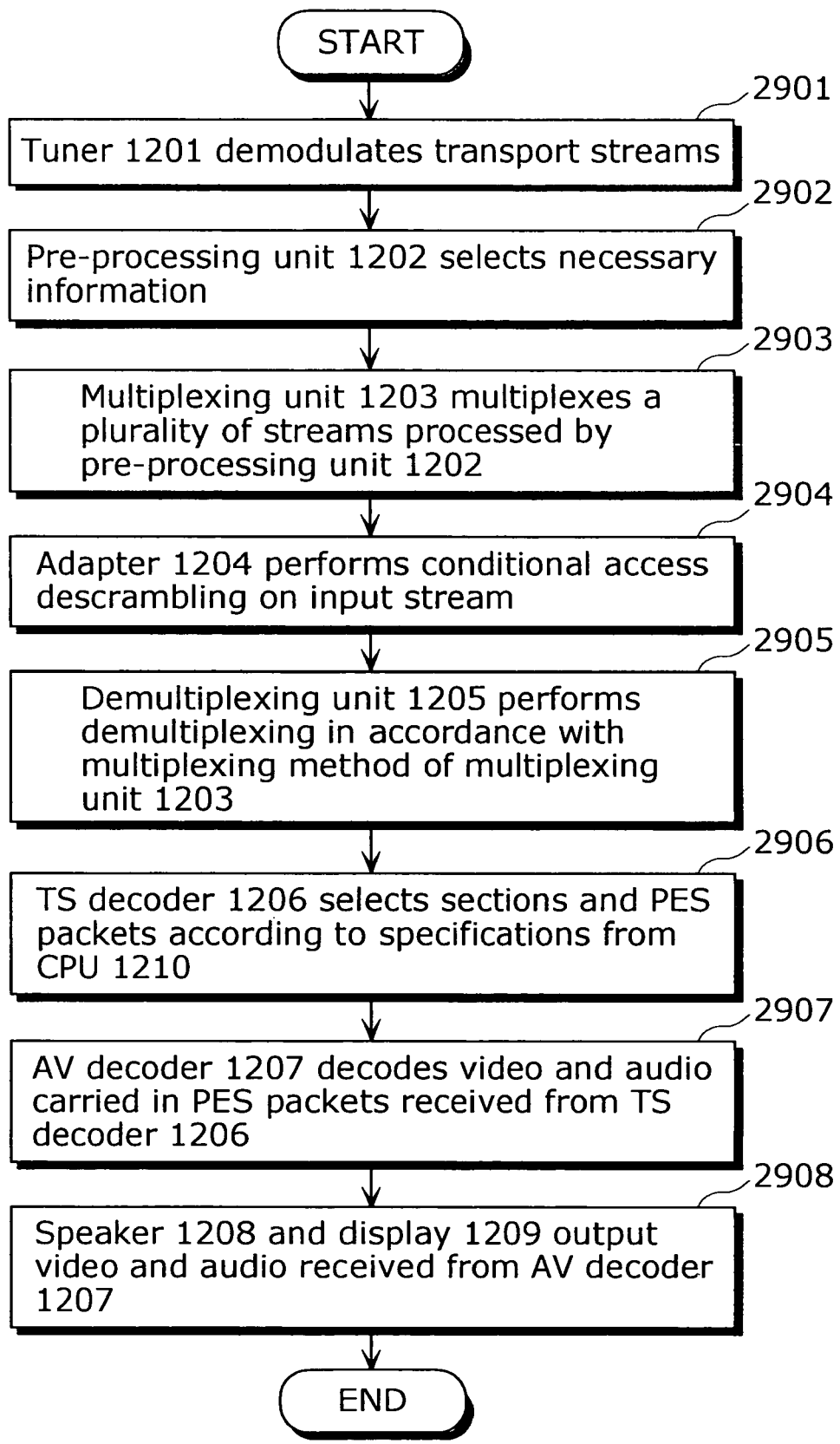
FIG. 30 is a flowchart showing operations performed by the devices included in the broadcast signal receiving apparatus according to the present invention.

FIG. 30 is a flowchart showing processing performed by the respective constituent elements shown in FIG. 13.

First, the tuner 1201 demodulates transport streams that are transmitted from the broadcasting station system 101 after being demodulated therein (Step 2901). The pre-processing unit 1202 selects only information that is required for the process of the adapter 1204 and the subsequent processes (Step 2902). Note that detailed flowcharts of the pre-processing unit are shown in FIG. 23-FIG. 26, FIG. 34, FIG. 36, FIG. 38-FIG. 40, and FIG. 42-FIG. 44. Next, the multiplexing unit 1203 multiplexes streams selected by the pre-processing unit 1202 (Step 2903). Detailed flowcharts of the multiplexing unit 1203 are shown in FIG. 27 and FIG. 28. The adapter 1204 receives, as an input, the transport stream that has been processed by the pre-processing unit 1202 and the multiplexing unit 1203, and performs its processing. For example, in the case where the adapter 1204 is equipped with a conditional access descrambler apparatus, it descrambles information specified by the CPU to provide access to such information protected by conditional access, while distinguishing each multiplexed transport stream that has been inputted (Step 2904). The demultiplexing unit 1205 receives, from the adapter 1204, the stream that has been descrambled, and demultiplexes a part or the whole of the information multiplexed by the multiplexing unit 1203 from such received stream, in accordance with the multiplexing method used by the multiplexing unit 1203 (Step 2905). Here, it is also possible for the demultiplexing unit 1203 to convert the demultiplexed streams into the format that can be processed by the TS decoder 1206, and output the resultant streams. The TS decoder 1206 selects sections and PES packets according to specifications from the CPU (Step 2906). The AV decoder 1207 receives PES packets selected by the TS decoder 1206, and decodes video and audio (Step 2907). The speaker 1208 and the display 1209 output the audio and video received from the AV decoder 1207 (Step 2908).

Note that the input unit 1214 receives a user request, which is conveyed to each device from the CPU 1210 in the form of instructions. Each device performs its processing in response to such instructions from the CPU 1210. Note that each device may operate on its own rather than in response to instructions from the CPU 1210. Furthermore, the secondary storage unit 1211, the primary storage unit 1212, and the ROM 1213 are available for reference according to need when the CPU 1210 performs processing or on other occasions. Note that in addition to requests from the user, the CPU 1210 is also capable of conveying, to each device, instructions from a program running on the CPU, and performing its operation.

Second Embodiment

Figure 33:
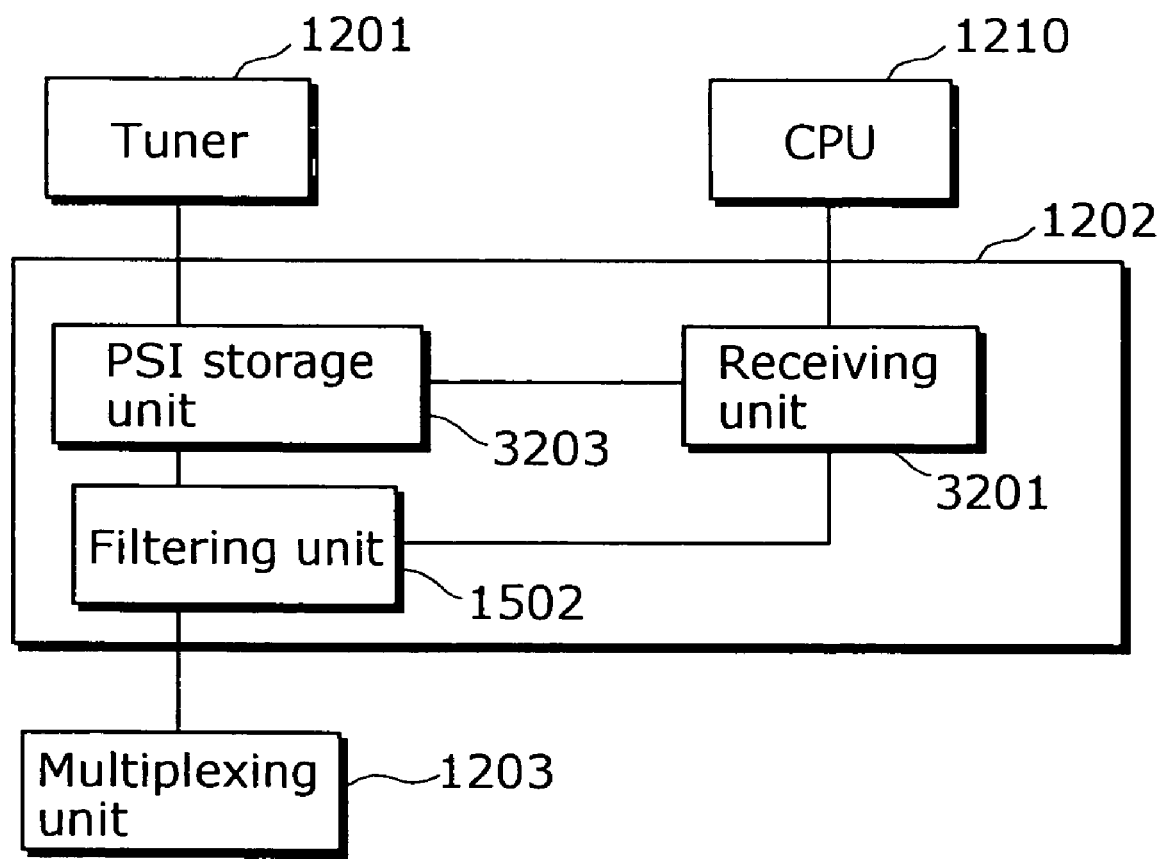
FIG. 33 is a diagram showing a construction of the pre-processing unit included in the broadcast signal receiving apparatus according to the present invention.

In the first embodiment, FIG. 16 is used as a block diagram that shows an internal construction of the pre-processing unit 1202, but it is possible for the pre-processing unit 1202 to be composed of a receiving unit 3201, the filtering unit 1502, and a PSI storage unit 3203 as shown in FIG. 33. Note that in the second embodiment, only functions additional to the functions described in the first embodiment are explained.

Figure 34:
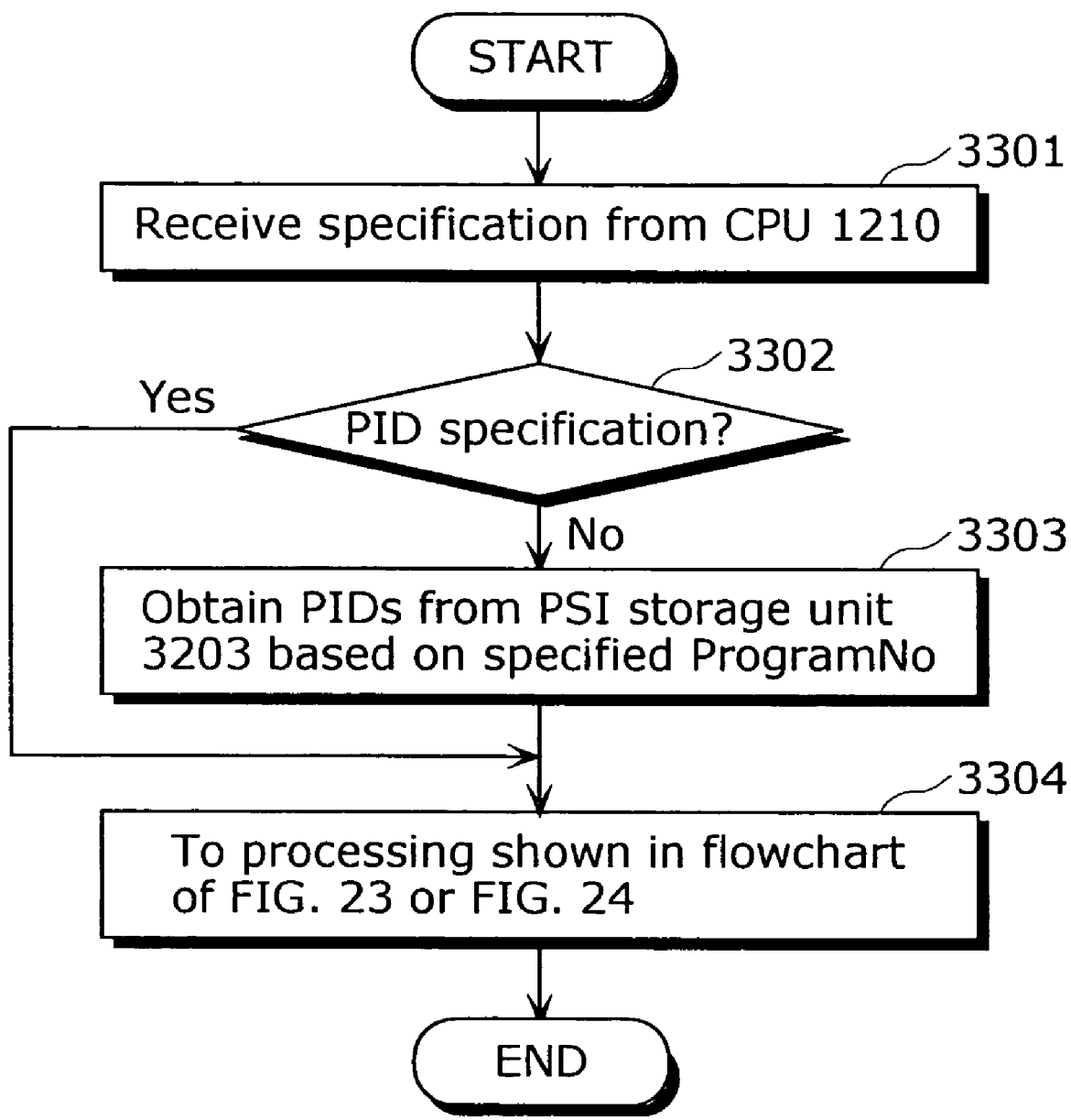
FIG. 34 is a flowchart showing an operation performed by the receiving unit included in the pre-processing unit.

FIG. 34 is a flowchart showing processing performed by the receiving unit 3201.

The receiving unit 3201 receives a specification from a program running on the CPU 1210 (Step 3301). When a PID is specified (Step 3302), the processes presented in the first embodiment are performed (Step 3304). Note that as described in the first embodiment, it is possible to further add related PIDs other than the specified PID by using the PSI storage unit of the present embodiment, when the process of automatic addition/removal of PID is performed. Data used to specify a PID must include data to be processed inside the adapter 1204 and data that is required for the process to be performed inside the adapter 1204. For the POD 3004 which performs descrambling, for example, it is possible to automatically add, at the receiving unit 3201 side, data required for descrambling in addition to a PID specified by the user or a program running on the CPU 1210.

An example of data required for descrambling is information such as CAT, EMM, and Entitlement Control Message (ECM). A CAT is carried in a packet with a PID "0x01". The PID of a packet carrying an EMM is described as a CA_PID in the CA_descriptor in the CAT. The PID of a packet carrying an ECM is specified as a CA_PID in the CA_descriptor in a PMT. This C-A_descriptor may be specified either on a service basis or on an ES basis in a PMT. Thus, in the case where a PID is specified and a service of a PMT that includes such PID or an ES specified by such PID includes CA_descriptor, it is also possible to set the PID of a packet that carries an ECM described in such CA_descriptor. Also in the case where ProgramNo is specified and a PMT with such specified ProgramNo includes CA_descriptor, it is possible to set the PID of a packet that carries an ECM without exception.

Furthermore, when a plurality of CA_descriptors are specified, it is also possible to include, as data required for descrambling, ECM(s) and EMM(s) that are described in one or more, or all of such CA_descriptors. Moreover, in addition to the ECMs, it is also possible to add the PIDs of PMTs and the PID of a PAT that describe these ECMs. Note that when a service (PMT) that includes the specified PID includes CA_descriptor, it is possible for the receiving unit 3201 to perform a specification on a service-by-service basis so that all ESs (including EMMs) included in the PMT may be set. Furthermore, a CAT and an EMM may be specified at all time. Note that the description is given here on the assumption that a CAT and an EMM are carried in each transport stream, but a CAT may be transmitted over a transmission path such as OOB when it is available. Also note that the description is given here that an EMM is specified in a CAT but an EMM may also be specified in an original private section having the equivalent function.

Moreover, regarding CA_descriptor, it is also possible to use another descriptor having the equivalent function when performing a specification.

Furthermore, it is possible to include, as data required for descrambling, specific packets or ESs even if they are not directly required for descrambling.

Meanwhile, in the case where a ProgramNo is specified, PIDs to be specified are obtained from the PSI storage unit based on such specified ProgramNo (Step 3303). In the following, a method for performing a specification on a service basis such as by use of ProgramNo is taken into account. Basic principles include: select/remove some or all of the streams constituting services other than the specified service; select/remove each PID inside the specified service; and determine a PID in consideration of the selection/removal of data that does not depend on the specified service. An example is given below.

First, it is conceivable that a search is made for another PMT with the same ProgramNo on the basis of the specified ProgoramNo, and the PIDs of all the ESs included in such discovered PMT are obtained.

Furthermore, it is also possible to add the PIDs of a PAT and a PMT. As for the addition of PMTs, it is either possible to add a PMT with the specified ProgramNo or to include a PMT of another service. Alternatively, it is also possible to simply obtain the PIDs of audio and video ESs and a PCR. Also, in the case where data is in a scrambled form, it is also possible to include information necessary for descrambling (one or more, or all of an EMM, a CAT, and an ECM) as described above. PIDs that are obtained in the above manner are additionally set to the filtering unit 1502 (Step 2304). Furthermore, it is also possible to set these PIDs to the filtering unit 1502 for removal (Step 2303).

To further give an example of PID removal, it is also possible to remove specific ES(s) (only video and audio ESs, or only a video ES, or only an audio ES) included in a PMT that can be traced from a PAT, other than a PMT with the specified ProgramNo, or to remove all ESs included in a PMT that can be traced from a PAT, other than a PMT with the specified ProgramNo.

As described above, by removing the ESs of a service except for those of the PMT with the specified ProgramNo, it becomes possible to specify packets that cannot be traced from a PAT or a PMT and to minimize the capacity of each transport stream since unspecified ESs, e.g., a video ES, are removed. Meanwhile, when only a ProgramNo is specified for removal, it is also possible to remove only packets that can be traced from a PMT with such specified ProgramNo. Note that in the case where a plurality of services are wished to be specified, it is possible to specify a plurality of ProgramNos to specify the addition/removal of the corresponding services.

Furthermore, it is also possible to obtain, from the PSI storage unit 3203, required structure information in binary form, and to determine in the receiving unit which PIDs are required. Example structure information required is PAT, PMT, and the like. Although the above descriptions have been given for the case where the PSI storage unit 3203 is implemented as a simple storage unit, but if the PSI storage unit 3203 is implemented as a library or an independent program, it becomes also possible that the receiving unit sets a ProgramNo to the PSI storage unit 3203, which then determines which PIDs are necessary. Note that in the case where a ProgramNo is set to the PSI storage unit 3203, there might arise a case where some of the ESs inside a PMT with such ProgramNo have changed. In such case, the PSI storage unit 3203 monitors the PMT with the specified ProgramNo so as to check if the PMT is updated or not. When an update of the PMT is detected, the receiving unit 3201 receives, from the PSI storage unit, information about the updated PMT such as the PID of a newly added ES, and sets such information to the filtering unit 1502.

Note that the information about the updated PMT may also be set to the filtering unit 1502 directly by the PSI storage unit 3203. As described above, by performing a specification using ProgramNo, even if multi-angle information and the like is added to transport streams being broadcast (even if the amount of ES information increases/decreases), it becomes possible to automatically obtain such information. Note that a service being transported is specified by use of a ProgramNo here, but the present invention is also applicable to the case where other information such as service name is used to specify each service.

The PSI storage unit 3203, a concrete constituent element of which is a primary memory such as a RAM, is used by the receiving unit when it temporarily makes reference to data at its processing time. Note that it is also possible to obtain required packets from each transport stream every time a specification of ProgramNo is received from the receiving unit. In order to allow this, the PSI storage unit 3203 holds or obtains stream structure information such as PAT and PMT. Accordingly, when a ProgramNo is specified, a PMT with the same ProgramNo is searched, and PIDs included in such PMT as well as the PID of the PMT can be returned. Meanwhile, when a service is specified by use of a PID, it is also possible to obtain a service (PMT) including such PID and to return the ProgramNo of such service.

Furthermore, it is also possible to cache a PAT and PMTs themselves in the PSI storage unit 3203, and return them to the receiving unit in binary form. Note that the above descriptions are given for the case where the PSI storage unit 3203 is implemented as a storage unit, but it may also be implemented as software running on the CPU. Moreover, it is not necessary for the PSI storage unit 3203 to exist as an independent unit and therefore it may exist as part of the receiving unit 3201 and the filtering unit 1502. Also note that the PSI storage unit 3203 is further capable of automatically detecting an update of a PMT having a ProgramNo specified by the receiving unit 3201 as well as capable of newly notifying the receiving unit 3201 of the addition or removal of PID in response to an increase/decrease of an ES detected as an update. Note that this notification may be made directly to the filtering unit 1502.

The filtering unit 1502 with the function equivalent to that presented in the first embodiment is applicable to the second embodiment too.

The function of each constituent element described in the preset embodiment may be implemented either as hardware or software that runs on the CPU.

Third Embodiment

Figure 35:
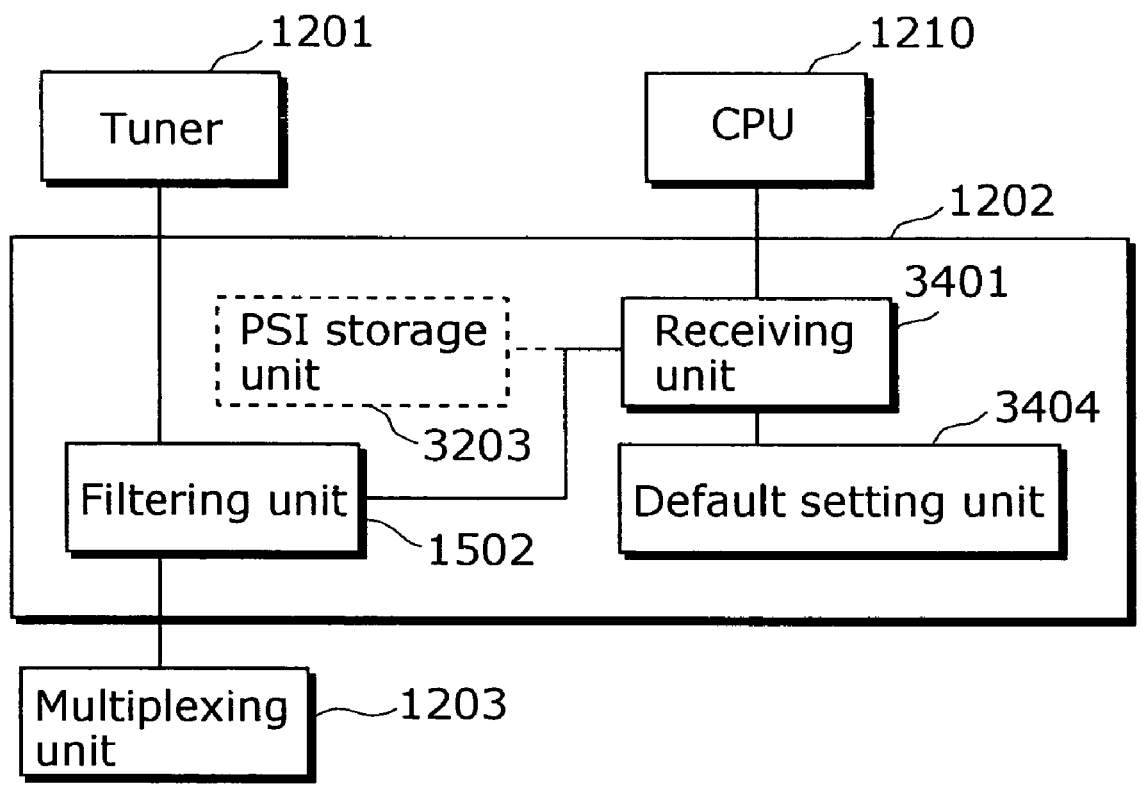
FIG. 35 is a diagram showing a construction of the pre-processing unit included in the broadcast signal receiving apparatus according to the present invention.

In the first embodiment, FIG. 16 is used as a block diagram that shows an internal construction of the pre-processing unit 1202, but it is also possible for the pre-processing unit 1202 to be composed of a receiving unit 3401, the filtering unit 1502, and a default setting unit 3404, as shown in FIG. 35. Furthermore, the PSI storage unit 3203 described in the second embodiment may further serve as a constituent element. Note that in the third embodiment, only functions additional to the functions described in the first and second embodiments are explained.

Figure 36:
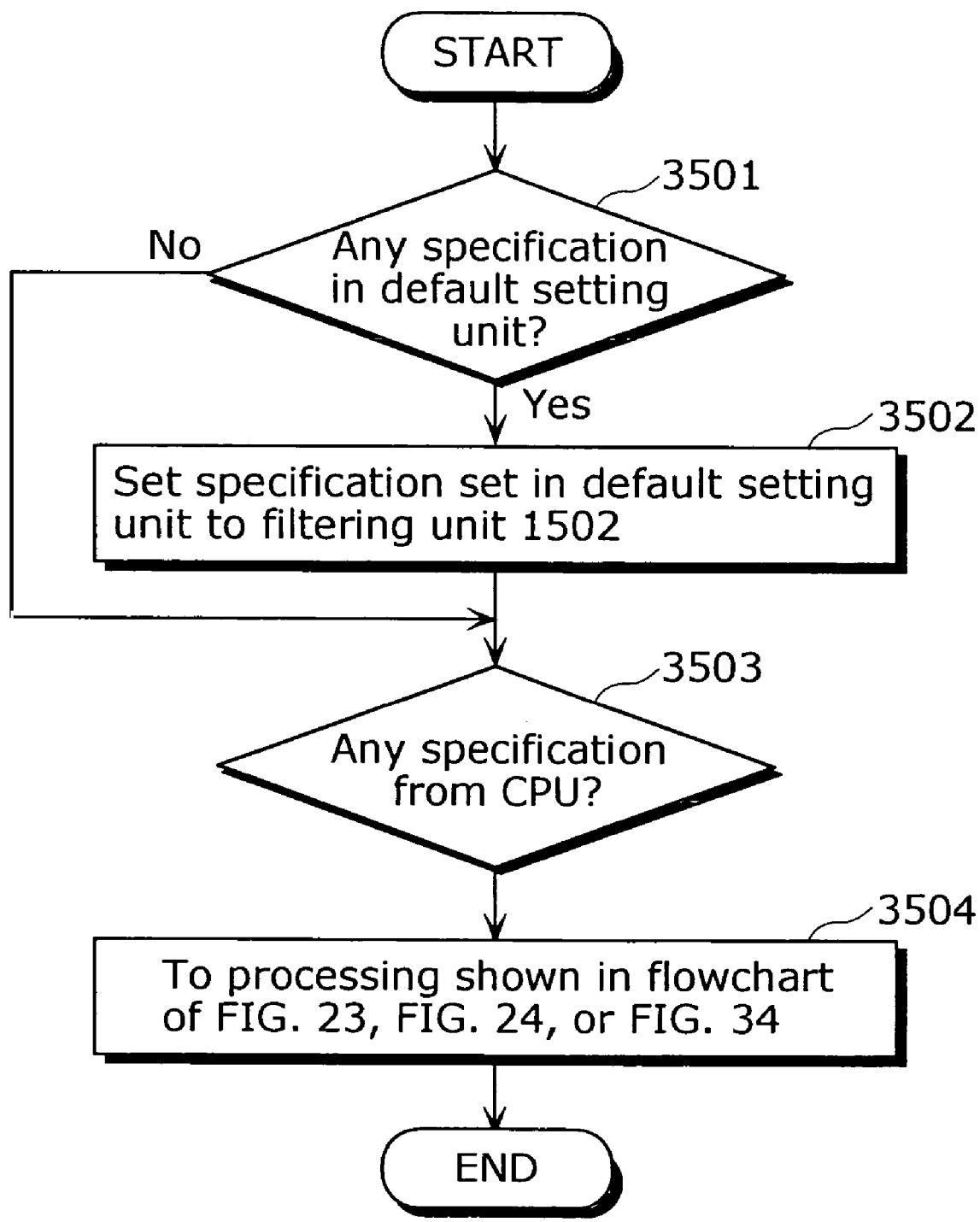
FIG. 36 is a flowchart showing an operation performed by the receiving unit included in the pre-processing unit.

FIG. 36 is a flowchart showing processing performed by the receiving unit 3401.

The receiving unit 3401 is capable of setting a specification from a program running on the CPU 1210 to the default setting unit 3404, and obtaining a filtering condition from the default setting unit 3404 so as to set it to the filtering unit 1502 (Step 3502). This function is assumed to be used, for example, when no instruction is sent from the CPU and when the receiving unit is initialized. When another specification is newly received from the program running on the CPU 1210 after the setting of the default setting unit 3404 is applied to the filtering unit 1502, it is possible to apply such setting to the filtering unit (Step 3504).

To be more specific, information that is always required is set to the default setting unit 3404 which is included in the ROM. For example, it is possible to set, to the default setting unit 3404, information required for descrambling (CAT and EMM) presented in the second embodiment. Other information such as specific packets and ESs may also be set to the default setting unit 3404, which, however, are information to be set by the receiving unit 3401. In addition to setting information that is always required, it is also possible to save, before the terminal apparatus is powered off, the information that has been set to the default setting unit 3404, and to read out such setting when the terminal apparatus is powered on so as to utilize this information until it is specified by the CPU. In other words, it is also possible to read out such information at initialization time of the receiving unit and set it to the filtering unit when specified by the CPU. Note that the above specification may be performed either by use of PID or ProgramNo. Also note that the default setting unit 3404 is also capable of storing settings about addition and removal. Here, the description is given for the case where this function is implemented as a storage unit, but it may also be implemented as a library that operates upon being called by a program on the CPU. Also note that it is also possible to implement the default setting unit as part of the receiving unit 34301, the filtering unit 1502 and others.

The filtering unit 1502 with the function equivalent to that of the first embodiment is also applicable to the third embodiment.

It should be also noted that the PSI storage unit 3203 may also exist as one of a constituent element. Furthermore, the function of each constituent element described in the preset embodiment may be implemented either as hardware or software that runs on the CPU.

Fourth Embodiment

When a plurality of transport streams are handled, there exist the cases where a modification is required to be performed so as to avoid conflicts between such plurality of transport streams and where structure information about packets included in a stream selected from a transport stream is required to be rewritten so that such information agrees with the selected stream. As an example of the former case, it is possible to rewrite the PID of an overlapping packet or an overlapping ProgramNo of a service when the PID or ProgramNo that is wished to be obtained exists more than one in number in a plurality of transport streams, and then to rewrite a PAT and a PMT included in the transport stream whose information has been rewritten, so as to identify packets and services included therein. As an example of the latter case, when a PID or a ProgramNo is specified from a transport stream, it is possible to rewrite a PAT or a PMT included in such transport stream, so that no inconsistency occurs between the actually selected stream and such PAT and PMT.

Figure 37:
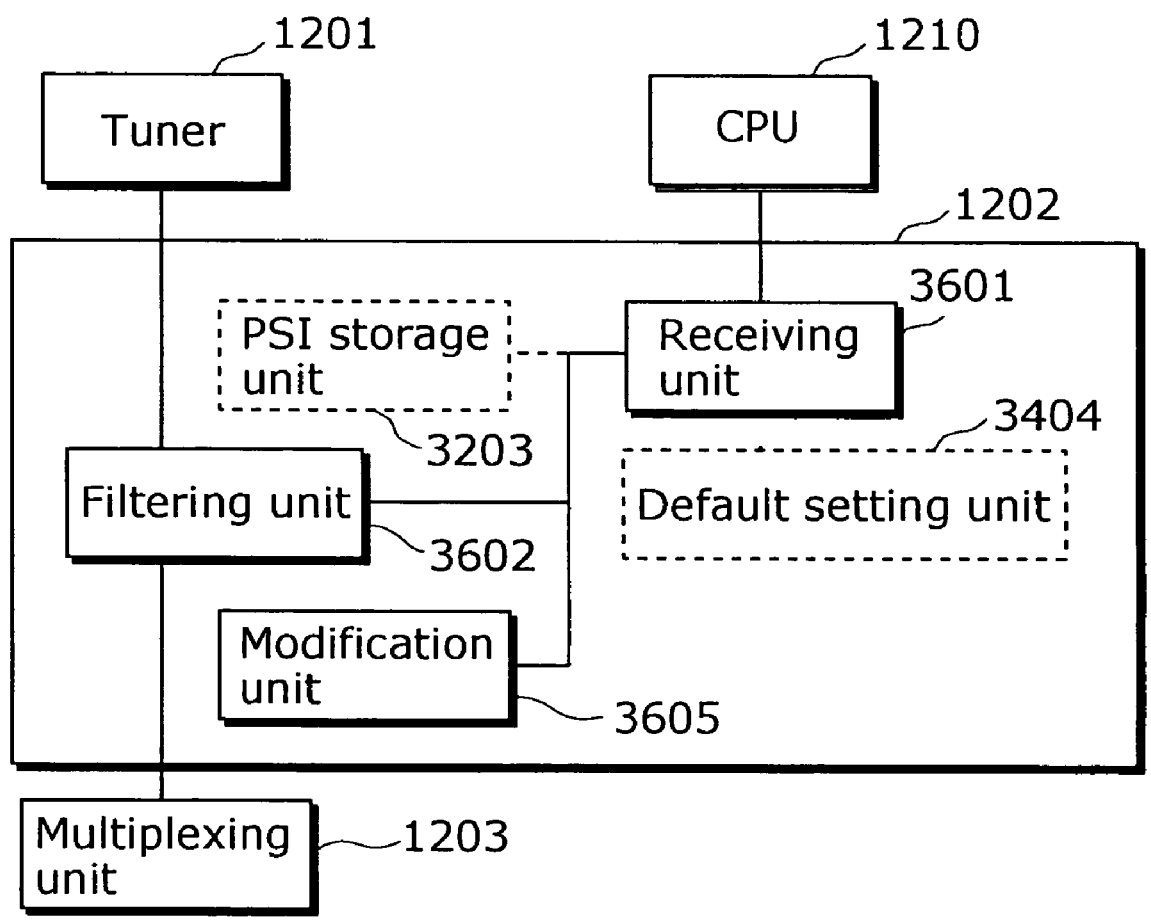
FIG. 37 is a diagram showing a construction of the pre-processing unit included in the broadcast signal receiving apparatus according to the present invention.

In the first embodiment, FIG. 16 is used as a block diagram that shows an internal construction of the pre-processing unit 1202, but it is also possible for the pre-processing unit 1202 to be composed of a receiving unit 3601, a filtering unit 3602, and a modification unit 3605, as shown in FIG. 37. Furthermore, one or both of the PSI storage unit 3203 described in the second embodiment and the default setting unit 3404 described in the third embodiment may further serve as constituent element(s). Note that in the fourth embodiment, only functions additional to the functions described in the first, second, and third embodiments are explained.

Figure 38:
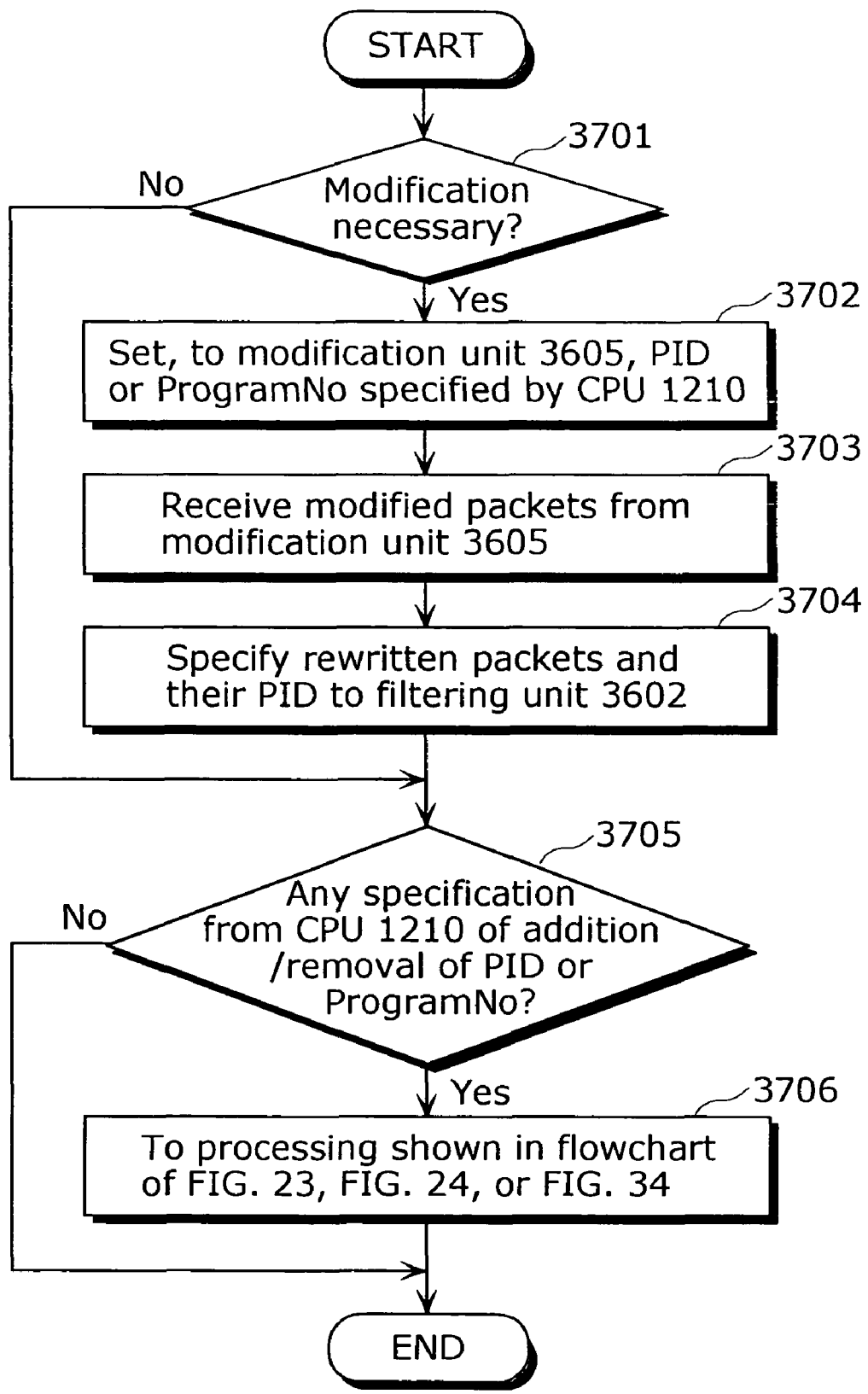
FIG. 38 is a flowchart showing an operation performed by the receiving unit included in the pre-processing unit.

FIG. 38 is a flowchart showing processing performed by the receiving unit 3601.

When receiving a request for packet modification from a program running on the CPU 1210, or when recognizing by itself the necessity of packet modification (Step 3701), the receiving unit 3601 sets, to the modification unit 3605, a PID or a ProgramNo that needs to be rewritten (Step 3702). Then, the receiving unit 3601 receives rewritten packets from the modification unit 3605 (Step 3703), and specifies such packets and their PID to the filtering unit 3602 (Step 3704). Meanwhile, when the program running on the CPU 1210 specifies a PID or a ProgramNo to be added/removed (Step 3705), it is possible for the receiving unit 3601 to set such specification to the filtering unit (Step 3706).

Figure 39:
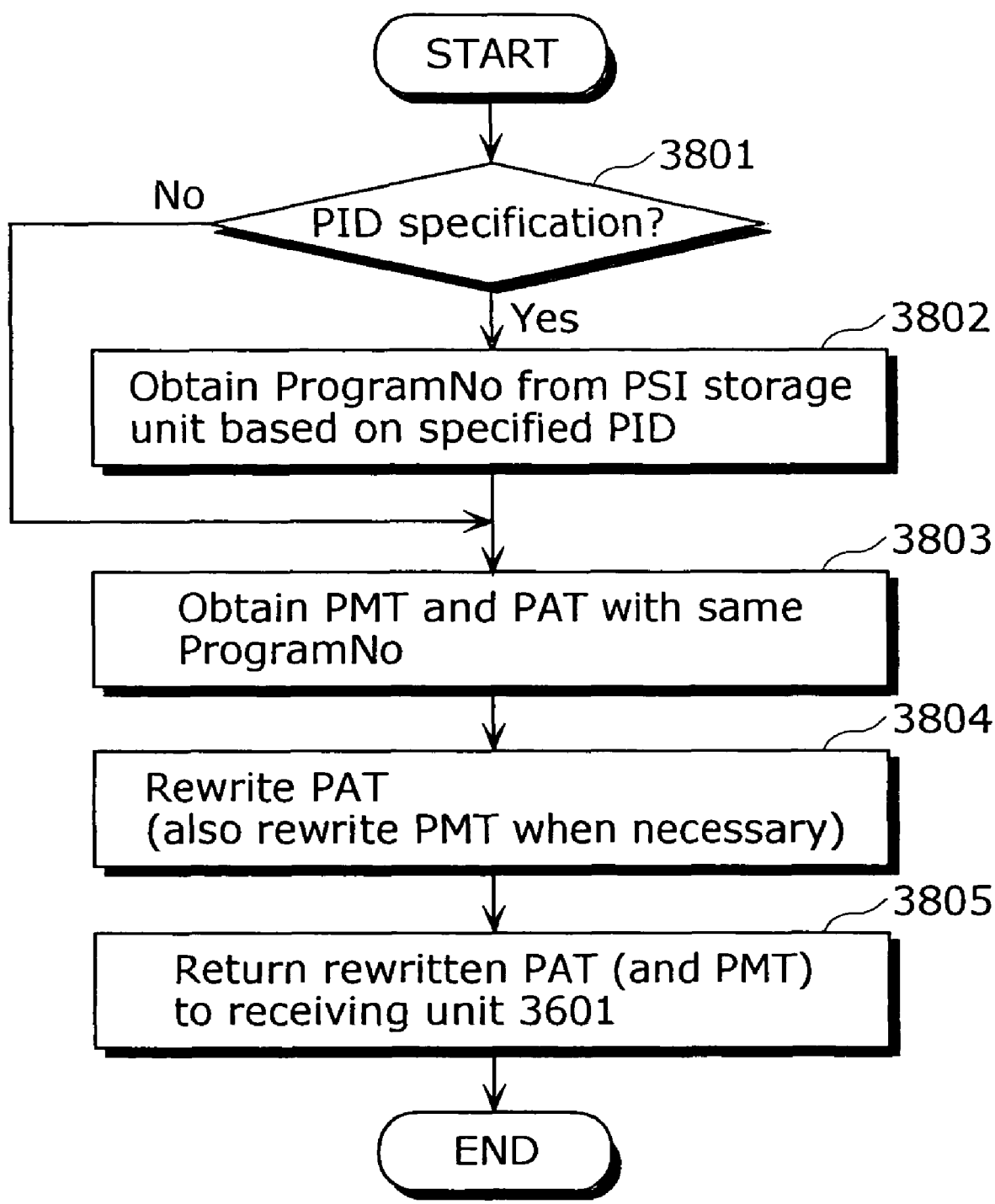
FIG. 39 is a flowchart showing an operation performed by a modification unit included in the pre-processing unit.

FIG. 39 is a flowchart showing processing performed by the modification unit 3605.

The modification unit 3605 receives a specification from the receiving unit 3601 of a PID or a ProgramNo of to be modified (Step 3801). When a PID is specified, the modification unit 3605 obtains, from the PSI storage unit 3203, a ProgramNo that can be traced from such specified PID (Step 3802), so as to obtain a PMT and a PAT with the same ProgramNo (Step 3803). Then, the modification unit 3605 rewrites the PMT and PAT according to a condition that has been set or in a manner that there occurs no overlap of PIDs or ProgramNos, i.e., no inconsistency occurs between the PAT and PMT and the actual data specified by the receiving unit 3601 using the PID or ProgramNo (Step 3804). Then, the modification unit 3605 returns the rewritten PAT and PMT to the receiving unit 3601 (Step 3805).

Note that the rewritten information may be set to the filtering unit 362 directly from the modification unit 3605. Although the above description has been given on the assumption that the modification unit 3605 rewrites a PAT and a PMT serving as structure information, but it is also possible to make a modification of other packets where necessary. Also, even when there is an inconsistency between the PAT and PMT and the actual transport stream, it is not necessary for the modification unit 3605 to perform modification if the program running on the CPU 1210 can judge whether a selected stream actually exists or not and if the program on the CPU 1210 requires the original PAT and PMT. Note that the modification unit 3605 may operate in one or both of the pre-processing unit 1202 and the multiplexing unit 1203.

Note that it is also possible to perform a modification of a PMT that is a minimum process to be performed by the modification unit 3605 inside the pre-processing unit 1202, and to perform a modification of a PAT in the multiplexing unit 1203. Furthermore, the present function may be implemented either as hardware or as a library that operates upon being called by a program on the CPU, as well as being implemented as an independent program that is generated at the power-on of the terminal apparatus or that is generated by a program on the CPU. Note that each process of the modification unit 3605 may be implemented as part of the receiving unit 3601, the filtering unit 3602, or other functions. What is more, it is also possible for the receiving unit 3601 to directly receive packets to be modified from the CPU 1210 and to set such received packets to the filtering unit 3602.

Figure 40:
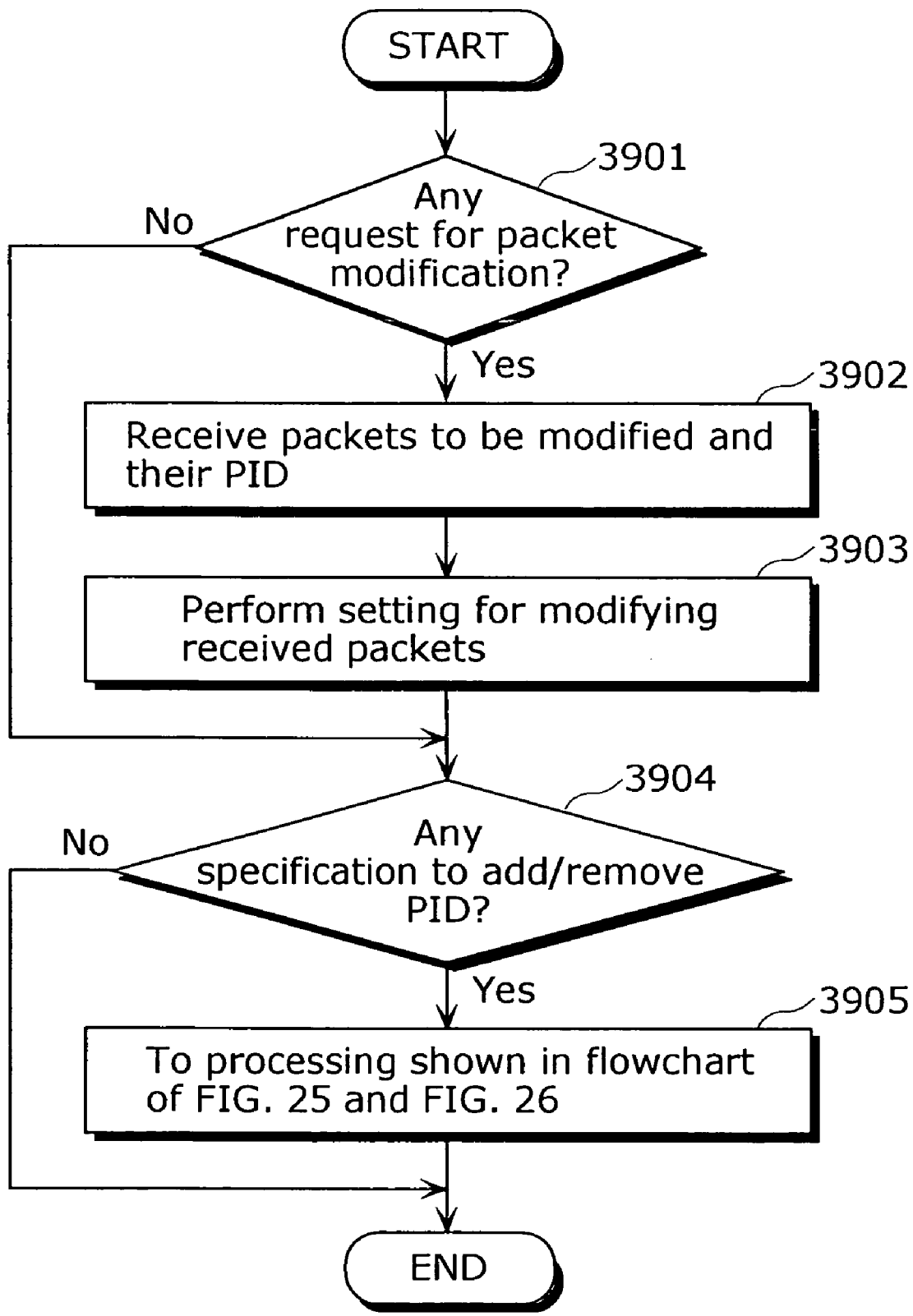
FIG. 40 is a flowchart showing an operation performed by the filtering unit included in the pre-processing unit.

FIG. 40 is a flowchart showing processing performed by the filtering unit 3602.

When receiving a request for packet modification from the receiving unit 3601 (Step 3901), the filtering unit 3602 receives packets per se to be modified and their PID (Step 3902), and performs a setting for modification of the received packets (Step 3903). When a modification request is further received from the receiving unit 3601, the filtering unit 3602 performs filtering of packets.

The default setting unit 3404 is also capable of storing information about packets modified by the modification unit 3605.

Note that it is also possible to include the PSI storage unit 3203 as a constituent element. Also note that the function of each constituent element described in the preset embodiment may be implemented either as hardware or software running on the CPU.

Fifth Embodiment

Figure 41:
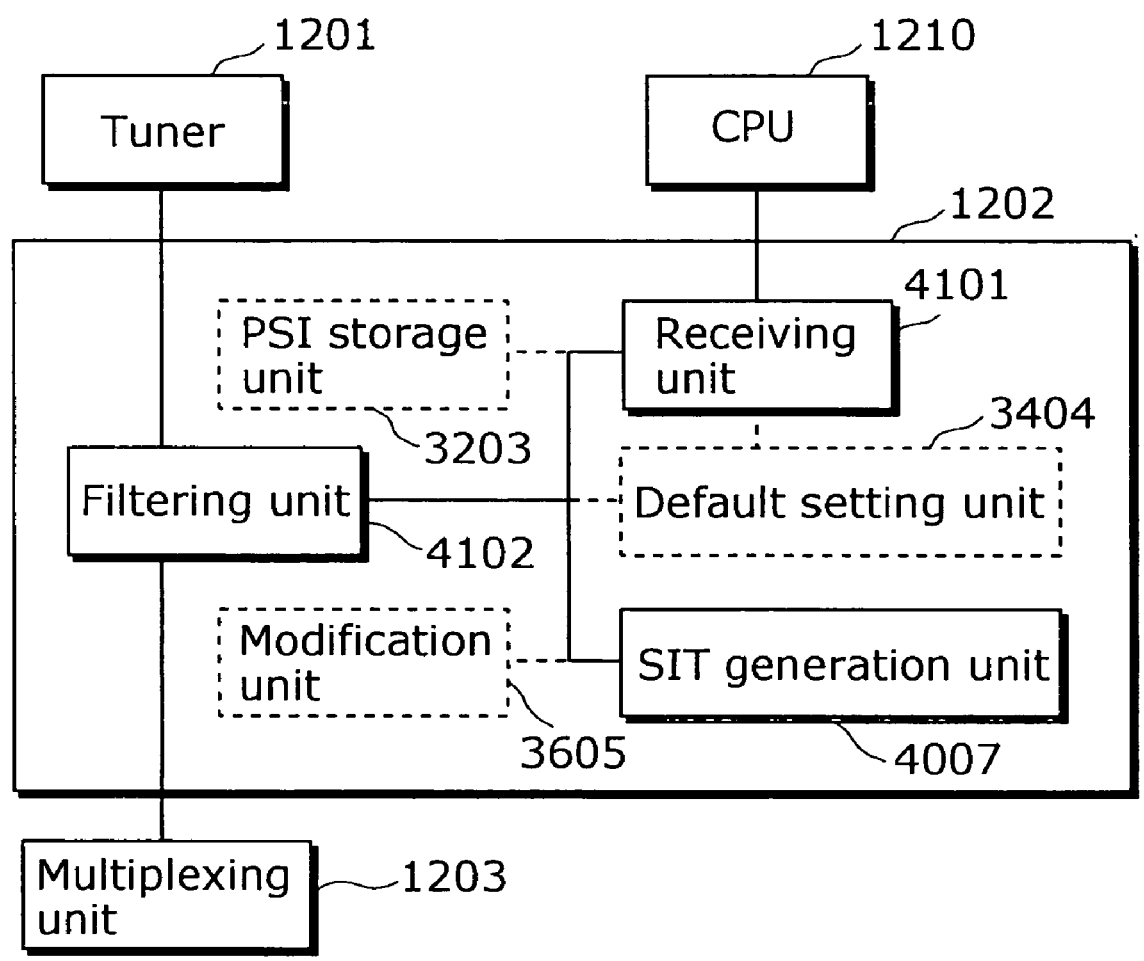
FIG. 41 is a diagram showing a construction of the pre-processing unit included in the broadcast signal receiving apparatus according to the present invention.

In the first embodiment, FIG. 16 is used as a block diagram that shows an internal construction of the pre-processing unit 1202, but it is also possible for the pre-processing unit 1202 to be composed of a receiving unit 4001, a filtering unit 4002, and an SIT generation unit 4007, as shown in FIG. 41. Furthermore, one or both of the PSI storage unit 3203 described in the second embodiment, the default setting unit 3404 described in the third embodiment, and the modification unit 3605 described in the fourth embodiment, may further serve as constituent element(s). Note that in the fifth embodiment, only functions additional to the functions described in the first, second, third, and fourth embodiments are explained.

Figure 42:
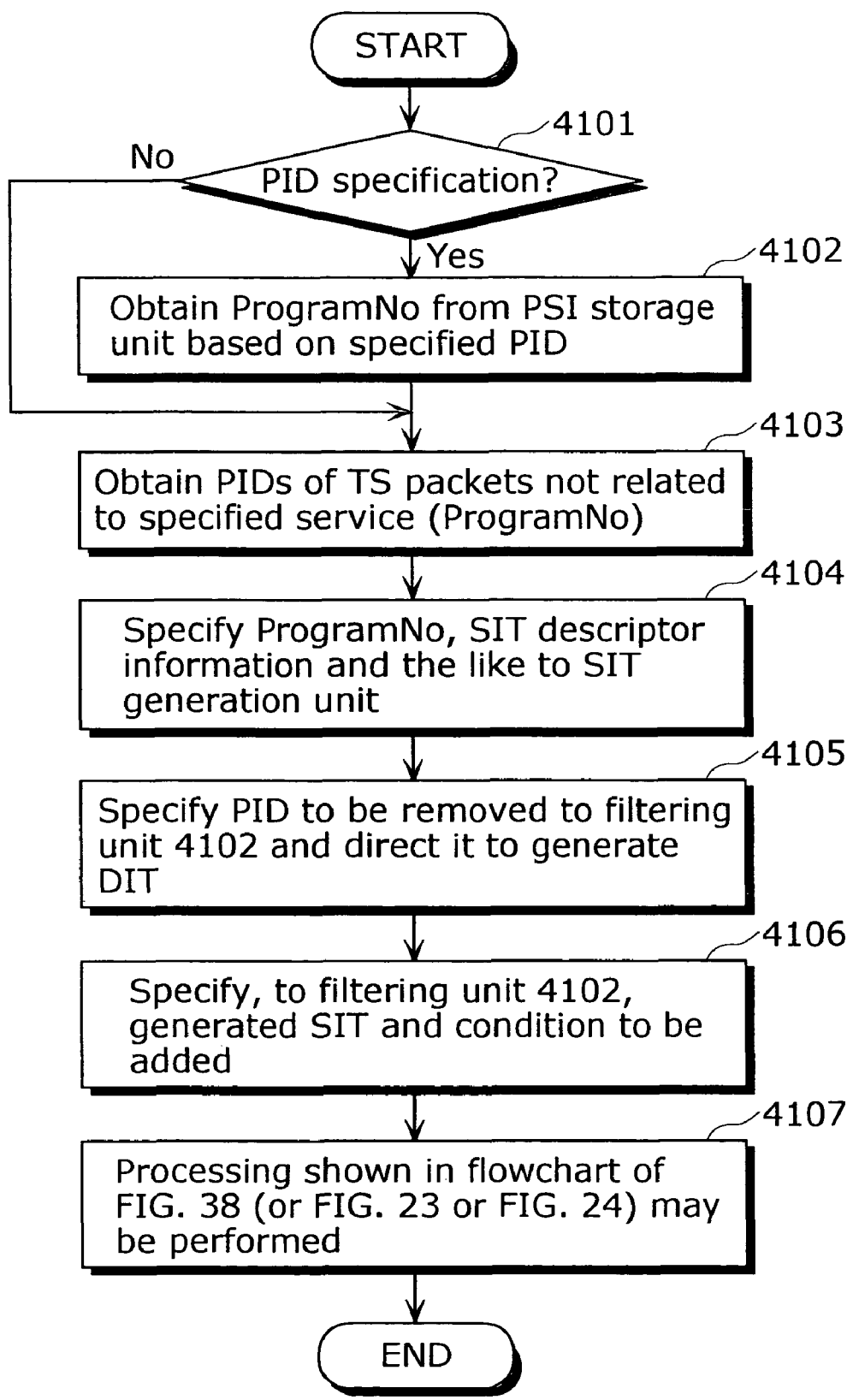
FIG. 42 is a flowchart showing an operation performed by the receiving unit included in the pre-processing unit.

FIG. 42 is a flowchart showing processing performed by the receiving unit 4001.

When a PID is specified by a program running on the CPU 1210, the receiving unit 4001 obtains, from the PSI storage unit 3203, a ProgramNo that can be traced from such specified PID (Step 4102). Based on the obtained ProgramNo, the receiving unit 4001 obtains the PIDs of TS packets that are not related to the specified service (Step 4103). Note that the PIDs of unrelated packets are obtained here, but it is also possible to obtain ProgramNos that are not related or to perform specification so that only a related PID or ProgramNo can be selected.

A bitstream that is obtained by removing, from an MPEG2 transport stream, a stream that is not related to specially selected one or more services is referred to as a "partial transport stream". A method for generating partial transport stream is defined by the operating requirements. It is conceivable that the partial stream generation method defined in such operating requirements is utilized here as an example method for obtaining the unrelated PIDs.

A partial transport stream is generated when a service is stored into a storage medium such as a Blue-ray Disc (BD). It is generally known that a partial transport stream is generated when a transport stream is outputted to an IEEE1394 serial bus. The compliance with such standard specification makes it possible to maintain compatibility with the conventional systems with regard to the storage into a storage medium and output to IEEE. Examples of the specifications that define partial transport streams include ARIB STD-B21 and ARIB TR-B15 of BS digital broadcasting, EN300 468 of European digital broadcasting, and EIA/CEA-775.2 of North American digital broadcasting. These specifications define the following concerning partial transport streams: the basic structure of service information and the operating requirements of identifiers; data structure of service information and its definition; and the operating method for tables.

The tables here include Discontinuity Information Table (DIT) and Selection Information Table (SIT). A DIT indicates a point at which the service information carried in a partial transport stream could be discontinuous, whereas a SIT indicates information related to a service carried in a partial transport stream. For example, ARIB defines that it is mandatory to send out a DIT and a SIT and includes detailed descriptions about SIT descriptors. Furthermore, according to ARIB, PSI data is limited to PAT and PMT, while other information such as NIT is described as SIT descriptors. The SIT includes a summary of all service information of broadcast streams related to a partial transport stream, and no service information other than the SIT shall be carried. Refer to the above specifications for details.

When using the above specifications of partial transport streams, since it is necessary to generate a SIT in order to obtain, from each transport stream, a service with a PID or a ProgramNo specified by a program on the CPU, the receiving unit 4001 specifies, to the SIT generation unit 4007, the ProgramNo and SIT descriptor information to be generated (Step 4104). As the SIT described in the present embodiment, a SIT to and from which additional information (e.g. program information and user information) is added/removed is also applicable, in addition to a SIT defined by the operating requirements such as ARIB. Note that the above specification of the ProgramNo and descriptor information to the SIT generation unit 4007 is optional. For example, since the operating requirements of the North American broadcasting does not define the insertion of SIT as a mandatory process, the specification to the SIT generation unit 4007 in Step 4104 may not be performed.

Then, the receiving unit 4001 specifies a PID to be removed to the filtering unit 4002 and directs it to generate a DIT (Step 4105). Note that instead of specifying a PID to be removed, it is also possible here, as in the case of Step 4103, to specify unrelated ProgramNos and send a request to remove them, or to specify a related PID/ProgramNo and send a request to select it. Furthermore, it is also possible for a direction for generating a DIT to be made only when it is specified by a program on the CPU. This is because a DIT is not necessarily required in the case where data is recorded onto a BD recorder, and the like.

Next, the receiving unit 4001 receives, from the SIT generation unit 4007, the generated SIT, and specifies it to the filtering unit 4002 together with a condition such as transmission frequencies and the like (Step 4106). Note that the present invention is applicable regardless of the orders of Step 4105 and 4106. It should be also noted that the process of Step 4106 is not required if SIT generation is not directed in Step 4104. Furthermore, the SIT generation unit 4007 may exist either independently or as part of another constituent element (e.g. the filtering unit). Furthermore, when there is a specification of a PID from the program running on the CPU 1210, it is possible to set such PID the filtering unit 4102 (Step 4107).

Figure 43:
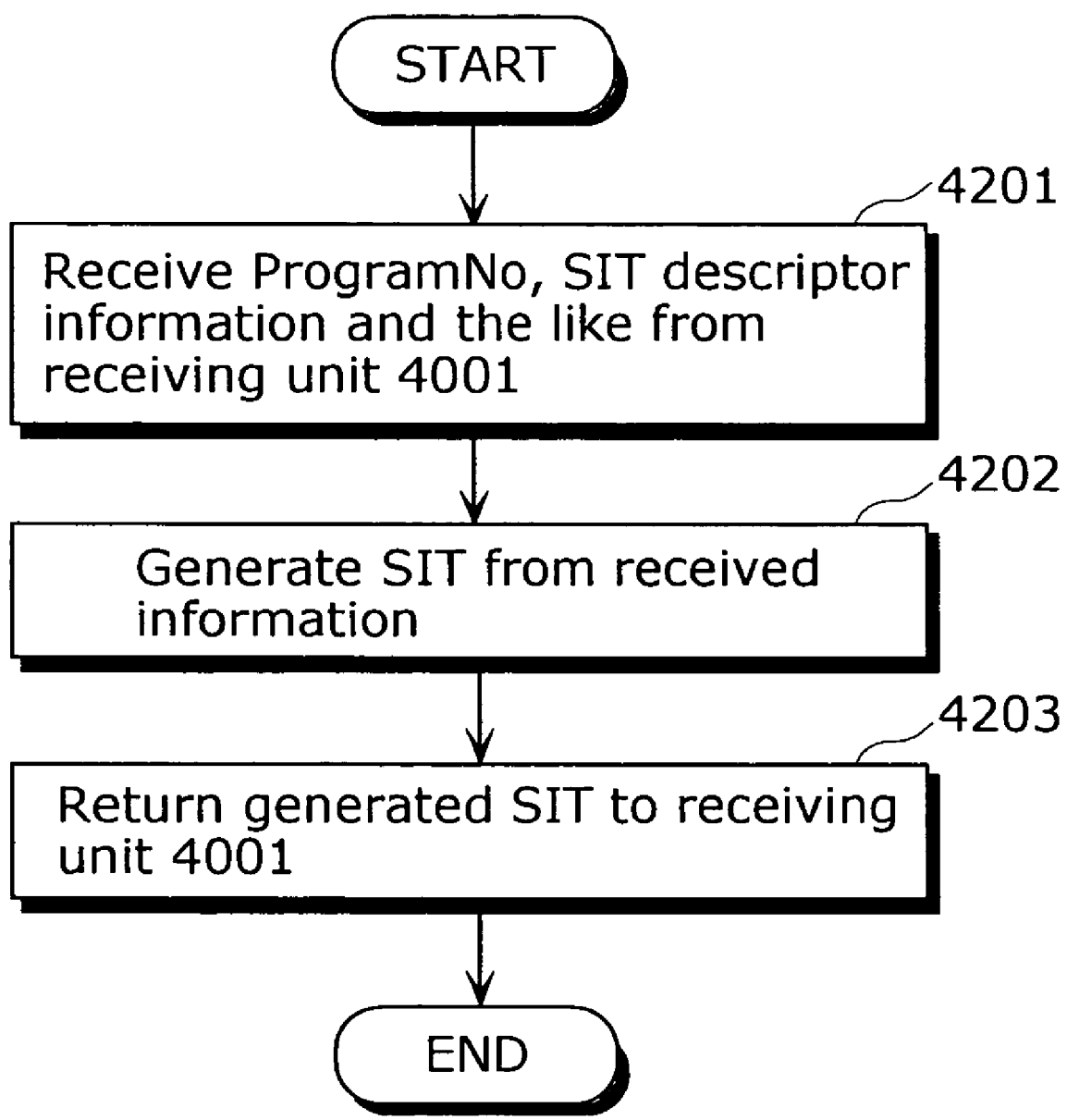
FIG. 43 is a flowchart showing an operation performed by a SIT generation unit included in the pre-processing unit.

FIG. 43 is a flowchart showing processing performed by the SIT generation unit 4007.

The SIT generation unit 4007 receives, from the receiving unit 4001, information such as a ProgramNo and SIT descriptor information (Step 4201), and generates a SIT based on the information received from the receiving unit 4001 (Step 4202). In order to generate each descriptor in the SIT, the SIT generation unit 4007 is required to obtain packets in each transport stream carrying such information. Therefore, it is necessary for the SIT generation unit 4007 to generate a SIT, while performing the buffering of packets into the memory that are required to generate a SIT. The SIT generation unit 4007 can obtain necessary packets from each transport stream by specifying them to the PSI storage unit, or directly from each transport stream. After generating a SIT, the SIT generation unit 4007 returns the generated SIT to the receiving unit 4001 (Step 4203). Moreover, it is also possible to pass the generated SIT to the filtering unit 4002 by placing it in an area from which the filtering unit 4002 can read data. It should be noted that it is also possible, of course, for the SIT generation unit 4007 to pass data of the generated SIT directly to the filtering unit 4002. SIT is also optional depending on operating requirements. Furthermore, the SIT generation unit 4007 may exist either independently or as a part of another constituent element (e.g. the filtering unit).

Figure 44:
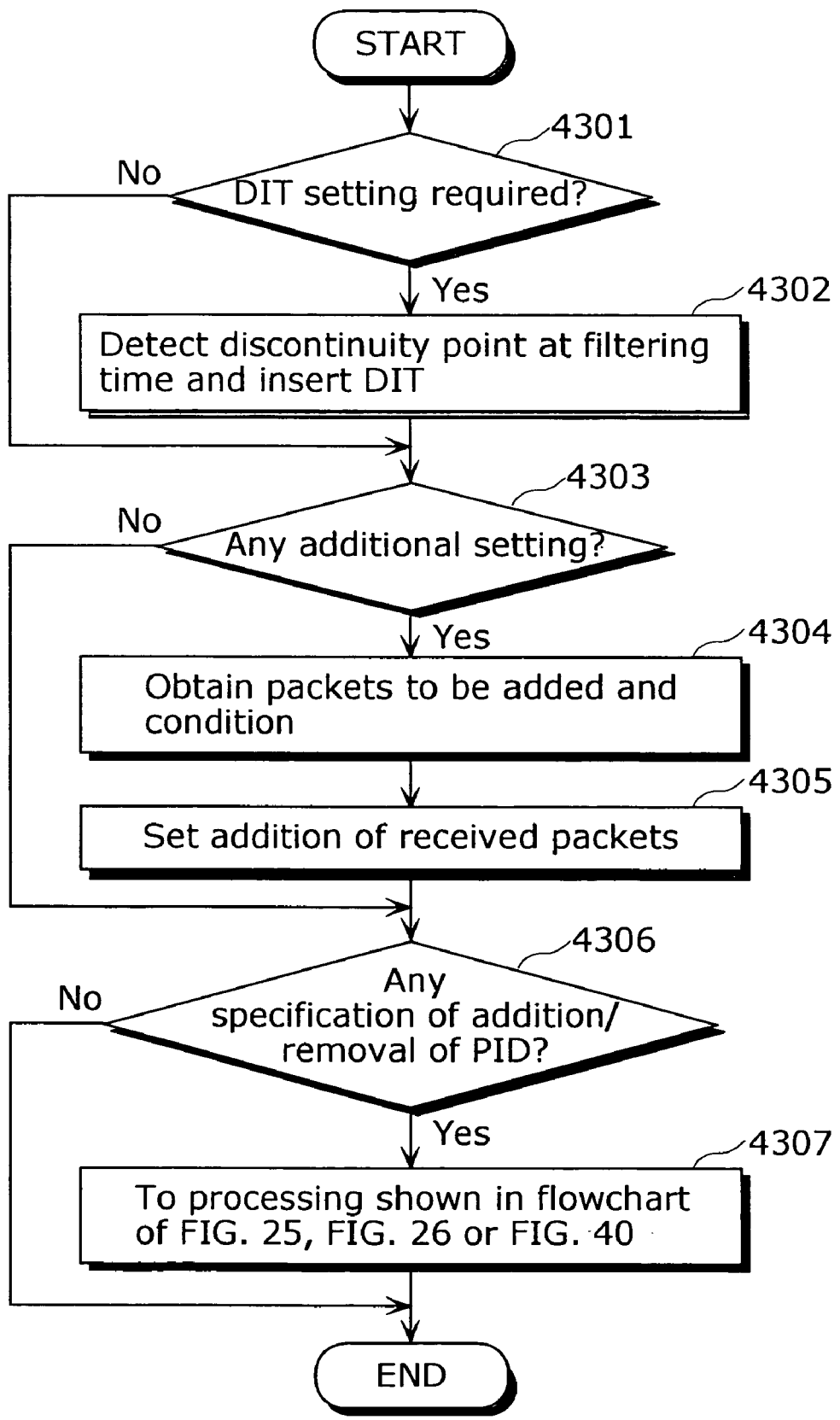
FIG. 44 is a flowchart showing an operation performed by the filtering unit included in the pre-processing unit.

FIG. 44 is a flowchart showing processing performed by the filtering unit 4002.

When required to set a DIT (Step 4301), the filtering unit 4002 inserts a DIT at the time of filtering (Step 4302). When there is a request from the receiving unit 4001 to add a SIT (Step 4303), the filtering unit 4002 obtains packets to be added and a condition such as transmission frequencies (Step 4304). Note that it is also possible for the filtering unit to obtain an SIT from a memory which is available for reference from both the receiving unit 4001/the SIT generation unit 4007 and the filtering unit 4002, and to obtain only a filtering condition from the receiving unit 4001. Next, the filtering unit 4002 adds a SIT where necessary according to the specified condition (Step 4305). Then, the filtering unit 4002 performs the above process to perform filtering for the addition/removal of the specified PID (Step 4307).

The functions of the respective constituent elements presented in the present embodiment may be implemented either as hardware or software running on the CPU.

Sixth Embodiment

In the present embodiment, headers are added to packets to identify each of a plurality of transport streams.

Figure 45:
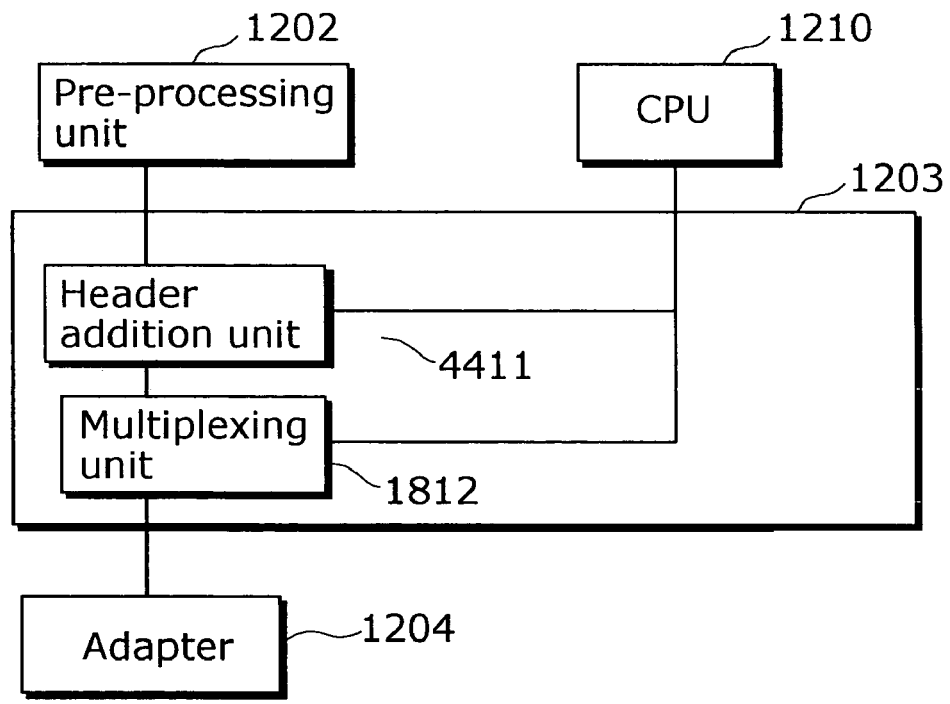
FIG. 45 is a diagram showing a construction of the multiplexing unit included in the broadcast signal receiving apparatus according to the present invention.

In the first embodiment, FIG. 19 is used as a block diagram showing an internal construction of the multiplexing unit 1203, but it is also possible for the multiplexing unit 1203 to be composed of a header addition unit 4411 and the multiplexing unit 1812 as shown in FIG. 45. Note that in the sixth embodiment, only functions additional to the functions described in the first, second, third, fourth, and fifth embodiments are explained.

Figure 47:
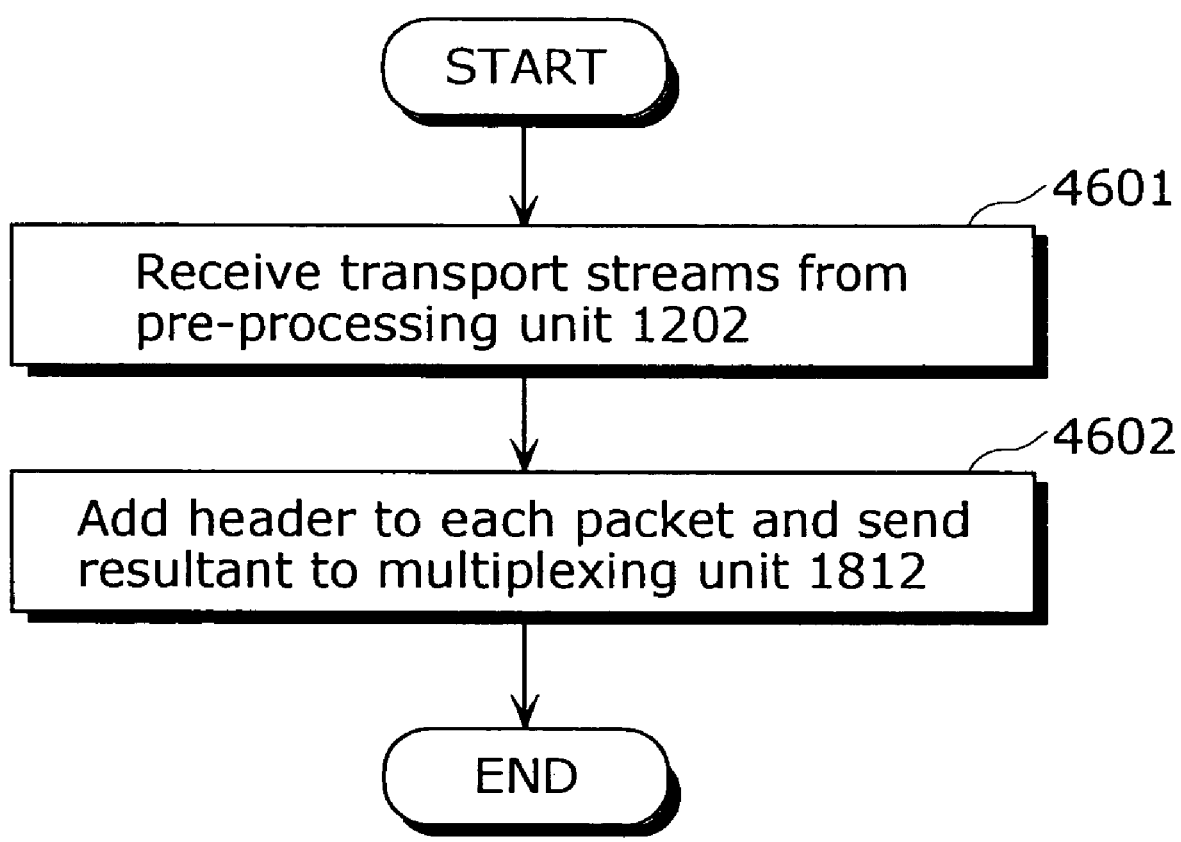
FIG. 47 is a flowchart showing an operation performed by the header addition unit included in the multiplexing unit.

FIG. 47 is a flowchart showing processing performed by the header addition unit 4411.

Figure 46:
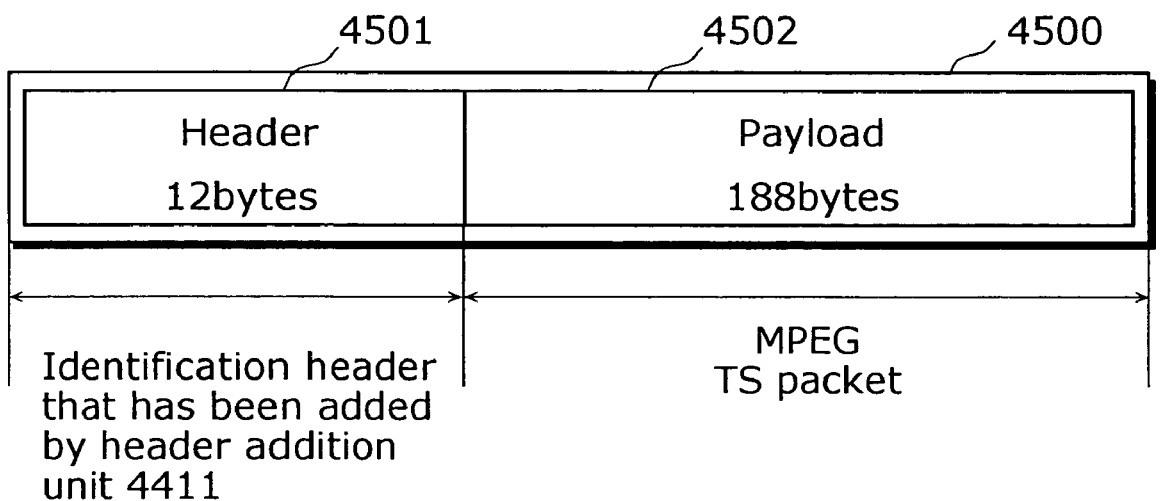
FIG. 46 is a diagram for explaining an example of a header to be added by a header addition unit included in the multiplexing unit.

The header addition unit 4411 receives a plurality of transport streams which have been pre-processed by the pre-processing unit 1202 (Step 4601). In order to identify each of these transport streams, the header addition unit 4411 adds a header to each of the currently obtained packets, and sends the packets with the headers to the multiplexing unit 1812 (Step 4602). FIG. 46 shows an example of a packet in an MPEG transport stream. 4500 is the whole packet that has been newly generated with a header added. 4501 is a header that has been added by the header addition unit 4411 in order to identify this transport stream. Note that a 12-byte header is illustrated here, but the present embodiment is applicable no matter how many bytes the packet contains. 4502 is a payload which is a packet portion that has bee there since before the header addition unit 4411 adds the header. In the case of an MPEG transport stream, 4502 corresponds to 188 bytes of an MPEG TS packet. Note that the transport stream here maybe either a transport stream of another type or an MPEG2 transport stream.

The multiplexing unit 1812 can be implemented as the function that is equivalent to the one presented in the first embodiment.

The functions of the respective constituent elements presented in the present embodiment may be implemented either as hardware or software running on the CPU.

Seventh Embodiment

It is taken into account, in the aforementioned embodiments, that a PID or a ProgramNo is selected from each of a plurality of transport streams basically inside the terminal apparatus 1200. The seventh embodiment, however, presents a method in which a request for such selection is accepted from the adapter 1204, and consideration or reconsideration is carried out inside the terminal apparatus 1200 about such selection of PID or ProgramNo. Note that the following description is given for the case where the adapter 1204 specifies a PID to be selected or a PID to be removed whenever necessary.

Figure 48:
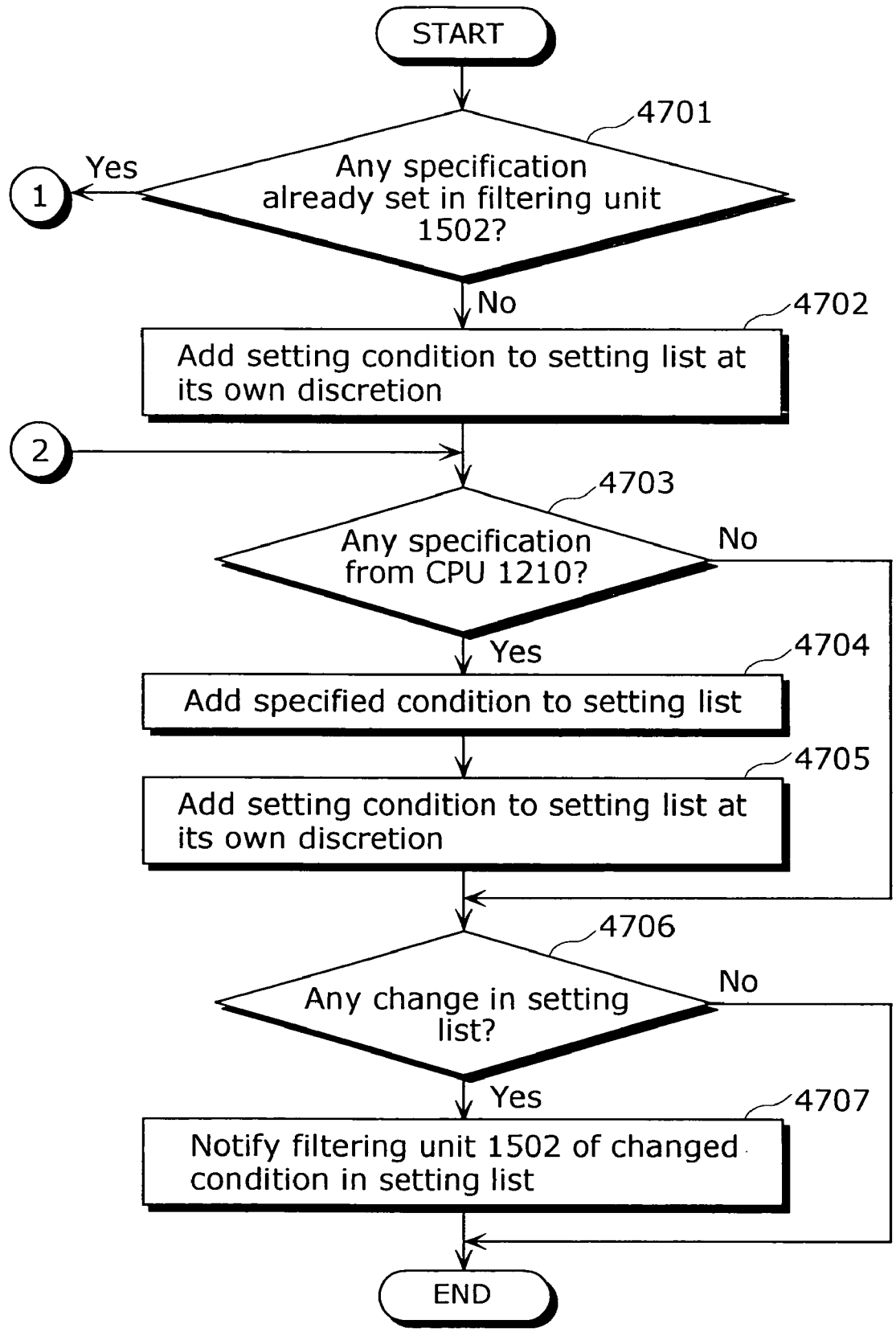
FIG. 48 is a flowchart summarizing a simplified operation performed by the receiving unit presented in the first to third embodiments.
Figure 49:
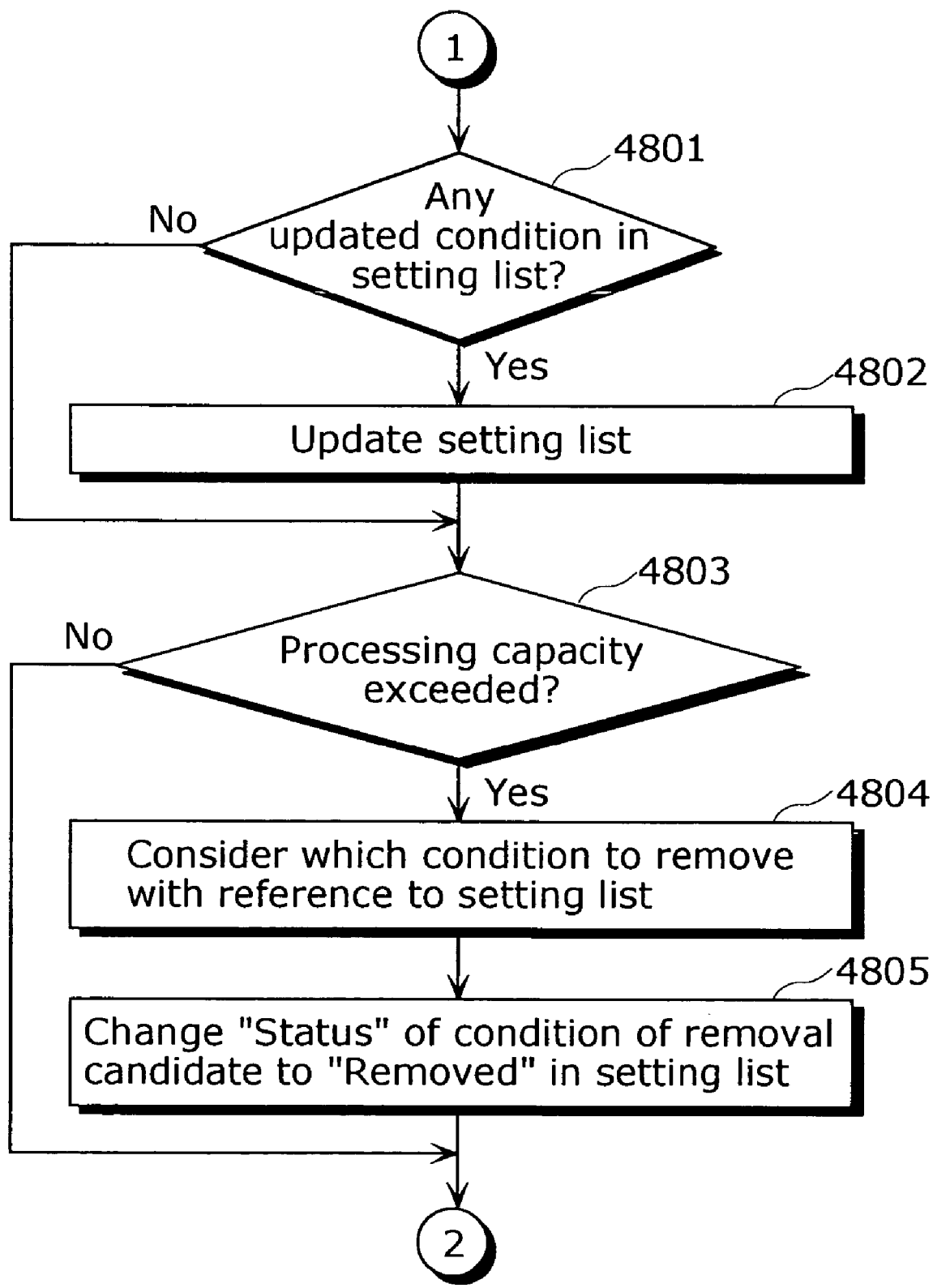
FIG. 49 is a flowchart showing a part of a simplified operation performed by the receiving unit presented in the first to third embodiments.

In order to explain the present embodiment, simplified flowcharts are shown in FIG. 48 and FIG. 49 that summarize the processes performed by the receiving unit presented in the aforementioned embodiments. Note that the process in Step 4702 of adding a setting condition (PID or ProgramNo) to a setting list at the receiving unit's own discretion corresponds to the process performed by the default setting unit presented in the third embodiment, which is an optional process. As the process in Step 4705, the process by the receiving unit presented in the first and second embodiments of adding the setting for addition/removal of a PID or a ProgramNo, is assumed to be used. This process is optional, too.

The process in Step 4801 regarding an update of the setting list is a detailed version of the process for an upgrade of a PMT described in the second embodiment. The process in Step 4804 of considering which condition to remove is a detailed version of the process described in the first embodiment of setting a condition to be removed by taking into account priorities and the like. Furthermore, in the aforementioned embodiments, the setting list described in FIG. 48 is implicitly used by the receiving unit when making a consideration about a condition, but such list is explicitly described in the present embodiment to provide a clearer explanation. The following information is included as items to be managed in the setting list: specification method (condition); details of each condition; attribute of each condition setter; and whether or not each condition is currently set in the filtering unit 1502.

FIG. 50 shows an example of the setting list. Note that in FIG. 50, although both PID and ProgramNo are set as entries and such entries are added to the list according to setting conditions by use of the PSI storage unit 3203 or the like in consideration of convenience at the time of considering the addition/removal of a condition, it is also possible for the list to describe only PID or to provide both types of entries and describe only a specified one of the two types. Also note that when 4905 in the setting list indicates "removed", the corresponding condition may be removed from the setting list after a setting for removal is performed to the filtering unit. For example, it is possible for the receiving unit 1501 to remove such condition from the setting list after notifying the filtering unit, in Step 4707 in FIG. 48, of this change in the setting list, or such removal may be done by the filtering unit 1502. More specifically, following methods are possible: the receiving unit 1501 removes a condition, and the filtering unit is only notified of such change in the setting list by receiving, in the form of a return value, whether the condition has been removed correctly or not; and the filtering unit 1502 receives the setting list itself in Step 4707 and removes a condition.

The above description about FIG. 48 and FIG. 49 are within the range of the aforementioned embodiments.

Figure 51:
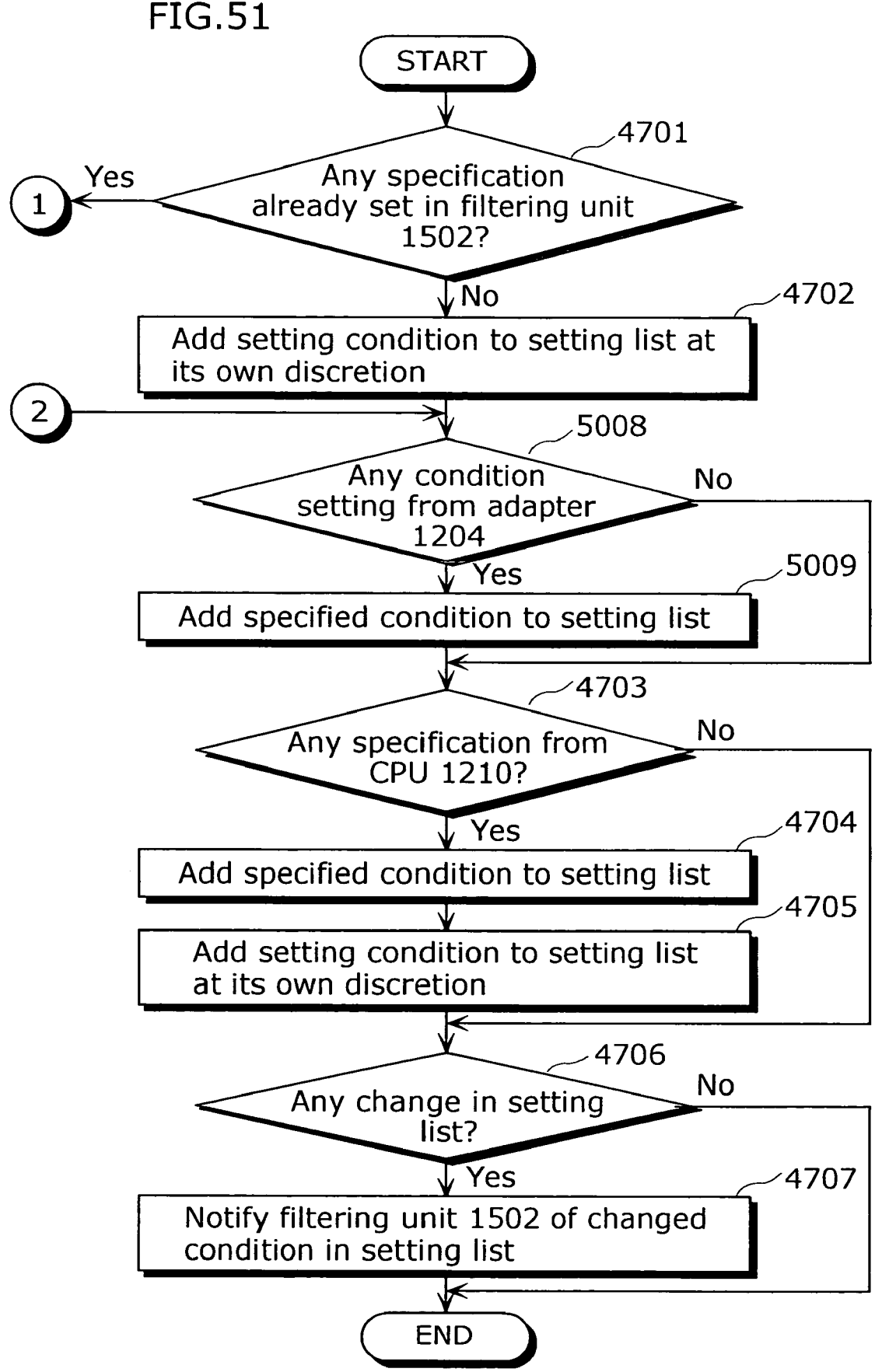
FIG. 51 is a flowchart showing an operation performed by the receiving unit when receiving a condition specification from the adapter.

FIG. 51 shows processing specific to the present embodiment. In FIG. 51, processes that are assigned the same step numbers as those in FIG. 48 are the same as them, and therefore detailed descriptions thereof are omitted here.

The following describes the processes in Steps 5008 and 5009, as well as the removal of a condition to be performed in Steps 4803 and 4804 in the case where the processing capacity is exceeded (e.g. the bit rate that can be supported between the terminal apparatus 1200 and the adapter 1204 is exceeded).

In order to repeatedly perform the processing shown in FIG. 51, the receiving unit 1501 in the pre-processing unit 1202, when receiving a specification of a filtering condition from the adapter 1204, adds such condition to the setting list based on which a setting is performed to the filtering unit 1502. More specifically, the receiving unit 1501 describes "Adapter" in the column of condition setter attribute 4904 in the setting list shown in FIG. 50, and describes the specified condition in the list. If there is no specification, the processing as shown in the flowchart of FIG. 48 is performed without performing Steps 5008 and 5009.

Figures 52, 53:
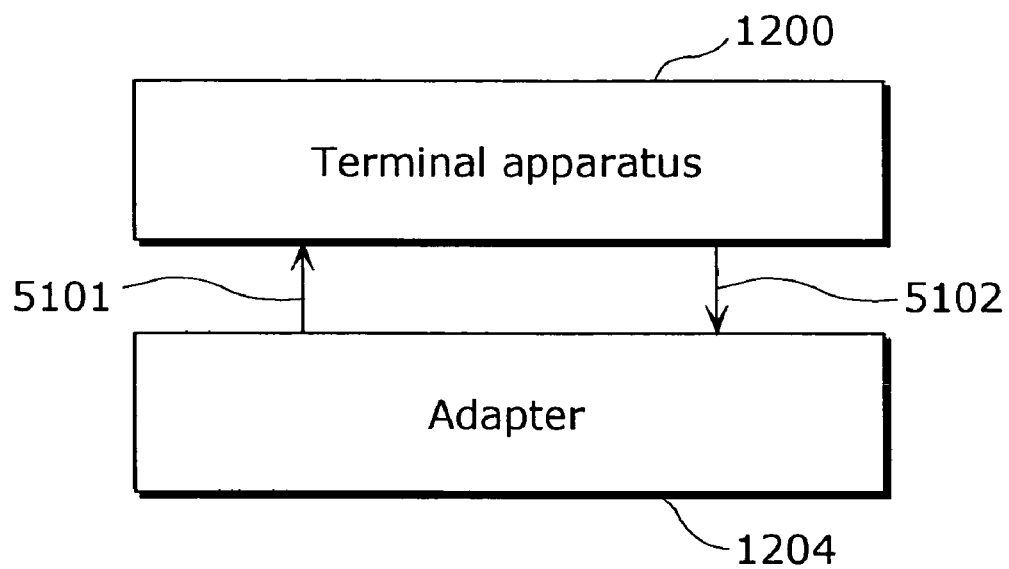
FIG. 52 is a conceptual diagram showing a message communication carried out between the terminal apparatus and the adapter.
FIG. 53 is a diagram for explaining messages transmitted between the terminal apparatus and the adapter.

FIG. 52 is a conceptual diagram showing a communication carried out between the adapter 1204 and the terminal apparatus 1200. As shown in FIG. 53, the following two cases are conceivable as communications between the adapter 1204 and the terminal apparatus 1200: (i) the adapter 1204 sends a query message to the terminal apparatus 1200, and the terminal apparatus 1200 then sends a response message to the adapter 1204; and (ii) the terminal apparatus 1200 sends a query message to the adapter 1204, and the adapter 1204 then sends a response message to the terminal apparatus 1200.

The following describes the formats of these query and response messages.

First, consider the above case (i).

Figure 54:
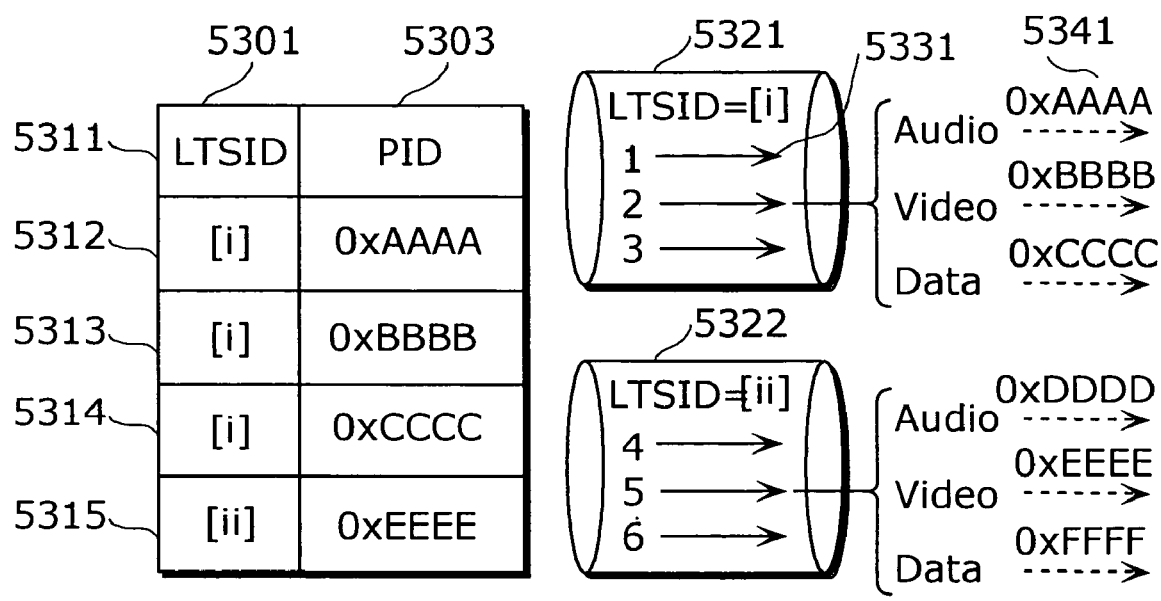
FIG. 54 is a diagram for explaining a message format in the case where a stream is specified.

FIG. 54 shows a list of ESs that should not be removed (hereinafter referred to as a "no-removable list")/a list of services that can be removed (hereinafter referred to as a "removable list") to be sent from the adapter 1204 to the terminal apparatus. Examples of non-removable/removable lists are shown in FIG. 54, FIG. 55, and FIG. 56.

In the list in FIG. 54, described in the column 5301 are LTSIDs for identifying each transport stream to which each ES to be described in the list belongs. An LTSID serve as a criterion for identifying one of the transport streams 5321 and 5322. The transport stream 5321 contains a plurality of services such as 5331 represented as arrows, and such service contains ESs that carry video/audio and data shown as an ES 5341. The PIDs of these ESs are specified in the column 5303.

Figure 55:
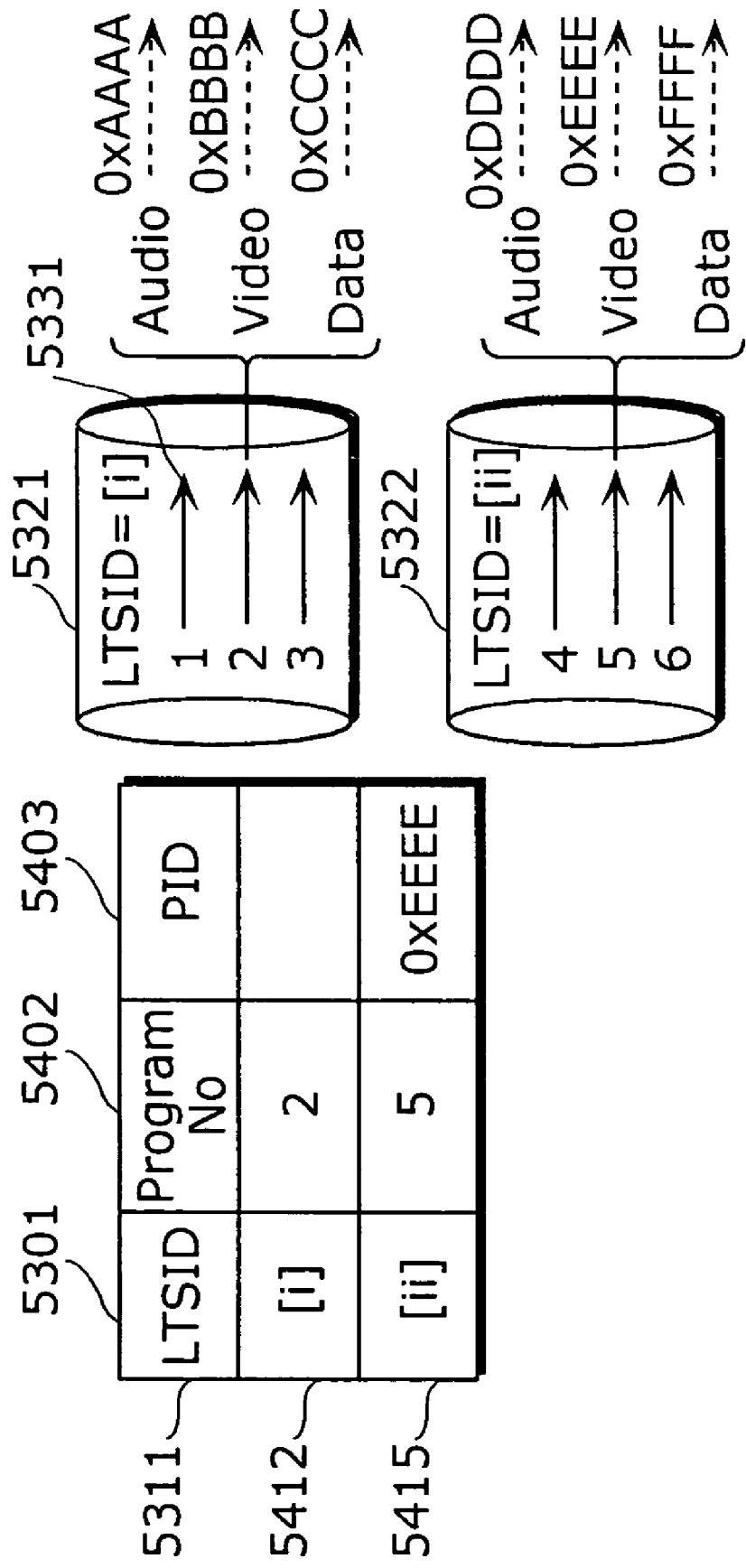
FIG. 55 is a diagram for explaining a message format in the case where a broadcasting service is specified.

FIG. 55 shows an example in which a specification of the service 5331 is added to the list. Here, such specification is made in a manner that all ESs of the ProgramNo "2" in the transport stream [i] are described in the list, rather than specifying the service on an ES basis as shown in the lines 5312, 5313, and 5314 in FIG. 54. Furthermore, it is also possible to perform a setting so that only a specific ES is specified as in the case of the line 5415. When this is done, it is also conceivable that a PAT and a PMT or equivalent information are transmitted through OOB so that the adapter 1204 can interpret the service. Alternatively, it is also possible to set a rule stipulating that a PAT and a PMT or equivalent information should be transmitted, without exception, to the adapter 1204 through Inband. Note that in the case where a specification is performed on a service basis rather than on an ES basis, it is also possible to use a list in which only the columns 5301 and 5402 are specified.

FIG. 56 shows a list that includes a column 5504 in which it is possible to further specify, in addition to the specification shown in FIG. 55, whether filtering is possible or not. To be more specific, while it was possible for the lists shown in FIG. 54 and FIG. 55 to be represented either as a non-removable or a removable list, it is possible for the list shown in FIG. 56 to specify, on a PID basis, whether conditions can be filtered or not. Moreover, it is also possible to add, to the list shown in FIG. 54, the column describing whether filtering is possible or not.

Note that the lists shown in FIG. 54, FIG. 55, and FIG. 56 include a plurality of lines for specifications, but it is also possible to send such specifications in a message that can include only one line to carry specifications. Moreover, these lists may also be lists that include all or part of information described in the non-removable/removable list. Furthermore, it is also possible to send both of a non-removable list and a removable list.

Meanwhile, a response message to be sent from the terminal apparatus 1200 to the adapter 1204 is assumed to be a message of approval. Furthermore, it is also conceivable that a removable list or a list to be sent to the adapter 1204 is sent according to the formats shown in FIG. 54 and FIG. 55. In the case of sending the lists shown in FIG. 54 and FIG. 55 from the terminal apparatus 1200 to the adapter 1204, a process to be performed is the same as the one for sending a message from the terminal apparatus 1200 to the adapter 1204 and for sending a response message from the adapter 1204 to the terminal apparatus 1200.

FIG. 57 shows an example relationship between a message originator and its query format, and a response format.

The above descriptions have been given in consideration of message transmission from the adapter 1204 to the terminal apparatus 1200 as shown in the line 5611, but the following descriptions are given for message transmission from the terminal apparatus 1200 to the adapter 1204 and for response from the adapter 1204 to the terminal apparatus 1200 as shown in the line 5622.

As messages to be transmitted from the terminal apparatus 1200 to the adapter 1204, it is conceivable to send a list of conditions to be removed inside the terminal apparatus as well as a list to be sent from the terminal apparatus 1200 to the adapter 1204. The transmission formats of these messages may be any of the following: specification by use of PID as shown in FIG. 54; specification by use of a mixture of PID and ProgramNo as shown in FIG. 55; and specification by use of only ProgramNo. Furthermore, these lists may also be in the format shown in FIG. 56, according to which conditions are specified whether to be filtered or not.

The format of response messages corresponding to the above messages from the terminal apparatus 1200 may be one in which a message simply indicating approval or disapproval is returned. Moreover, response messages may also be sent in the format to be obtained by combining such format indicating approval/disapproval with the list format shown in FIG. 56. Meanwhile, in the case where the adapter 1204 cannot approve the contents of a message from the terminal apparatus 1200, it is conceivable that the adapter 1204 sends, to the terminal apparatus 1200, a non-removable or removable list. Furthermore, it is also possible to send a plurality of lists so that a non-removable or removable list shown in FIG. 54 and FIG. 55 can be sent in addition to a list shown in FIG. 56 indicating approval/disapproval.

Note that the lists shown in FIG. 54, FIG. 55, and FIG. 56 include a plurality of lines for specifications, but it is also possible to send such specifications in a message that can include only one line to carry specifications. Moreover, these lists may also be a list of conditions to be removed inside the terminal apparatus as well as a list that carries information included in a list to be sent from the terminal apparatus 1200 to the adapter 1204. Furthermore, it is also possible to employ a format in which a plurality of lists are sent such as a list of conditions to be removed inside the terminal apparatus and a list to be sent from the terminal apparatus 1200 to the adapter 1204.

Next, a description is given below about a method for performing the processes of Steps 4803 and 4804 in FIG. 49.

When receiving a notification in Step 4803 that it is beyond the processing capacity from the multiplexing unit or the like, the receiving unit 1501 considers which condition (PID or ProgramNo) should be removed by reference to the setting list. Note that the judgment is made in Step 4804 about whether the processing capacity is exceeded or not, but it is also possible to remove as many conditions as possible if they can be removed.

A method for considering which condition to remove (hereinafter also referred to simply as a "consideration method") in Step 4804 is common to the aforementioned embodiments (in particular, it corresponds to the process of preferentially adding/removing a condition presented in the first embodiment, and the process of adding/removing a condition on a service basis and the process of adding/removing a part of the streams inside a service presented in the second embodiment). Here, a description is given only of a setting condition that arises due to the condition setting performed by the adapter 1204. Note that when considering the adapter 1204, the following methods are conceivable: the receiving unit 1501 considers which condition to remove at its own discretion with reference to the setting list as in the case of the aforementioned embodiments; and the receiving unit 1501 considers which condition to remove, based on a negotiation with the adapter 1204. This negotiation between the receiving unit 1501 and the adapter 1204 is assumed to be conducted by means of communications in the format shown in the table of FIG. 57 that utilizes FIG. 54, FIG. 55, and FIG. 56 described above.

Note that as a method used in Step 4804, some or all, or a combination of the consideration methods presented in the aforementioned embodiments may be used. Furthermore, it is also possible to give priorities to these methods so that the processes are repeated according to such priorities until a result of judgment shown in Step 4803 becomes "Yes", rather than by processing some or all, or a combination of these methods at one time.

For example, as a way to combine consideration methods, the receiving unit 1501 may first consider which condition to remove with reference to the setting list, and if a result of judgment in Step 4803 will not become "Yes", the receiving unit 1501 may further consider which condition to remove based on a negotiation with the adapter 1204. Note that example cases where the receiving unit 1501 considers which condition to remove at its own discretion or based on a negotiation with the adapter 1204 may be realized using a part or all of the processes or a combination of some of the methods to be presented in the following descriptions or in the aforementioned embodiments.

The following are example of methods for considering which condition to remove at the discretion of the receiving unit 1501:

The receiving unit 1501 preferentially removes a condition whose column of condition setter attribute 4904 in the setting list it holds is "At its own";

The receiving unit 1501 preferentially removes a condition whose column of condition setter attribute 4904 in the setting list it holds is "At its own", and if a result of judgment in Step 4803 will not become "Yes", a condition whose column of condition setter attribute 4904 in the setting list is "Application" should be removed. Note that when this is done, a notification that the result of judgment in Step 480 will not become "Yes" may be made to the application that has set this condition or to the user who is operating this application. As a method of making this notification, it is possible to send an event to the application in the case of making a notification to the application and to set an HTML file to a program running on the CPU in the case of making a notification to the user;

In the case where the multiplexing unit removes a condition and there exists a condition whose column of status 4905 in the setting list held by the receiving unit 1501 indicates "Removed", since there is a possibility that a result of judgment in Step 4803 becomes "Yes" due to the removal of such condition, it is possible to set no condition in Step 4804;

The receiving unit 1501 may preferentially remove a condition whose column of setter attribute 4904 in the setting list is "At its own" and which is a condition (PID or ProgramNo) not specified by another setter attribute (application running on the CPU 1210 or the adapter 1204);

The receiving unit 1501 may preferentially remove conditions that are not specified by other setter attributes, out of the candidate conditions of removal;

The POS storage unit 3203 monitors a packet having a condition specified as a setting condition so that the receiving unit 1501 removes such condition when this packet does not arrive after a certain period of time; and Requests should be removed in order of arrival.

The following are example of methods for considering which condition to remove based on a negotiation with the adapter 1204:

In the method in which the receiving unit 1501 considers which condition to remove at its own discretion (presented in the present and aforementioned embodiments), all or part of information contained in a list of conditions selected as removal candidates should be transmitted to the adapter 1204 in the format shown in FIG. 54, FIG. 55 or FIG. 56, and the receiving unit 1501 reconsiders which condition to remove with reference to a message of approval from the adapter 1204 or a non-removable or removable list. When this is done, it is also possible to include, in the list to be transmitted to the adapter 1204, only conditions whose column of condition setter attribute 4904 in the setting list are "Adapter". Furthermore, it is also possible to include all conditions to the list to be transmitted to the adapter 1204 if their condition setter attribute 4904 in the setting list is "At its own" or "Adapter", or regardless of the condition setter attribute 4904 in the setting list;

Other than the queries shown in FIG. 57, the receiving unit 1501 requests the adapter 1204 to remove all the conditions set by the adapter 1204, and when receiving a message of approval as a response, the receiving unit 1501 removes all the conditions whose condition setter attribute 4904 are "Adapter". When a message of disapproval is received, the receiving unit 1501 makes an inquiry to the adapter 1204 using the format shown in FIG. 54, FIG. 55 or FIG. 56; and The terminal apparatus 1200 sends, to the adapter 1204, a request that the adapter 1204 should send a non-removable list or a removable list, so that the receiving unit 1501 can consider which ES or service to remove by taking into account the received list.

In the above three methods for considering which condition to remove based on a negotiation with the adapter 1204, it is also possible that the receiving unit 1501 keeps communicating with the adapter 1204 or keeps waiting until it receives a message of approval from the adapter 1204. Furthermore, it is also conceivable that the receiving unit 1501 forcefully decides which condition to remove regardless of whether an approval of the adapter 1204 can be received or not or when no response is received from the adapter 1204 even after the time-out is over.

Moreover, other than the above methods, it is also conceivable that the adapter 1204 requests the terminal apparatus 1200 to send a list of removal candidates.

Furthermore, it is also possible that the receiving unit 1501 notifies the adapter 1204 of only a cause of reducing a bit rate, such as that the maximum bit rate between the terminal apparatus 1200 and the adapter 1204 is exceeded, and the receiving unit 1501 waits for the adapter 1204 to send a condition that can be removed.

Note that the above descriptions have been given on the assumption that the receiving unit 1501 repeats the processes of Steps 4701 to 4707 if there is no request from the adapter 1204 (Step 5008) in FIG. 51, but it is also possible for the receiving unit 1501 to start its operation with a request received from the adapter 1204 as a trigger. In other words, a setting is made so that the processes shown in the flowcharts of FIG. 48 or FIG. 51 are repeated after the result of judgment made in Step 5008 becomes "Yes" at least once and the setting performed in Step 5009 is completed.

Furthermore, the above descriptions have been given on the assumption that the criterion of judgment made in Step 4803 about whether the processing capacity is exceeded or not is whether the maximum bit rate between the terminal apparatus 1200 and the adapter 1204 is exceeded or not, but it is also conceivable that such judgment is made based on whether the processing capacity of the terminal apparatus 1200 or the adapter 1204 is exceeded, or rule information internally held by the receiving terminal or a request from the adapter related to extracted conditions, cannot be satisfied.

Note that the above descriptions have been given by use of the pre-processing unit and the multiplexing unit shown in FIG. 13 and FIG. 16 explained in the first embodiment, but it is also possible that such pre-processing unit and multiplexing unit include a part or all of the functions explained in the second to sixths embodiments.

Furthermore, in the aforementioned embodiments, two cases are described where conditions to be removed/added are determined only by the receiving unit 1501 and where conditions are determined based on a negotiation between the adapter 1204 and the receiving unit 1501. However, it is also possible to make a setting so that only a request from the adapter 1204 is multiplexed and no consideration is made for which condition to remove inside the terminal apparatus 1200. As a concrete example, it is possible for the receiving unit 1501 to process only a request from the adapter 1204 (Steps 5008 and 5009) and a request from an application running on the CPU (Steps 4703 and 4704) and to consider which condition to remove in Step 4804 only when a result of the judgment in Step 4803 is "Yes", without adding any new conditions at its own discretion in Step 4702 and Step 4705.

Note that it does not matter whether the receiving unit 1501 has a negotiation with the adapter 1204 or not when determining which condition to remove.

Note that since the present embodiment does not depend on multiplexing method, it is possible to carry out the present embodiment regardless of which one of the following methods is used: a method presented in the first embodiment in which a part of a packet is used to identify the transport stream; and a method presented in the sixth embodiment in which a header is added to a packet. Also, it is further possible to use another multiplexing method.

Eighth Embodiment

The present embodiment takes into account rules that serve as criteria of judgment to be made when the receiving unit 1501 sets conditions to the filtering unit and rules that serve as criteria of judgment to be made when the multiplexing unit 1203 performs multiplexing processing. For this reason, a rule file to be used as a criterion of judgment between the receiving unit 1501 and the multiplexing unit 1203 is generated based on a negotiation between the receiving unit 1501 and the adapter 1204 before or in the middle of the processes shown in FIG. 48 and FIG. 51, in consideration of interfaces between the adapter 1204 and the terminal apparatus 1200 and between the terminal apparatus 1200 and the adapter 1204. Note that it is possible to allow this processing for generating a rule file to be performed only before the processes shown in FIG. 48 and FIG. 51 and to allow a condition to be dynamically added at any time.

Figure 58:
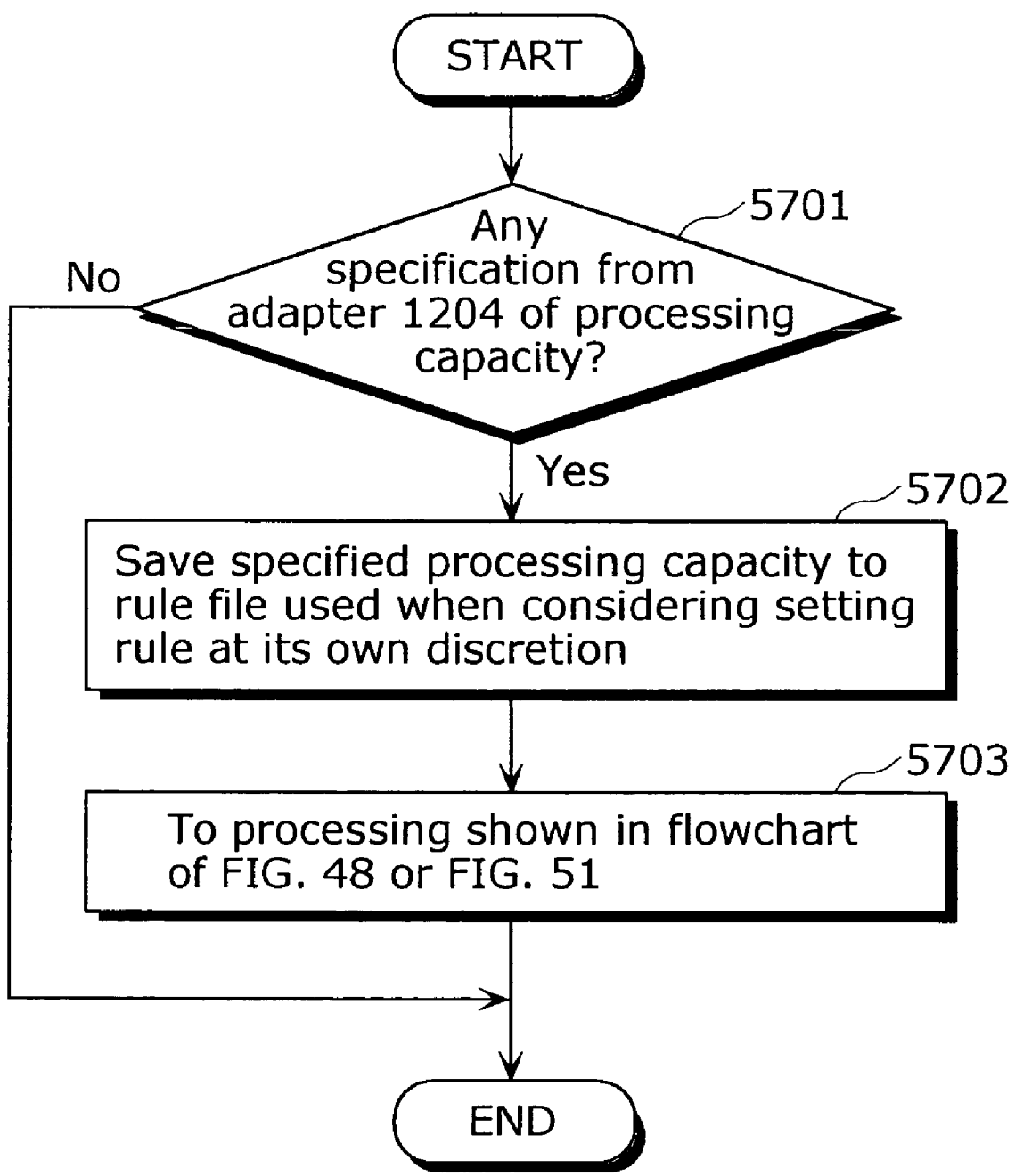
FIG. 58 is a flowchart showing an operation performed by the receiving unit when a setting is received from the adapter about its processing capacity.

FIG. 58 illustrates the process to be performed when a setting is received from the adapter 1204 about its processing capacity. The processing capacity of the adapter 1204 includes the maximum number of transport streams/services/ESs that the adapter 1204 can support. Furthermore, in the case where the adapter 1204 has the function of descrambling as in the case of the POD 3004, it sends a message to the receiving unit 1501 indicating the number of CAs to be removed. Note that this setting method is described in OpenCable Multi-StreamCableCARD Interface Specification (OC-SP-MC-IF-I01-030905). It is also possible to use other message formats or to manage the processing capacity of the adapter 1204 by use of the voltage of a PIN between the terminal apparatus and the adapter. The receiving unit 1501 describes the setting received from the adapter in the above manner into the rule file which it holds and saves the resultant.

Meanwhile, since it is possible to know about an interface between the terminal apparatus 1200 and the adapter 1204 when the adapter 1204 is inserted into the terminal apparatus 1200, the interface between the terminal apparatus 1200 and the adapter 1204 can be set in the rule file that is used as a criterion of judgment made by the receiving unit 1501 or the multiplexing unit 1203, as a pre-process to be performed before the processes shown in FIG. 48 and FIG. 51 are performed. This physical interface is compliant, in general, with the PCMCIA standard, but there is no problem if the interface conforms to another standard. An example of the adapter 1204 that is connected via a physical interface in compliance with the PCMCIA standard is described in OpenCable Multi-StreamCableCARD Interface Specification (OC-SP-MC-IF-I01-030905). According to this standard, the bit rate of an interface with the adapter 1204 that is capable of handling a plurality of transport streams is approximately 200 Mbps, and therefore the bit rate of 28 Mbps, 38 Mbps or higher is enough to transmit one bitstream.

As the processing capacity of the terminal apparatus 1200, the maximum bit rate at which the multiplexing unit 1203 can perform multiplexing is assumed to be set. The value of this bit rate is previously stored inside the terminal apparatus as a feature of the multiplexing unit 1203.

Subsequently, the receiving unit 1501 can set a condition for Step 4803 based on the rule files that have been set according to the processing capacities of the adapter 1204 and the terminal apparatus 1200 as well as the processing capacity of the interface between the terminal apparatus 1200 and the adapter 1204.

The setting of a condition in Step 4803 is made not only in the case where the receiving unit 1501 receives a message from the multiplexing unit 1203 indicating that the processing capacity is exceeded (hereinafter also referred to as a "notification of reconsideration"), but also before the receiving unit 1501 receives a notification for reconsideration from the multiplexing unit 1203 by detecting beforehand that the number of services or ESs that is beyond the processing capacity of the adapter 1204 has been specified as a result of a comparison between the setting list and the rule files. When making such a pre-judgment as above, the receiving unit 1501 may make a judgment not only at the timing of Step 4803 and Step 4804, but also at the timing corresponding to Step 4702 and Step 4705, where judgments are made using the setting list, so as to judge whether it is possible to further add a condition or not. Note that this judgment that is based on the rule files may be made thoroughly by the multiplexing unit 1203, which sends, to the receiving unit 1501, information about whether the processing capacity is exceeded or not and information about the type of such processing capacity.

Meanwhile, the multiplexing unit 1203 is required to perform multiplexing so that the bit rate between the terminal apparatus 1200 and the adapter 1204 will not be exceeded and so that the maximum number of transport streams/services/ESs specified by the adapter 1204 will not be exceeded, by taking into account the rule files that have been generated based on a condition specified by the receiving unit 1501, a specification from the adapter 1204, and the interface between the terminal apparatus 1200 and the adapter 1204. Here, if all of these conditions cannot be satisfied, the multiplexing unit 1203 notifies it to the receiving unit 1501.

With the above construction in which the receiving unit 1501 reconsiders conditions to be filtered and sets a determined condition to the filtering unit 1502 again, it is possible for the multiplexing unit 1203 to perform multiplexing of transport streams that is appropriate for the bit rate between the terminal apparatus 1200 and the adapter 1204 as well as the processing capacity of the adapter 1204.

When this is done, it is also possible to rewrite a PAT and a PMT in the following manner so that the rewritten PAT and PMT can be consistent with the above rule files: modify the PID of an ES and rewrite a PMT in response to such modification, as explained in the fourth embodiment; and generate a PAT that specifies only a selected service out of one or more transport streams and generate a PMT that specifies only a selected ES in such selected service. This processing can be implemented by the multiplexing unit 1203 making a notification to the receiving unit 1501, which then sets, to the filtering unit 1502, a rewrite rule which it has formulated so that rewritten packets can be delivered to the multiplexing unit 1203.

The present embodiment has been described by use of the pre-processing unit and the multiplexing unit shown in FIG. 13 and FIG. 16 explained in the first embodiment, but it should be noted that the pre-processing unit and the multiplexing unit may also have some or all of the functions explained in the second to sixths embodiments.

Ninth Embodiment

In order to determine a multiplexing method, a method is discussed in the present embodiment for determining which message format to use for communications between the terminal apparatus 1200 and the adapter 1204. As a multiplexing method, the first embodiment presents a method by which a part of a TS packet is used as an ID to identify the transport stream, whereas the sixth embodiment presents a method by which an ID to identify a transport stream is added to a TS packet as a header.

Conceivable methods for the above determination include: a notification is made by use of a voltage flow from he connection unit when the adapter 1204 is connected to the terminal apparatus 1200; and a notification is made by a message that is in a predetermined specific format.

The following presents examples of the operation of the adapter 1204, which shall be used in part or in combination:
A notification is made that the adapter 1204 uses, as a multiplexing method, a method by which a part of a TS packet is used as an ID to identify a transport stream as presented in the first embodiment; and
A notification is made that the adapter 1204 uses, as a multiplexing method, a method by which a new header is added to a TS packet to identify a transport stream as presented in the first embodiment.

As described above, by receiving information indicating which multiplexing method should be used, the receiving unit 1501 sets such determined multiplexing method to the rule file of the multiplexing unit.

Note that the above description have been given on the assumption that the receiving unit 1501 notifies the multiplexing unit 1203 of a multiplexing method, but it is also possible for the multiplexing unit 1203 to make a setting of its own without receiving any notifications from the receiving unit 1501.

The present embodiment has been described by use of the pre-processing unit and the multiplexing unit shown in FIG. 13 and FIG. 16 explained in the first embodiment, but it should be noted that the pre-processing unit and the multiplexing unit may also have some or all of the functions explained in the second to sixths embodiments.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. A broadcast signal receiving apparatus that receives a plurality of transport streams and uses conditional access provided by an external adapter, the broadcast signal receiving apparatus comprising:
a pre-processor operable to extract a part of information, by elementary stream unit, from each of the plurality of transport streams by receiving a filtering condition from the external adapter and performing filtering on the plurality of transport streams according to the filtering condition, wherein each elementary stream unit includes a plurality of packets, with each packet having a same packet identifier (PID);
a multiplexer operable to multiplex a plurality of parts of information extracted by the pre-processor;

an output interface operable to output multiplexed data that is the plurality of parts of information multiplexed by the multiplexer to the external adapter that is located outside the broadcast signal receiving apparatus;

an input interface operable to obtain, from the external adapter, the multiplexed data processed by the external adapter; and a demultiplexer operable to demultiplex the multiplexed data obtained by the input interface, wherein the pre-processor is operable to extract a program association table (PAT) and a program map table (PMT), together with the plurality of parts of information by elementary stream unit, each elementary stream unit including packets having a same PID, when performing the filtering, the PAT and PMT being included in each of the plurality of transport streams, the multiplexer is operable to generate the multiplexed data by multiplexing the PAT, the PMT, and the plurality of parts of information by elementary stream unit, each elementary stream unit including packets having a same PID, and to add transport stream identification information to the PAT, the PMT, and the plurality of parts of information by elementary stream unit, each elementary stream unit including packets having a same PID, which have been multiplexed, wherein the transport stream identification information is information for identifying each of the transport streams to which a part of information by elementary stream unit extracted by said pre-processor belongs, and wherein the external adapter is detachable from the broadcast signal receiving apparatus.

2. A broadcast receiving method that receives a plurality of transport streams and uses conditional access provided by an external adapter, the broadcast signal receiving method comprising:

extracting a part of information, by elementary stream unit, from each of the plurality of transport streams by receiving a filtering condition from the external adapter and performing filtering on the plurality of transport streams according to the filtering condition, wherein each elementary stream unit includes a plurality of packets, with each packet having a same packet identifier (PID);

multiplexing a plurality of parts of extracted information;

outputting multiplexed data that is the plurality of parts of information multiplexed by the multiplexer to the external adapter that is located outside the broadcast signal receiving apparatus;

obtaining from the external adapter, the multiplexed data processed by the external adapter; and demultiplexing the multiplexed data that has been obtained, wherein, a program association table (PAT) and a program map table (PMT) are extracted together with the plurality of parts of information by elementary stream unit, each elementary stream unit including packets having a same PID, when performing the filtering, the PAT and the PMT being included in each of the transport streams, when multiplexing the plurality of parts of information that have been extracted, the multiplexed data is generated by multiplexing the PAT, the PMT, and the plurality of parts of information by elementary stream unit, each elementary stream unit including packets having a same PID, and by adding transport stream identification information to the PAT, the PMT, and the plurality of parts information by elementary stream unit, each elementary stream unit including packets having a same PID, which have been multiplexed, wherein the transport stream identification information is information for identifying each of the transport streams to which a part of information by elementary stream unit extracted by said pre-processor belongs, and wherein the external adapter is detachable from the broadcast signal receiving apparatus.

* * * * *